(12) United States Patent
Park et al.

(10) Patent No.: US 10,585,458 B2
(45) Date of Patent: *Mar. 10, 2020

(54) FOLDABLE DEVICE

(71) Applicant: SAMSUNG ELECTRONICS CO., LTD., Suwon-si (KR)

(72) Inventors: Jin-hyoung Park, Suwon-si (KR); Ho-seung Seo, Suwon-si (KR); Toshikazu Takayanagi, Suwon-si (KR); Yu-dong Bae, Suwon-si (KR); Wataru Kaihotsu, Gunpo-si (KR); Shi-yun Cho, Anyang-si (KR); Dae-myung Kim, Hwaseong-si (KR); Jae-young Huh, Seoul (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 0 days.

This patent is subject to a terminal disclaimer.

(21) Appl. No.: 16/183,449

(22) Filed: Nov. 7, 2018

(65) Prior Publication Data

US 2019/0079561 A1 Mar. 14, 2019

Related U.S. Application Data

(60) Continuation of application No. 15/707,654, filed on Sep. 18, 2017, now Pat. No. 10,152,089, which is a
(Continued)

(30) Foreign Application Priority Data

Aug. 7, 2014 (KR) .......................... 10-2014-0101795
May 26, 2015 (KR) .......................... 10-2015-0073094

(51) Int. Cl.
*G06F 1/16* (2006.01)

(52) U.S. Cl.
CPC .......... *G06F 1/1652* (2013.01); *G06F 1/1616* (2013.01); *G06F 1/1635* (2013.01); *G06F 1/1656* (2013.01); *G06F 1/1681* (2013.01)

(58) Field of Classification Search
CPC ..................................................... G06F 1/1652
See application file for complete search history.

(56) References Cited

U.S. PATENT DOCUMENTS 6,377,324 B1 4/2002 Katsura
6,577,496 B1 6/2003 Gioscia et al.
(Continued)

FOREIGN PATENT DOCUMENTS

KR 10-2012-0049762 A 5/2012
KR 101170480 8/2012
(Continued)

OTHER PUBLICATIONS

Communication dated Jul. 29, 2016 issued by Korean Intellectual Property Office in counterpart Korean Application No. 10-2015-0073094.
(Continued)

*Primary Examiner* — Adrian S Wilson
(74) *Attorney, Agent, or Firm* — Sughrue Mion, PLLC

(57) ABSTRACT

A foldable device includes: a flexible display including: a first part; a second part; and a third part provided between the first and second parts; a first body supporting the first part; and a second body supporting the second part, each of the first and second body are configured to move between a first and a second position, in response to each of the first and second bodies being provided in the first position, the first body and the second body form a receiving space, the third part forms a curved portion of the flexible display and the curved portion is provided within the receiving space, and wherein the first part is configured to move in a
(Continued)

longitudinal direction of the flexible display with respect to the first body in response to the first and second bodies moving between the first and second positions.

5 Claims, 39 Drawing Sheets

Related U.S. Application Data division of application No. 14/752,101, filed on Jun. 26, 2015, now Pat. No. 9,791,892.

(60) Provisional application No. 62/018,112, filed on Jun. 27, 2014.

(56) References Cited

U.S. PATENT DOCUMENTS

| | | | |
|---|---|---|---|
| D580,432 S | 11/2008 | Yun et al. | |
| 7,714,801 B2 | 5/2010 | Kimmel | |
| 8,711,566 B2 | 4/2014 | Obrien | |
| 8,804,349 B2 | 8/2014 | Lee et al. | |
| 8,861,211 B2 | 10/2014 | Yeh et al. | |
| 9,107,301 B2 | 8/2015 | Pan et al. | |
| 9,435,410 B2 | 9/2016 | Yeh et al. | |
| 9,791,892 B2 * | 10/2017 | Park | G06F 1/1652 |
| 9,798,359 B2 * | 10/2017 | Seo | G06F 1/1652 |
| 10,120,415 B2 * | 11/2018 | Seo | G06F 1/1652 |
| 10,152,089 B2 * | 12/2018 | Park | G06F 1/1652 |
| 2005/0041012 A1 | 2/2005 | Daniel et al. | |
| 2006/0050169 A1 | 3/2006 | Misawa | |
| 2006/0146488 A1 | 7/2006 | Kimmel | |
| 2008/0079656 A1 | 4/2008 | Kee et al. | |
| 2008/0144265 A1 | 6/2008 | Aoki | |
| 2008/0151480 A1 | 6/2008 | Chung et al. | |
| 2008/0158795 A1 | 7/2008 | Aoki et al. | |
| 2008/0167095 A1 | 10/2008 | Kim et al. | |
| 2008/0247126 A1 | 10/2008 | Otsuka et al. | |
| 2010/0182738 A1 | 7/2010 | Visser et al. | |
| 2012/0002360 A1 | 1/2012 | Seo et al. | |
| 2012/0019482 A1 | 1/2012 | Wang | |
| 2012/0236484 A1 | 9/2012 | Miyake | |
| 2012/0264489 A1 | 10/2012 | Choi et al. | |
| 2012/0307423 A1 | 12/2012 | Bohn et al. | |
| 2013/0010405 A1 | 1/2013 | Rothkopf et al. | |
| 2013/0016489 A1 | 1/2013 | Yeh et al. | |
| 2013/0021762 A1 | 1/2013 | Van Dijk et al. | |
| 2013/0170124 A1 | 7/2013 | Pan et al. | |
| 2013/0321987 A1 | 12/2013 | Ore Yang et al. | |
| 2014/0028597 A1 | 1/2014 | Cho et al. | |
| 2014/0065326 A1 | 3/2014 | Lee et al. | |
| 2014/0152576 A1 | 6/2014 | Kim et al. | |
| 2014/0196254 A1 | 7/2014 | Song | |
| 2014/0226275 A1 | 8/2014 | Ko et al. | |
| 2014/0298935 A1 | 10/2014 | Yeh et al. | |
| 2015/0241925 A1 | 8/2015 | Seo et al. | |
| 2015/0378397 A1 * | 12/2015 | Park | G06F 1/1652 361/679.27 |
| 2016/0062412 A1 * | 3/2016 | Park | G06F 1/1616 361/679.27 |
| 2016/0302314 A1 * | 10/2016 | Bae | G06F 1/16 |
| 2017/0115701 A1 * | 4/2017 | Bae | G06F 1/1652 |
| 2018/0267574 A1 * | 9/2018 | Cho | G06F 1/1652 |
| 2019/0025887 A1 * | 1/2019 | Seo | G06F 1/1652 |

FOREIGN PATENT DOCUMENTS

| | | |
|---|---|---|
| KR | 10-1329946 B1 | 11/2013 |
| KR | 10-2014-0091275 A | 7/2014 |
| TW | M416796 U1 | 11/2011 |
| TW | 201327109 A1 | 7/2013 |

OTHER PUBLICATIONS

Communication dated Dec. 30, 2016, issued by the Korean Intellectual Property Office in counterpart Korean Application No. 10-2015-0073094.

Communication dated Apr. 26, 2019, issued by the Taiwanese Patent Office in counterpart Taiwan Application No. 104118675.

* cited by examiner

FOLDABLE DEVICE

CROSS-REFERENCE TO RELATED APPLICATIONS

This application is a Continuation Application of U.S. patent application Ser. No. 15/707,654, filed on Sep. 18, 2017, which is a Divisional Application of U.S. patent application Ser. No. 14/752,101, filed on Jun. 26, 2015, in the U.S. Patent and Trademark Office, now U.S. Pat. No. 9,791,892, issued on Oct. 17, 2017, which claims the benefit of U.S. Patent Provisional Application No. 62/018,112, filed on Jun. 27, 2014, in the U.S. Patent and Trademark Office, and claims priority from Korean Patent Application No. 10-2014-0101795, filed on Aug. 7, 2014, in the Korean Intellectual Property Office, and Korean Patent Application No. 10-2015-0073094, filed on May 26, 2015, in the Korean Intellectual Property Office, the disclosures of which are herein incorporated by reference in their entireties.

BACKGROUND

1. Field

Apparatuses and methods consistent with exemplary embodiments relate to a foldable device including a flexible display.

2. Description of the Related Art

A portable foldable device (hereinafter, referred to as a mobile device) such as a communication terminal, a game player, a multimedia device, a portable computer, or a photographing apparatus includes a display device that displays image information and an input unit such as a keypad. Many mobile devices described above may include a foldable structure that may fold into a smaller size in order to improve portability. In such foldable mobile devices, two bodies are connected to each other using the foldable structure. Because a display of the foldable mobile device of the related art may not fold, the display of the foldable mobile device may be disposed on only one of the two bodies. Hence, it is difficult to incorporate a large display on a mobile device including a foldable structure.

As flexible displays have been developed, attempts have been made to apply the flexible display device to a mobile device including a foldable structure. In such attempts, because the flexible display device may be disposed over two bodies to extend through the foldable structure, a larger screen may be provided. However, although the flexible display device may be bendable, if the flexible display device is sharply bent, the flexible display device itself may be damaged. Hence, a curved portion having a predetermined curvature is formed at a center of the flexible display device when the flexible display device folds. In this case, however, when the flexible display device is folded for a long time and then is unfolded, the curved portion may not be able to be spread flat.

SUMMARY

Aspects of one or more exemplary embodiments provide a foldable device that may reduce a compressive force and a tensile force applied to a flexible display during a folding/unfolding process.

Aspects of one or more exemplary embodiments provide a foldable device that may reduce a space between a flexible display and first and second bodies during a folding/unfolding process.

Aspects of one or more exemplary embodiments provide a foldable device that may enable a curved portion of a flexible display to maintain a natural curve shape at a predetermined unfolding angle between a folded position and an unfolded position.

Aspects of one or more exemplary embodiments provide a foldable device that may cover a gap formed between a flexible display device and first and second bodies during a folding/unfolding process.

Aspects of one or more exemplary embodiments provide a foldable device that may be maintained at a predetermined unfolding angle.

According to an aspect of an exemplary embodiment, there is provided a foldable device including: a flexible display including a first part, a second part, and a third part disposed between the first part and the second part; a first body configured to support the first part; and a second body foldably connected to the first part and configured to support the second part. The first body and the second body may be configured to be disposed in a folded position and an unfolded position. When the first body and the second body are disposed in the folded position, the first body and the second body may form a receiving space. When the first body and the second body are disposed in the folded position, the third part may form a curved portion of the flexible display and the curved portion may be disposed within the receiving space. The first body may be configured to support the first part such that the first part may be moved in a longitudinal direction of the flexible display.

The second part may be fixed to the second body.

The foldable device may further include a controller configured to control an operation of the foldable device; and a signal line connecting the flexible display and the controller. The controller may be disposed within the second body.

The foldable device may further include a battery configured to supply power to the controller and the flexible display. The battery may be disposed within the first body.

The first body may include: a fixed frame; a movable frame to which the first part of the flexible display is fixed; a first rail provided on the movable frame; and a second rail provided on the fixed frame, coupled to the first rail, and configured to support the movable frame so that the movable frame may be moved with respect to the fixed frame.

The foldable device may further include a friction reducing member disposed between the fixed frame and the movable frame and configured to reduce friction between the movable frame and the fixed frame.

The friction reducing member may include a film and be attached to the fixed frame.

The first body further may include a base cover secured to the fixed frame by a fastening member. The fixed frame may include an opening through which the fastening member passes. The base cover and the fixed frame may form a receiving space for an electrical circuit. The friction reducing member may cover the opening.

The foldable device may further include a rail member coupled to the fixed frame and forming the second rail.

A fastening member may couple the rail member to the fixed frame. The fixed frame may include a fastening hole having a closed lower end portion to which the fastening member attaches.

The first body may include a base cover coupled to the fixed frame, the base cover and the fixed frame may form a receiving space for an electrical circuit, and the electrical circuit includes a battery configured to supply power to the flexible display.

The foldable device may further include a controller disposed within the second body and configured to control an operation of the foldable device. The battery may be configured to supply power to the flexible display through the controller.

The foldable device may further include a stop configured to limit a movement range of the first part of the flexible display.

The stop may be configured to allow the first part of the flexible display to move only when an unfolding angle of the first and second bodies is equal to or greater than a movement limiting angle.

The movement limiting angle is equal to or greater than 90°.

The movement limiting angle is equal to or greater than 120°.

The first body may include: a movable frame to which the first part of the flexible display is fixed; and a fixed frame configured to support the movable frame so that the movable frame may move in the longitudinal direction. The stop may be configured to contact the movable frame at the movement limiting angle.

The foldable device may further include a resistance member configured to apply a force against a movement of the first part of the flexible display with respect to the first body when the first and second bodies change from the unfolded position to the folded position.

The foldable device may further include a stop configured to allow the first part of the flexible display to move only when an unfolding angle of the first and second bodies is equal to or greater than a movement limiting angle. The resistance member may be configured to apply the force against the movement of the first part of the flexible display only when the unfolding angle is equal to or greater than the movement limiting angle.

As an unfolding angle of the first and second bodies decreases, the resistance member may apply a higher force against the movement of the first part of the flexible display.

The foldable device may further include a shield provided on the first and second bodies and configured to cover a side portion of the third part when the first and second bodies change between the folded position and the unfolded position.

The shield may include a first end portion and a second end portion. A guide may be formed one of the first body and the second body, the first end portion of the shield may include an insertion protrusion connected to the guide in a slidable manner, and the second end portion of the shield may be pivotably connected to the other of the first body or the second body not including the guide.

The guide may extend in the longitudinal direction on the first or second body.

The first body may configured to pivot about a first central axis in order to transition between the folded position and the unfolded position, the second body may be configured to pivot about a second central axis in order to transition between the folded position and the unfolded position, and the first central axis and the second central axis may be spaced apart.

The foldable device may further include: a first gear provided along the first central axis; and a second gear provided along the second central axis engaged with the first gear.

The first and second bodies may be configured to be maintained in the unfolded position and to be maintained in a predetermined unfolding angle between the unfolded position and the folded position.

The foldable device may further include: a facing arm provided on one of the first and second bodies, the facing arm including a facing portion; and an elastic arm provided on the other of the first and second bodies, the elastic arm including a first contact portion configured to contact the facing portion when the first and second bodies are in the unfolded position.

The elastic arm may further include a second contact portion inclined with respect to the first contact portion, and the second contact portion may be configured to, when the first and second body are at the predetermined unfolding angle, contact the facing portion and maintain the first and second bodies at the predetermined unfolding angle.

The facing arm may be configured to contact the elastic arm and be deformed when the first and second bodies change from the folded position and the unfolded position.

The first body may include a fixed frame, and a movable frame to which the first part of the flexible display is fixed and configured to be supported on the fixed frame to move in the longitudinal direction, wherein the foldable device further includes a restriction unit configured to restrict a movement amount of the movable frame in the longitudinal direction when the first and second bodies fold/unfold.

The first and second bodies may pivot about first and second central axes that are spaced apart from each other and are disposed in the folded position and the unfolded position. The restriction unit may include: a first slider connected to the movable frame; a pulley; and a first connection member configured to move the first slider by using a change in an amount of the first connection member wound around the pulley when the first and second bodies fold/unfold. The restriction unit may further include: a rack gear slidably connected to the first connection member; and a pinion rotatably connected to the rack gear, wherein a first rack gear portion that engages with the pinion is provided on the first slider. The first connection member may include a flexible wire, wherein the restriction unit further includes a return spring that applies a tensile force to the first connection member. The first connection member may be bending elastic.

The foldable device may further include: first and second receivers provided on the first and second bodies to pivot between a first position in which the receiving space is formed and a second position in which the third part of the flexible display is supported; and a support unit configured to maintain the first and second receivers at the second position until the first and second bodies reach a reception start position from the unfolded position and to allow the first and second receivers to move to the first position when the first and second bodies unfold past the reception start position.

The first and second bodies may pivot about first and second central axes that are spaced apart from each other, and may be disposed in the folded position and the unfolded position. The support unit may include: a rotation cam configured to support the first and second receivers and including a first cam track corresponding to the second position and a second cam track corresponding to the first position; a pulley; and a second connection member configured to rotate the rotation cam by using a change in an amount of the second connection member wound around the pulley when the first and second bodies fold/unfold. The support unit may further include: a second slider slidably connected to the second connection member and including a second rack gear portion; and a pinion configured to engage with and rotate along with the second rack gear portion and connected to the rotation cam. The second connection member may include a flexible wire, wherein the support unit further includes a return spring that applies a tensile force to the second connection member. The second connection member may be bending elastic.

According to an aspect of another exemplary embodiment, there is provided a foldable device including: a flexible display including a first part, a second part, and a third part disposed between the first part and the second part; a first body configured to support the first part; a second body foldably connected to the first body and configured to support the second part; and a shielding member provided on the first and second bodies. The first body and the second body may be configured to be in a folded position and an unfolded position. When the first body and the second body are disposed in the folded position, the first body and the second body form a receiving space, and when the first body and the second body are disposed in the folded position, the third part forms a curved portion of the flexible display and the curved portion is disposed within the receiving space. The shield may be configured to cover a side portion of the third part of the flexible display when the first and second bodies change between the folded position and the unfolded position.

The shield may include a first end portion and a second end portion. A guide may be formed one of the first body and the second body. The first end portion of the shield may include an insertion protrusion connected to the guide in a slidable manner, and the second end portion of the shield may be pivotably connected to the other of the first body or the second body not including the guide.

The guide may extend in a longitudinal direction on the first or second body.

According to an aspect of another exemplary embodiment, there is provided a foldable device including: a flexible display including: a first part; a second part; and a third part provided between the first part and the second part; a first body supporting the first part; and a second body connected to the first body and supporting the second part, wherein each of the first body and the second body is configured to move between a first position and a second position, wherein, in response to each of the first body and the second body being provided in the first position, the first body and the second body form a receiving space, the third part comprises a curved portion of the flexible display and the curved portion is provided within the receiving space, and wherein the first part is configured to move in a longitudinal direction of the flexible display with respect to the first body in response to the first and the second bodies moving between the first and second positions.

The second part may be fixedly attached to the second body.

The foldable device may further include: a controller configured to control an operation of the foldable device; and a signal line connecting the flexible display and the controller, wherein the controller is provided within one of the first body and the second body.

The foldable device may further include a battery configured to supply power to the controller and the flexible display, wherein the battery is provided within the other of the first body and the second body.

The first body may include: a fixed frame; a movable frame to which the first part of the flexible display is fixedly attached; a first rail provided on the movable frame; and a second rail provided on the fixed frame, coupled to the first rail, and configured to support the first rail of the movable frame, and wherein the movable frame is configured to move with respect to the fixed frame.

The foldable device may further include a friction reducing member provided between the fixed frame and the movable frame and configured to reduce friction between the movable frame and the fixed frame.

The first body may further include a base cover secured to the fixed frame by a fastening member, wherein the fixed frame comprises an opening through which the fastening member passes, wherein an electrical circuit is provided in an accommodating space provided between the base cover and the fixed frame, and wherein the friction reducing member covers the opening.

The foldable device may further include a rail member coupled to the fixed frame and configured to correspond to the second rail.

A fastening member may be configured to couple the rail member to the fixed frame, and the fixed frame may include a fastening hole having a closed end portion, the closed end portion provided at a second end of the fastening hole opposite to a first end of the fastening hole, the fastening member enters the fastening hole from the first end.

The first body may further include a base cover coupled to the fixed frame, wherein an electrical circuit is provided in an accommodating space provided between the base cover and the fixed frame, and wherein the electrical circuit comprises a battery configured to supply power to the flexible display.

The foldable device may further include a controller provided within the second body and configured to control an operation of the foldable device, wherein the battery is configured to supply power to the flexible display through the controller.

The foldable device may further include a movement limiting member configured to limit a movement range of the first part of the flexible display.

The movement limiting member may be configured to allow the first part of the flexible display to move only when an unfolding angle formed between the first and second bodies is equal to or greater than a movement limiting angle.

The movement limiting angle may be equal to or greater than 90°.

The movement limiting angle may be equal to or greater than 120°.

The first body may include: a movable frame to which the first part of the flexible display is fixed; and a fixed frame configured to support the movable frame, the movable frame configured to move in the longitudinal direction, wherein the movement limiting member is configured to contact the movable frame at the movement limiting angle.

The foldable device may further include a resistance member configured to apply a force against a movement of the first part of the flexible display with respect to the first body.

The foldable device may further include a movement limiting member configured to allow the first part of the flexible display to move only when an angle formed between the first and second bodies is equal to or greater than a movement limiting angle, wherein the resistance member is configured to apply the force against the movement of the first part of the flexible display only when the angle is equal to or greater than the movement limiting angle.

As an angle formed between the first and second bodies decreases, the resistance member is configured to apply a higher force against the movement of the first part of the flexible display.

The foldable device may further include a shielding member provided on the first and second bodies and configured to cover a side portion of the third part when the first and second bodies change between the first position and the second position.

The shielding member may include a first end portion and a second end portion, wherein a guide is provided in one of the first body and the second body, wherein the first end portion of the shielding member comprises a protrusion configured to be inserted into the guide in a sliding manner, and wherein the second end portion of the shield is pivotably connected to the other of the first body and the second body.

The guide may extend in the longitudinal direction on one of the first and the second body.

The first body may be configured to pivot about a first axis to transition between the first position and the second position, wherein the second body is configured to pivot about a second axis to transition between the first position and the second position, and wherein the first axis and the second axis are spaced apart.

The foldable device may further include a first gear provided along the first axis; and a second gear provided along the second axis and engaged with the first gear.

The first and second bodies may be configured to be maintained in the second position and to be maintained at a predetermined angle between the first position and the second position with each other.

The foldable device may further include a facing arm provided on one of the first and second bodies, the facing arm comprising a facing portion; and an elastic arm provided on the other of the first and second bodies, the elastic arm comprising a first contact portion configured to contact the facing portion in response to the first and second bodies being in the unfolded position.

The elastic arm may further include a second contact portion inclined with respect to the first contact portion, and wherein the second contact portion is configured to contact the facing portion and maintain the first and second bodies at the predetermined unfolding angle in response to the first and second body being at the predetermined unfolding angle.

The facing arm may be configured to contact the elastic arm and be deformed in response to the first and second bodies changing between the first position and the second position.

The first body may include: a fixed frame; and a movable frame to which the first part of the flexible display is fixed and configured to be supported on the fixed frame to move in the longitudinal direction, wherein the foldable device further comprises a restriction unit configured to restrict a movement of the movable frame in the longitudinal direction.

The first and second bodies may pivot about first and second axes, respectively, that are spaced apart from each other.

The restriction unit may include: a first slider connected to the movable frame; a pulley; and a first connection member configured to move the first slider by using a change in an amount of the first connection member wound around the pulley in response to the first and second bodies moving between the first and second positions.

The restriction unit may further include: a rack gear slidably connected to the first connection member; and a pinion rotatably connected to the rack gear, wherein a first rack gear portion engaging with the pinion is provided on the first slider.

The foldable device may further include a moveable support member configured to support the third part; first receiver provided on the first body and a second receiver provided on the second body, the first and second receivers configured to pivot between a first support position in which the receiving space is formed and a second support position in which the third part of the flexible display is supported by the first and second receivers; and a support unit configured to maintain the first and second receivers at the second support position until the first and second bodies reach a reception start position from the second position and to allow the first and second receivers to move to the first support position in response to the first and second bodies unfold passing the reception start position.

The support unit may include: a rotation cam configured to support the first and second receivers and comprising a first cam track corresponding to the second support position and a second cam track corresponding to the first support position; a pulley; and a second connection member configured to rotate the rotation cam by using a change in an amount of the second connection member wound around the pulley in response to the first and second bodies moving between the first and second positions.

The support unit may further include a second slider slidably connected to the second connection member and comprising a second rack gear portion; and a pinion configured to engage with and rotate along with the second rack gear portion and connected to the rotation cam.

The second connection member may include a flexible wire, wherein the support unit further comprises a spring configured to apply a tensile force to the second connection member.

The first position may correspond to a folded position of the foldable device and the second position may correspond to an unfolded position of the foldable device.

The first body and the second body may be foldably connected to each other.

According to an aspect of another exemplary embodiment, there is provided a foldable device including: a flexible display including: a first part; a second part; and a third part disposed between the first part and the second part; a first body configured to support the first part; a second body connected to the first body and configured to support the second part; and a shielding member provided on the first and second bodies, wherein each of the first body and the second body are configured to move between a first position and a second position, wherein, when the first body and the second body are in the first position, the first body and the second body form a receiving space, and wherein, when the first body and the second body are in the folded position, the third part comprises a curved portion of the flexible display and the curved portion is provided within the receiving space, and wherein the shielding member is configured to cover a side portion of the third part of the flexible display in response to the first and second bodies moving between the first position and the second position.

Additional aspects will be set forth in part in the description which follows and, in part, will be apparent from the description, or may be learned by practice of the presented exemplary embodiments.

BRIEF DESCRIPTION OF THE DRAWINGS

The above and/or other aspects of the disclosure will become apparent and more readily appreciated from the following description of one or more exemplary embodiments, taken in conjunction with the accompanying drawings in which.

DETAILED DESCRIPTION

Figure 1:
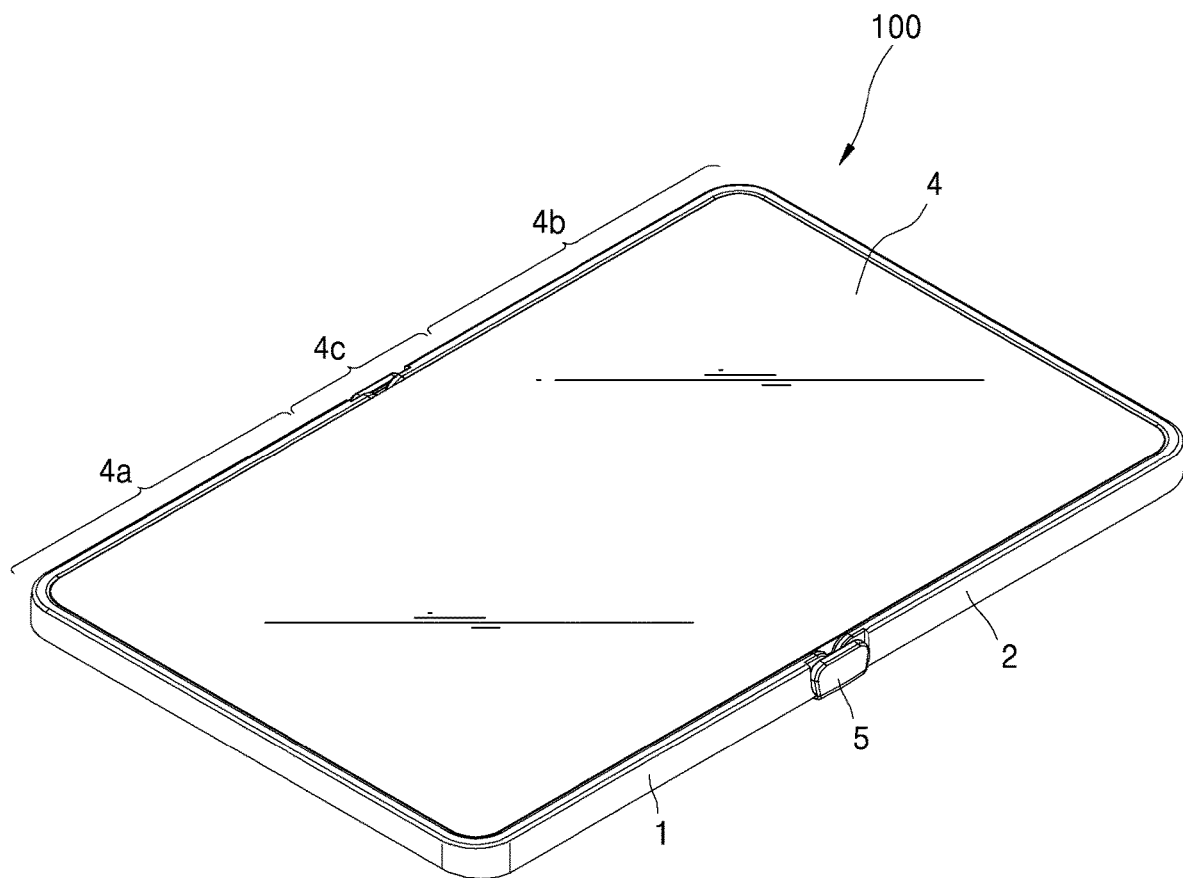
FIG. 1 is a perspective view of a foldable device according to an exemplary embodiment.

Reference will now be made in detail to one or more exemplary embodiments, examples of which are illustrated in the accompanying drawings, wherein like reference numerals denote like elements throughout and sizes or thicknesses of elements may be exaggerated for clarity.

As used herein, the term "and/or" includes any and all combinations of one or more of the associated listed items. Expressions such as "at least one of," when preceding a list of elements, modify the entire list of elements and do not modify the individual elements of the list.

Figure 2:
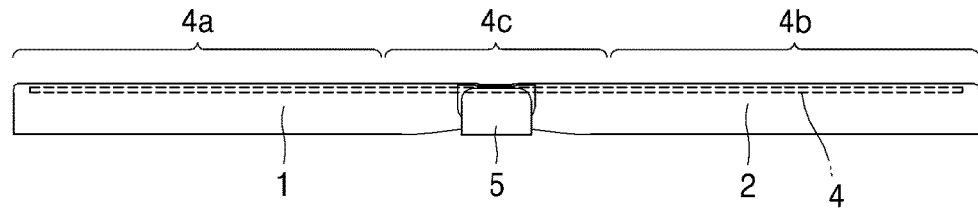
FIG. 2 is a side view illustrating the foldable device of FIG. 1 in an unfolded state according to an exemplary embodiment.
Figure 3:
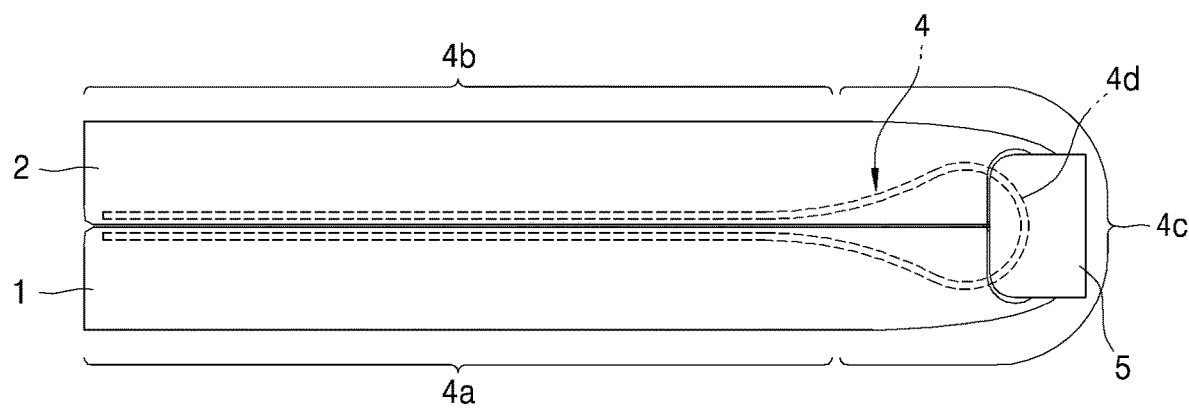
FIG. 3 is a side view illustrating a folded state of the foldable device of FIG. 1 according to an exemplary embodiment.

FIG. 1 is a perspective view illustrating of a foldable device 100 according to an exemplary embodiment. FIG. 2 is a side view illustrating the foldable device 100 of FIG. 1 in an unfolded state according to an exemplary embodiment. FIG. 3 is a side view illustrating a folded state of the foldable device 100 of FIG. 1 according to an exemplary embodiment.

Referring to FIGS. 1 through 3, the foldable device 100 includes first and second bodies 1 and 2 and a flexible display device 4, i.e., a flexible display. The first and second bodies 1 and 2 are connected to each other and configured to change between an unfolded position as shown in FIG. 2 and a folded position as shown in FIG. 3.

The flexible display device 4 is supported by the first and second bodies 1 and 2. The flexible display device 4 may be divided into a first part 4a, i.e., a first section 4a, that is supported by the first body 1, a second part 4b, i.e., a second section 4b, that is supported by the second body 2, and a third part 4c, i.e., a third section 4c, that is provided between the first and second bodies 1 and 2. The flexible display device 4 may adhere to the first and second bodies 1 and 2 by using an adhesive unit, e.g., an adhesive, such as, as non-limiting examples, an adhesive or double-sided tape. The third part 4c of the flexible display device 4 is not supported by the first body 1 or the second body 2. That is, the third part 4c does not adhere to the first and second bodies 1 and 2. When the first and second bodies 1 and 2 are in the folded position as shown in FIG. 3, the third part 4c forms a curved portion 4d having a predetermined radius of curvature. Accordingly, because the flexible display device 4 is not sharply bent, but the third part 4c may be bent forming the curved portion 4d or flattened depending on the respective positions of the first and second bodies 1 and 2, and the first and second bodies 1 and 2 may change between the folded position and the unfolded position. As shown in FIGS. 1-3, the foldable device 100 may also include a cover member 5, i.e., a cover, surrounding a connecting portion between the first and second bodies 1 and 2 to prevent the inside of the foldable device 100 from being exposed to the outside. The cover member will be described in more detail below in view of FIG. 5.

The foldable device 100 may be a portable mobile device such as a communication terminal, a game player, a multimedia device, a portable computer, or a photographing apparatus. However, the exemplary embodiments are not limited thereto, and the foldable device 100 may include any device including the first body 1 which supports the first part 4a of the flexible display device 4 and the second body 2 which supports the second part 4b of the flexible display device 4 and which is foldably connected to the first body 1.

Figure 4:
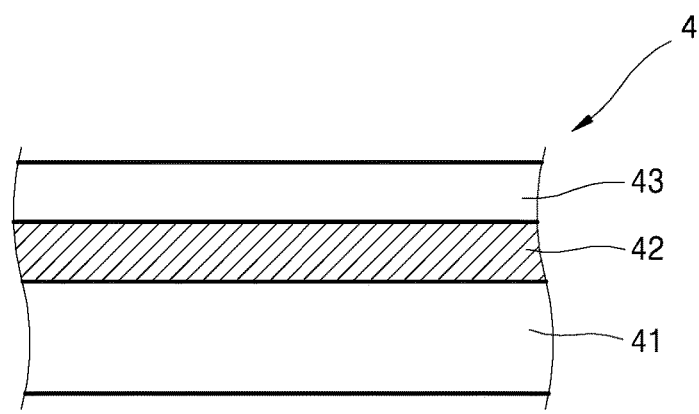
FIG. 4 is a cross-sectional view of a flexible display according to an exemplary embodiment.

FIG. 4 is a cross-sectional view of a flexible display device 4 according to an exemplary embodiment. Referring to FIG. 4, the flexible display device 4 may include a flexible display panel 41 which displays an image and a transparent protective panel 43 which is disposed on an outside surface of the flexible display panel 41. The flexible display panel 41 may be, for example, an organic light-emitting diode (OLED) panel. When the flexible display panel 41 is an OLED panel, an organic emission layer may be disposed between an upper substrate and a lower substrate. A polarization plate may be disposed on the upper substrate from which light is emitted. Also, the flexible display device 4 may further include a touch panel 42 as an input unit, i.e., an input. The touch panel 42 may be disposed between the transparent protective panel 43 and the flexible display panel 41. The flexible display panel 41, the touch panel 42, and the transparent protective panel 43 may be adhered to one another by using, as an example, an optically-clear adhesive (OCA) layer. However, one or more exemplary embodiments are not limited thereto, and the flexible display device 4 may further include various optical panels or optical films.

A processing unit, i.e., a processor or a controller, and an input/output (I/O) unit, i.e., a transceiver or an I/O interface, for performing functions according to the use of the foldable device 100 may be provided within the first and second bodies 1 and 2 or one of the first and second bodies 1 and 2. When the foldable device 100 is a multimedia terminal that provides images and music to a user, the processing unit may include an image/audio information processing unit, e.g., an image/audio processor. When the foldable device 100 is a communication terminal, the processing unit may include a communication module. The I/O unit may include an image/audio I/O unit and a manipulation unit, e.g., an input panel or input buttons, for user manipulation. The manipulation unit may be realized by using the touch panel 42 of the flexible display device 4.

Figure 5:
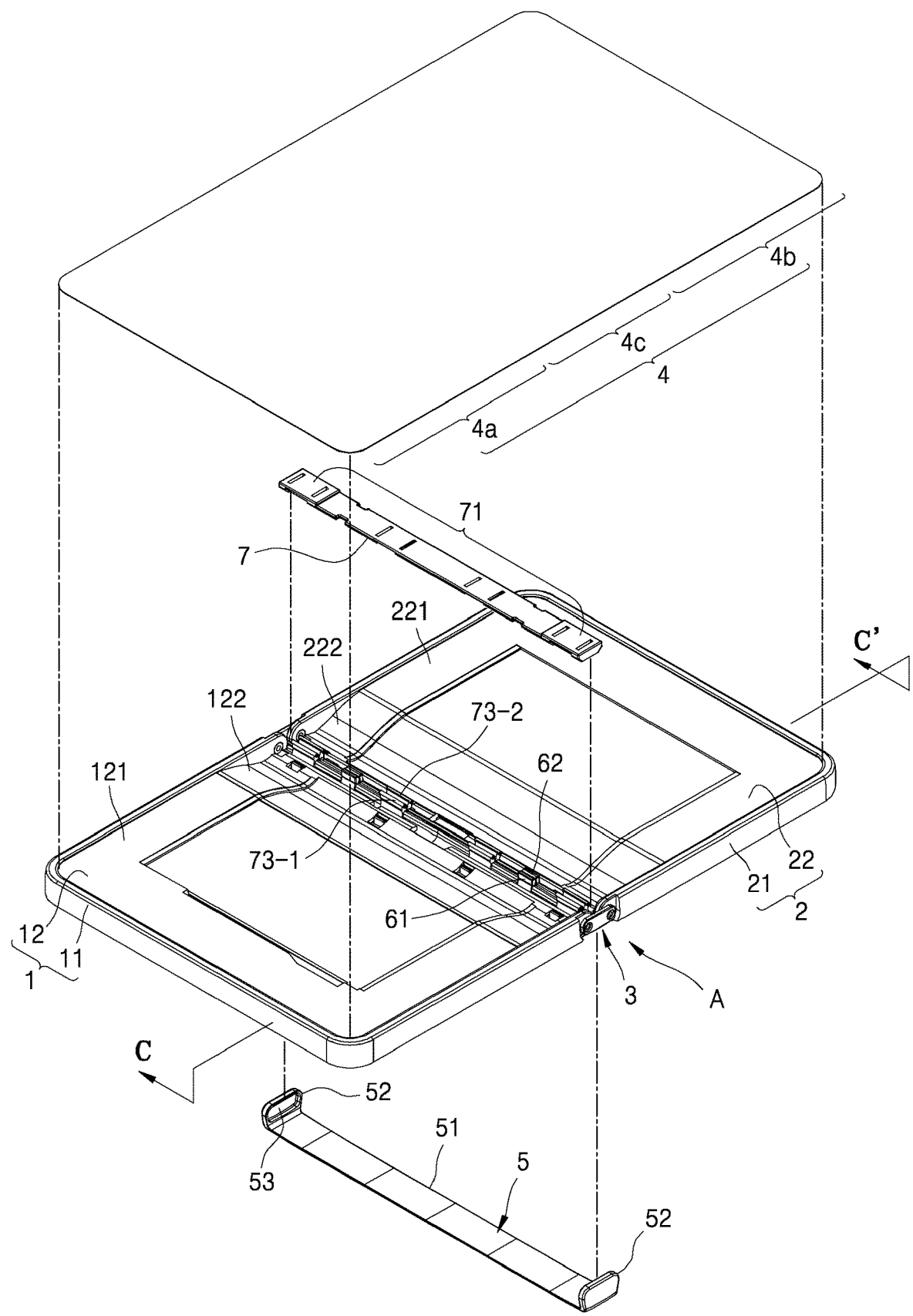
FIG. 5 is an exploded perspective view of a foldable device according to an exemplary embodiment.
Figure 6:
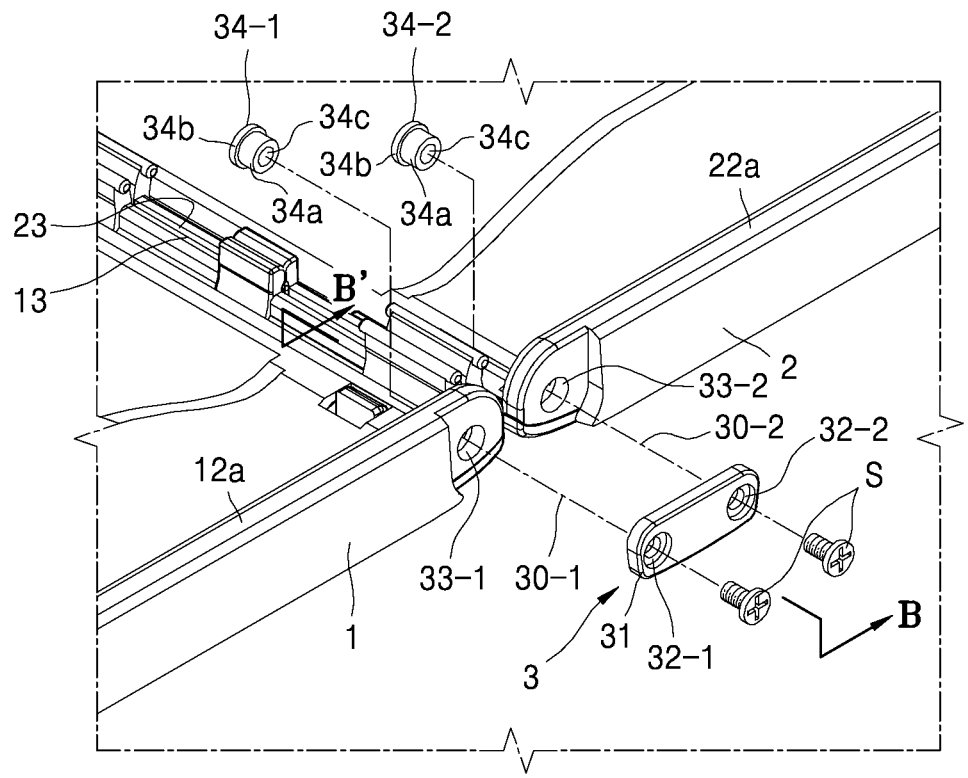
FIG. 6 is a detailed view of a portion "A" of FIG. 5 according to an exemplary embodiment.
Figure 7:
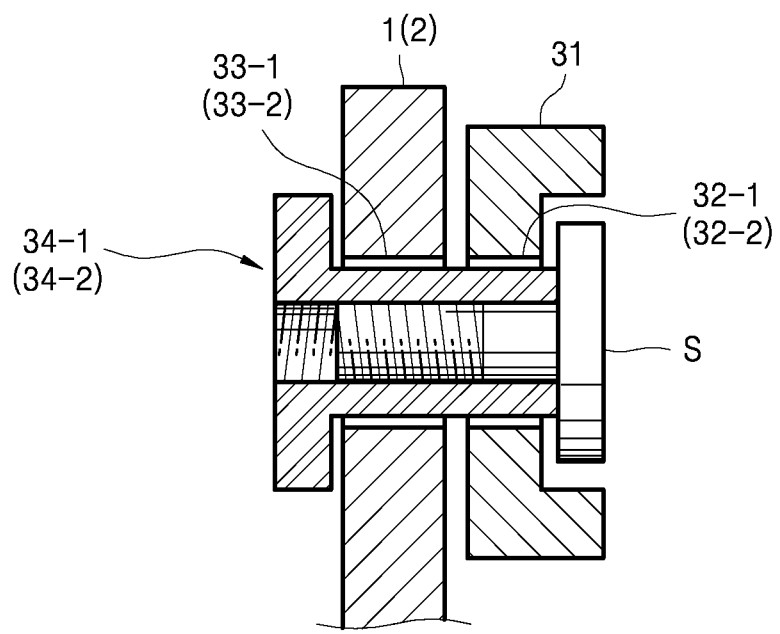
FIG. 7 is a cross-sectional view taken along line B-B' of FIG. 6 according to an exemplary embodiment.

FIG. 5 is an exploded perspective view of a foldable device 100 according to an exemplary embodiment. FIG. 6 is a detailed perspective view illustrating a portion "A" of FIG. 5 according to an exemplary embodiment. FIG. 7 is a cross-sectional view taken along line B-B' of FIG. 6 according to an exemplary embodiment.

Referring to FIG. 5, the first body 1 includes a first base cover 11 and a first frame 12. The first base cover 11 defines an outer appearance of the first body 1. The first frame 12 is disposed within the first base cover 11. The first frame 12 includes a first support 121 that supports the first part 4a of the flexible display device 4 and a first receiver 122 that is inclined downward (i.e., inclined toward in inner portion of the first body 1) from the first support 121. The first receiver 122 corresponds to a portion of the third part 4c of the flexible display device 4. The second body 2 includes a second base cover 21 and a second frame 22. The second base cover 21 defines an outer appearance of the second body 2. The second frame 22 is disposed within the second base cover 21. The second frame 22 includes a second support 221 that supports the second part 4b of the flexible display device 4 and a second receiver 222 that is inclined downward (i.e., inclined toward an inner portion of the second body 2) from the second support 221. The second receiver 222 corresponds to a portion of the third part 4c of the flexible display device 4.

The first and second receivers 122 and 222 face each other when the first and second bodies 1 and 2 are in the folded position of FIG. 3, to form a receiving space in which the curved portion 4d of the display panel 4 is situated. To this end, the first and second receivers 122 and 222 are inclined downward away from the first and second supports 121 and 221 and the third part 4c of the flexible display device 4.

Referring to FIGS. 5 and 6, a connection unit 3, e.g., a connector, connects the first and second bodies 1 and 2 so that the first and second bodies 1 and 2 may be folded. In the foldable device 100 of the exemplary embodiment, the first and second bodies 1 and 2 respectively pivot about two central axes, e.g., first and second central axes, 30-1 and 30-2 that are spaced apart from each other. The connection unit 3 may include a connection bracket 31 in which a pair of first connection holes 32-1 and 32-2 are formed, and a pair of hinge members 34-1 and 34-2, e.g., hinges, that pass through second connection holes 33-1 and 33-2 respectively formed in the first and second bodies 1 and 2 and are inserted into the one pair of first connection holes 32-1 and 32-2. The second connection holes 33-1 and 33-2 may be formed in side walls 12a and 22a of the first and second frames 12 and 22, respectively.

Referring to FIGS. 6 and 7, each of the hinge members 34-1 and 34-2 includes an insertion portion 34a having a cylindrical shape and inserted into the second connection holes 33-1 and 33-2 and a step portion 34b that has a greater outer diameter than that of the insertion portion 34a. The insertion portions 34a provide the central axes 30-1 and 30-2 about which the first and second bodies 1 and 2 pivot. The step portions 34b are supported in the first and second bodies 1 and 2. Screw holes 34c are axially formed in the insertion portions 34a, respectively. When the insertion portions 34a of the hinge members 34-1 and 34-2 pass through the second connection holes 33-1 and 33-2 and are inserted into the first connection holes 32-1 and 32-2, screws S are inserted into the screw holes 34c from the opposite sides of the step portions 34b. Accordingly, the first and second bodies 1 and 2 may be coupled to the connection bracket 31 so that the first and second bodies 1 and 2 may pivot about the insertion portions 34a of the hinge members 34-1 and 34-2. Using this connection structure, the first and second bodies 1 and 2 may be connected to each other in such that they may change between the unfolded position of FIG. 2 and the folded position of FIG. 3.

Figure 8A:
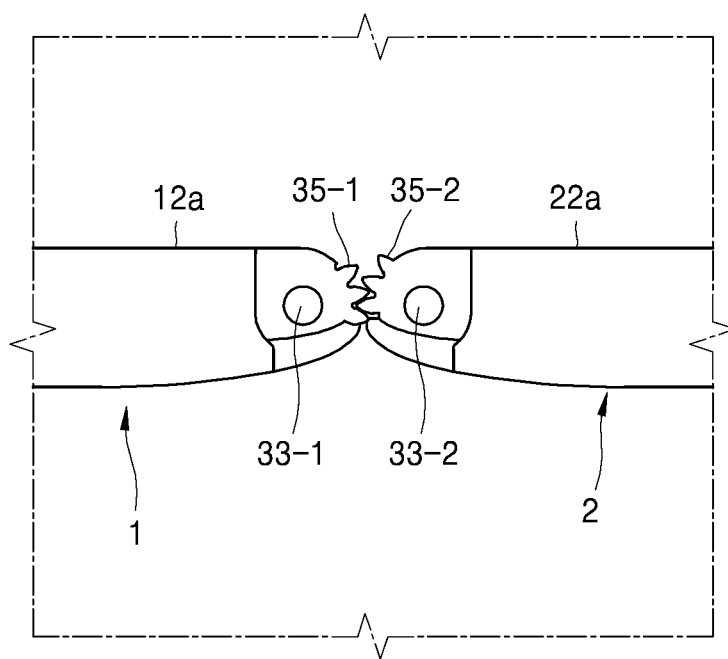
FIG. 8A is a side view of a modified connection structure for foldably connecting first and second bodies according to an exemplary embodiment.

A connection structure for foldably connecting the first and second bodies 1 and 2 is not limited to the connection structure described in reference to FIGS. 6 and 7. For example, FIG. 8A is a side view illustrating a modified connection structure according to an exemplary embodiment. The modified connection structure of FIG. 8A may be obtained by adding a gear structure to the connection structure of FIG. 6. Referring to FIG. 8A, first and second gears 35-1 and 35-2 that engage with each other are provided on side walls 12a and 22a of the first and second frames 12 and 22, respectively. Centers of the first and second gears 35-1 and 35-2 correspond to centers of the second connection holes 33-1 and 33-2, respectively.

Figure 8B:
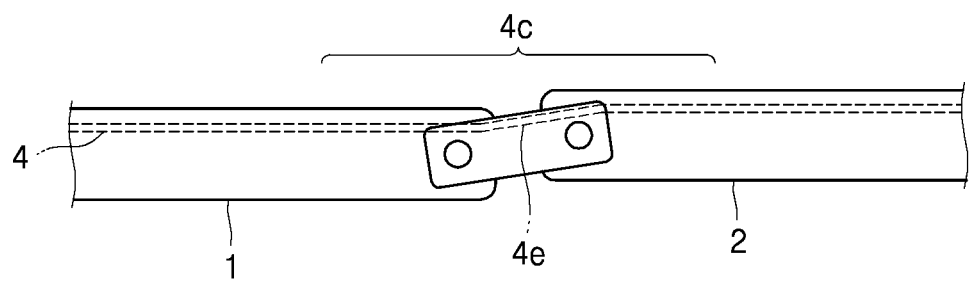
FIG. 8B is a side view illustrating the first and second bodies are misaligned with each other in an unfolded state according to an exemplary embodiment.

In a connection structure not including the first and second gears 35-1 and 35-2, because the first and second bodies 1 and 2 may not synchronously pivot during a folding/unfolding process, the first and second bodies 1 and 2 may be misaligned with each other in an unfolded state of FIG. 8B. The first and second bodies 1 and 2 may be misaligned. The misalignment may be caused by an elastic force of an elastic unit, e.g., a brace, that will be described below. When the first and second bodies 1 and 2 are misaligned with each other, a level difference 4e may occur in the third part 4c of the flexible display device 4. In the connection structure of FIG. 8A, because the first and second gears 35-1 and 35-2 engage with each other, the first and second bodies 1 and 2 synchronously pivot during a folding/unfolding process. Hence, the first and second bodies 1 and 2 are not misaligned with each other during a folding/unfolding process. Also, the elastic unit may operate correctly.

Referring back to FIG. 5, the cover member 5, e.g., the cover, surrounds a connecting portion between the first and second bodies 1 and 2 to prevent the inside of the foldable device 100 from being exposed to the outside. For example, the cover member 5 may include an extending portion 51 that extends along facing edges 13 and 23 (FIG. 6) of the first and second bodies 1 and 2 and side walls 52 that are located on both ends of the extending portion 51. Recesses 53 are formed in inner surfaces of the side walls 52. The recesses 53 are shaped so that a connection bracket 31 may be inserted into each of respective recesses 53. The cover member 5 may be coupled to the first and second bodies 1 and 2 by slightly widening outward the side walls 52 and inserting the connection bracket 31 into the recesses 53. When the first and second bodies 1 and 2 are in the folded position, the facing edges 13 and 23 of the first and second bodies 1 and 2 may be spaced apart from each other, and the inside of the foldable device 100 may be exposed by a space between the facing edges 13 and 23 that are spaced apart from each other. The cover member 5 covers the space between the facing edges 13 and 23 in order to prevent the inside of the foldable device 100 from being exposed. Accordingly, the aesthetics of the foldable device 100 may be improved. Further, the cover member 5 may protect the inside of the foldable device 100 from foreign materials or an impact.

The foldable device 100 may be carried and kept in the folded state of FIG. 3, and changed into the unfolded state of FIG. 2 when in use. In the unfolded state, the third part 4c of the flexible display device 4 may warp downward due to gravity and may be temporarily deformed. Also, when the flexible display device 4 is maintained in the folded state for a long time, the third part 4c may be permanently deformed with a curvature. A plurality of thin-film layers of the flexible display device 4 are adhered to one another by using an adhesive layer. It may take a relatively long time (delay time) for the adhesive layer to change from being bent to being completely flat according to mobility of the adhesive layer. During the delay time, the flexible display device 4 includes a bent portion at the third part 4c. Due to temporary or permanent deformation of the adhesive layer, even when the first and second bodies 1 and 2 unfold, the flexible display device 4 may not be completely flat, thereby obstructing an image displayed on the display device 4.

Figure 9:
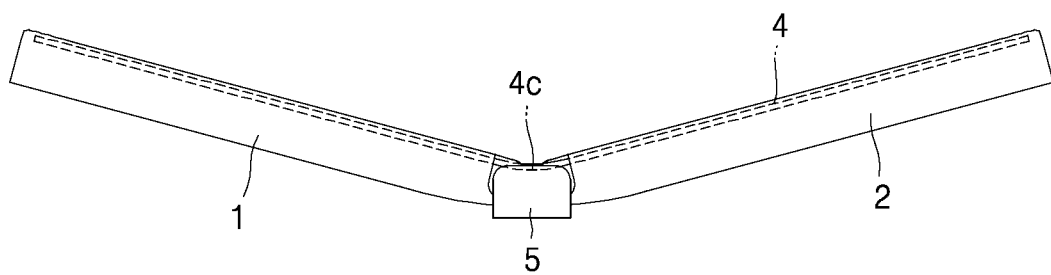
FIG. 9 is a perspective view of a foldable device in a slightly folded state according to an exemplary embodiment.

Also, when the flexible display device 4 fails to be completely spread flat, the first and second bodies 1 and 2 may also fail to completely unfold. Even when a user applies an external force to the first and second bodies 1 and 2 to try to make the first and second bodies 1 and 2 completely unfold, the first and second bodies 1 and 2 may fold slightly as shown in FIG. 9 due to a restoring force caused by the bent portion of the adhesive layer and temporal or permanent deformation of the flexible display device 4. Hence, to use the foldable device 100, a user must apply force to the first and second bodies 1 and 2 to make the first and second bodies 1 and 2 completely unfold or wait until the flexible display device 4 flattens.

According to the foldable device 100 of one or more exemplary embodiments, the elastic unit for applying an elastic force to the first and second bodies 1 and 2 is used in order to maintain the first and second bodies 1 and 2 in a completely unfolded state. In the completely unfolded state, the elastic unit applies an elastic force to the first and second bodies 1 and 2 so that the first and second bodies 1 and 2 are spread flat. Due to the elastic force, a tensile force may be applied to the flexible display device 4 and the third part 4*c* of the flexible display device 4 may be spread flat.

Figure 10:
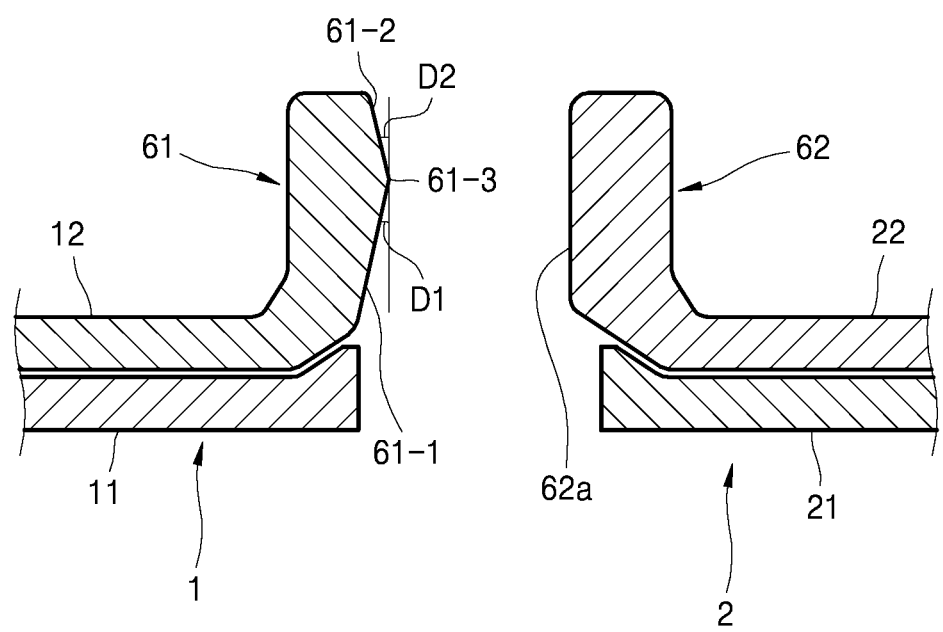
FIG. 10 is a cross-sectional view taken along line C-C' of FIG. 5 according to an exemplary embodiment.
Figure 12A:
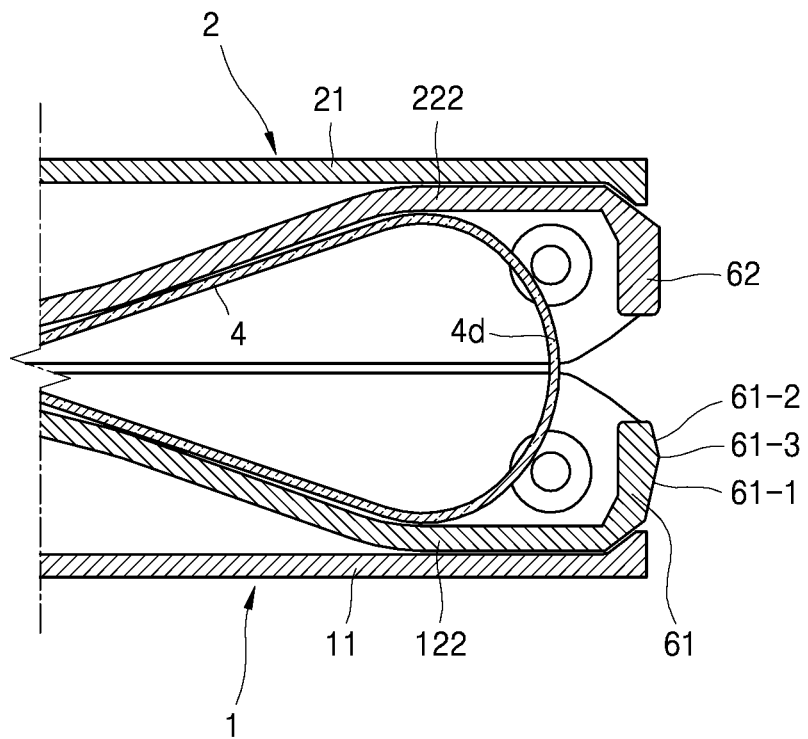
FIG. 12A is a cross-sectional view of a foldable device in a folded state folded position according to an exemplary embodiment.

In an exemplary embodiment, referring to FIGS. 5 and 10, the elastic unit may include an elastic arm 61 that is provided on the first body 1 and a facing arm 62 provided on the second body 2 that faces the elastic arm 61. The elastic arm 61 and the facing arm 62 may be located adjacent to the facing edges 13 and 23 of the first and second bodies 1 and 2, respectively. The elastic arm 61 and the facing arm 62 are spaced apart from each other when the first and second bodies 1 and 2 are in the folded position as shown in FIG. 12A described below in more detail. When the first and second bodies 1 and 2 are in the unfolded position, the elastic arm 61 contacts the facing arm 62 and is elastically deformed, and thus applies an elastic force to the facing arm 62 so that the first and second bodies 1 and 2 are pushed into the unfolded position. Due to the elastic force of the elastic arm 61, the second body 2 is forced to be spaced apart from the first body 1, and thus the third part 4*c* of the flexible display device 4 is spread flat.

The elastic arm 61 and the facing arm 62 may be integrally formed with the first and second base covers 11 and 21 or the first and second frames 12 and 22, respectively. In the exemplary embodiment illustrated in FIG. 5, the elastic arm 61 and the facing arm 62 are integrally formed with the first and second frames 12 and 22, respectively.

FIG. 10 is a cross-sectional view taken along line C-C' of FIG. 5 according to an exemplary embodiment. Referring to FIG. 10, the elastic arm 61 and the facing arm 62 extend from the first and second base covers 11 and 21, respectively, and face each other. The elastic arm 61 includes a first contact portion 61-1 that contacts a facing portion 62*a* of the facing arm 62 when the first and second bodies 1 and 2 are in the unfolded position. The first contact portion 61-1 and the facing portion 62*a* of the exemplary embodiment have planar shapes. The first contact portion 61-1 is inclined at an angle D1 with respect to the facing portion 62*a*. The angle D1 may be determined so that when the first and second bodies 1 and 2 are in the unfolded position and the elastic arm 61 is pushed by the facing arm 62 to be deformed, the first contact portion 61-1 is parallel or substantially parallel to the facing portion 62*a*. Accordingly, when the first and second bodies 1 and 2 are in the unfolded position, the first contact portion 61-1 and the facing portion 62*a* contact each other, and thus the first and second bodies 1 and 2 may be maintained in the unfolded state. At least two portions of the elastic arm 61 may contact the facing portion 62*a* in at least two positions spaced apart from each other in a pivoting direction of the first and second bodies 1 and 2.

Figure 11:
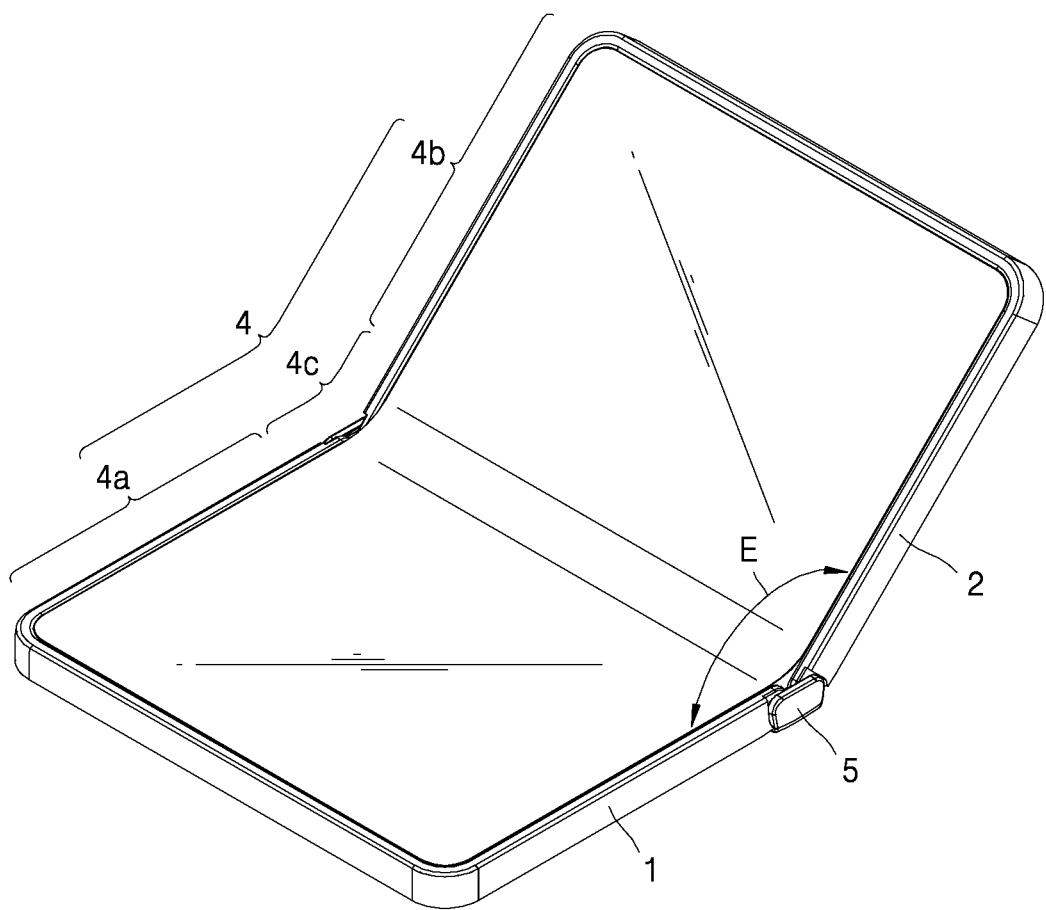
FIG. 11 is a perspective view of a foldable device in a partially folded state according to an exemplary embodiment.

FIG. 11 is a perspective view illustrating a state where the first and second bodies 1 and 2 are stopped at an unfolding angle E according to an exemplary embodiment. Referring to FIG. 11, the first and second bodies 1 and 2 may be stopped in at least one position between the folded position and the completely unfolded position. The unfolding angle E between the first and second bodies 1 and 2 may range from about 90° to about 180°, for example, about 120° in FIG. 11. In the exemplary embodiment, for example, an input unit, i.e., an input, such as a keyboard or an input icon may be displayed on the first part 4*a* of the flexible display device 4 and a screen corresponding to a command input through the input unit may be displayed on the second part 4*b* of the flexible display device 4 or vice versa.

Referring back to FIG. 10, the elastic arm 61 may further include a second contact portion 61-2 that is inclined with respect to the first contact portion 61-1. The second contact portion 61-2 may have a planar shape. The second contact portion 61-2 is inclined at an angle D2 with respect to the facing portion 62*a*. The second contact portion 61-2 is distinguished from the first contact portion 61-1 by a boundary portion 61-3 that is a projection protruding toward the second body 2. The angle D2 may be determined so that when the first and second bodies 1 and 2 are in a position having the unfolding angle E, the second contact portion 61-2 is parallel to the facing portion 62*a*. Accordingly, the second contact portion 61-2 may contact the facing portion 62*a* and the first and second bodies 1 and 2 may be maintained in a partially folded state having the unfolding angle E.

FIGS. 12A, 12B, 12C, and 12D are cross-sectional views illustrating the first and second bodies 1 and 2 in the folded position, the first and second bodies 1 and 2 beginning to unfold, the first and second bodies 1 and 2 being maintained at a predetermined unfolding angle, and the first and second bodies 1 and 2 completely unfolded, respectively. The first and second bodies 1 and 2 folding and unfolding will now be explained with reference to FIGS. 12A through 12D.

Referring to FIG. 12A, when the first and second bodies 1 and 2 are in the folded position, the elastic arm 61 and the facing arm 62 are spaced apart from each other. The curved portion 4*d* of the flexible display device 4 is situated between the first and second receivers 122 and 222.

Figure 12B:
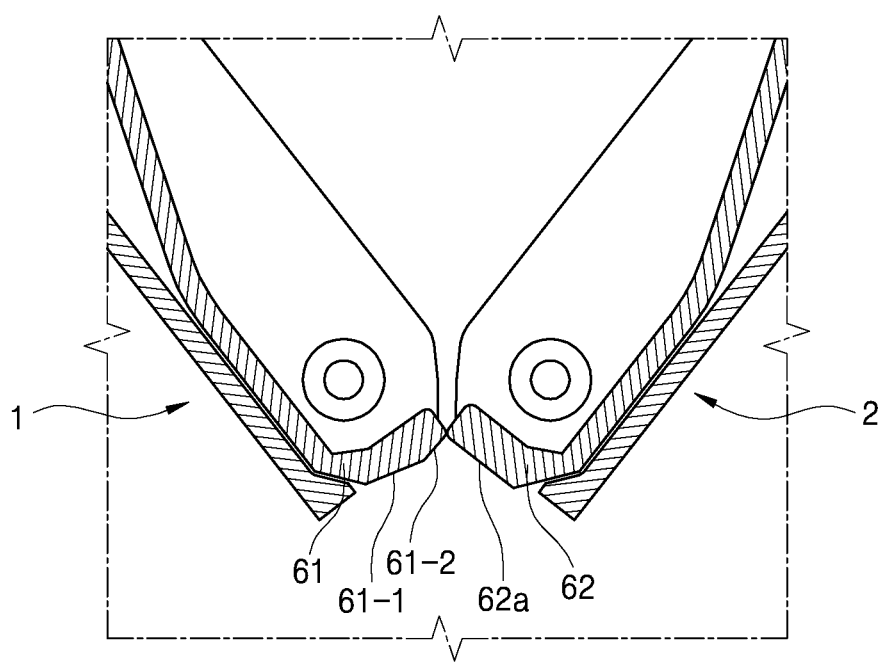
FIG. 12B is a cross-sectional view of a foldable device in an initial unfolded state according to an exemplary embodiment.

When the first and second bodies 1 and 2 begin to unfold, as shown in FIG. 12B, the elastic arm 61 contacts the facing arm 62. When the first and second bodies 1 and 2 further unfold, the elastic arm 61 is pushed by the facing arm 62.

Figure 12C:
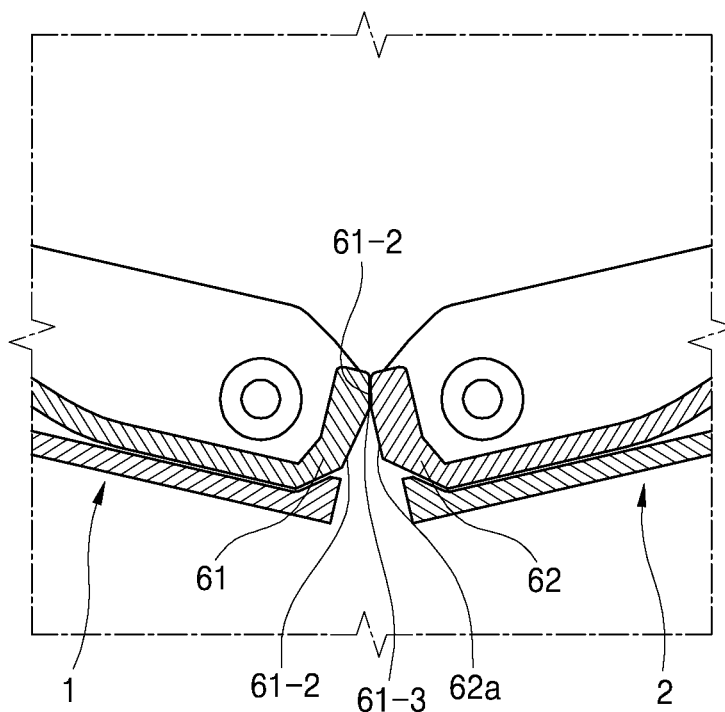
FIG. 12C is a cross-sectional view of a foldable device in a partially folded state according to an exemplary embodiment.

When an angle between the first and second bodies 1 and 2 reaches the unfolding angle E, as shown in FIG. 12C, the second contact portion 61-2 of the elastic arm 61 contacts the facing portion 62*a* of the facing arm 62. The angle between the first and second bodies 1 and 2 may be maintained at the unfolding angle E. Also, even when a force for making the first and second bodies 1 and 2 further unfold or fold from the partially unfolded position is applied to the first and second bodies 1 and 2, unless the angle between the first and second bodies 1 and 2 exceeds an angle at which contact between the second contact portion 61-2 and the facing portion 62*a* completely ends, the first and second bodies 1 and 2 return to the state having the unfolding angle E due to an elastic force of the elastic arm 61.

Figure 12D:
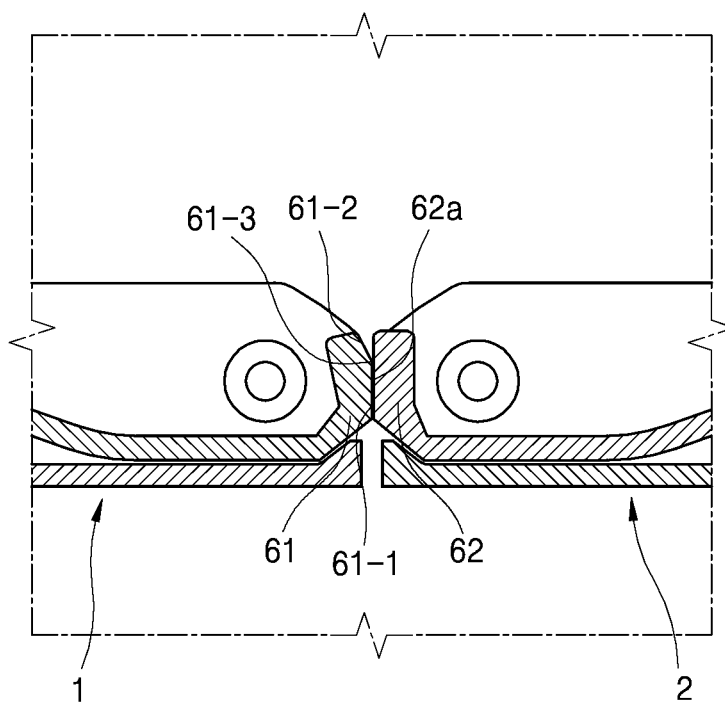
FIG. 12D is a cross-sectional view of a foldable device in an unfolded state according to an exemplary embodiment.

When the first and second bodies 1 and 2 further unfold, contact between the second contact portion 61-2 and the facing portion 62*a* ends, and, as shown in FIG. 12D, the first contact portion 61-1 contacts the facing portion 62*a*. Even when an external force unfolding the first and second bodies 1 and 2 is removed, the first and second bodies 1 and 2 are maintained in the completely unfolded state. Also, even when a force for making the first and second bodies 1 and 2 fold is applied to the first and second bodies 1 and 2, unless the angle between the first and second bodies 1 and 2 exceeds an angle at which contact between the first contact portion 61-1 and the facing portion 62*a* completely ends, the first and second bodies 1 and 2 return to the completely unfolded state due to an elastic force of the elastic arm 61. In this state, the elastic arm 61 elastically contacts the facing arm 62 and applies an elastic force so that the first and second bodies 1 and 2 are pushed apart from each other. Due to the elastic force, the third part 4*c* of the flexible display device 4 is spread flat.

The first and second bodies 1 and 2 that are in the unfolded position of FIG. 12D may be maintained at the unfolding angle E of FIG. 12C and may change to the folded position of FIG. 12A in reverse order.

Because the elastic unit including the elastic arm 61 and the facing arm 62 is used as described above, the third part 4*c* of the flexible display device 4 may be spread flat when the first and second bodies 1 and 2 unfold, and the first and second bodies 1 and 2 may be maintained at the completely unfolded position. Also, the first and second bodies 1 and 2 may also be maintained at the position having the unfolding angle E without additional force applied by the user.

Figure 13:
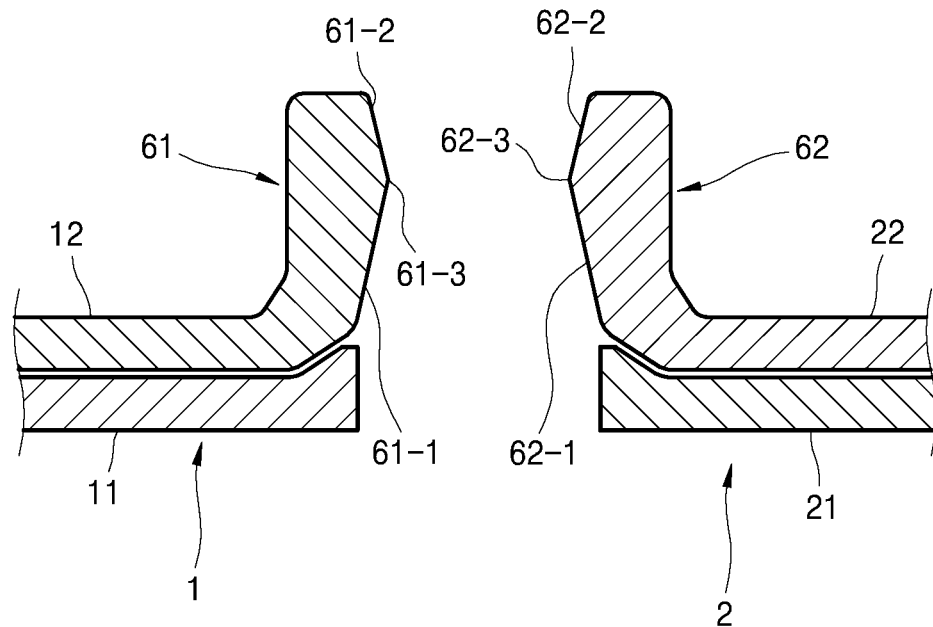
FIG. 13 is a cross-sectional view of an elastic unit according to an exemplary embodiment.

FIG. 13 is a cross-sectional view illustrating an elastic unit according to an exemplary embodiment. Referring to FIG. 13, the facing arm 62 may contact the elastic arm 61 and may be elastically deformed. Hereinafter, the elastic arm 61 and the facing arm 62 are respectively referred to as a first elastic arm 61 and a second elastic arm 62. The first elastic arm 61 of the exemplary embodiment has the same characteristics as the elastic arm 61 of FIG. 9. The second elastic arm 62 may be integrally formed with the second frame 22 of the second body 2. The facing portion 62*a* may include first and second facing portions 62-1 and 62-2 having planar shapes and respectively corresponding to the first and second contact portions 61-1 and 61-2. The second facing portion 62-2 is distinguished from the first facing portion 62-1 by a boundary portion 62-3. When the first and second bodies 1 and 2 are in the position having the unfolding angle E of FIG. 10, the second contact portion 61-2 and the second facing portion 62-2 contact each other, and the first and second elastic arms 61 and 62 are elastically deform each other. When the first and second bodies 1 and 2 are in the completely unfolded position, the first contact portion 61-1 and the first facing portion 62-1 may contact and push each other, the flexible display device 4 may be spread flat, and the first and second bodies 1 and 2 may be maintained in the completely unfolded position.

Figure 14:
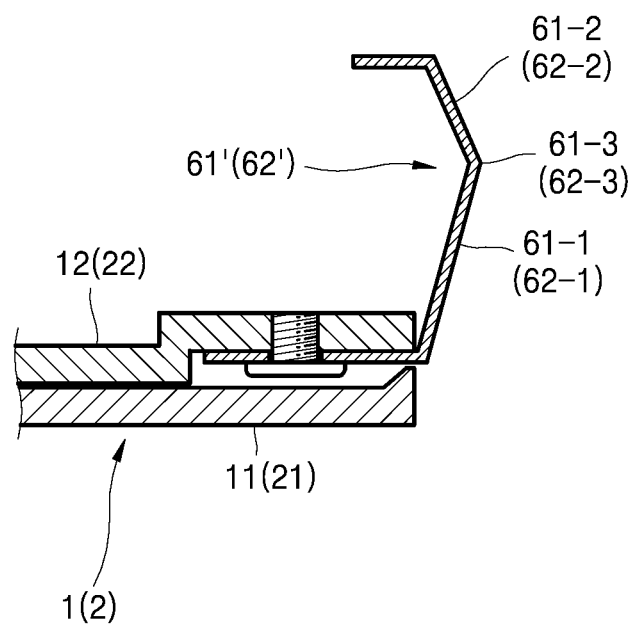
FIG. 14 is a cross-sectional view of an elastic unit according to an exemplary embodiment.

Although the first and second elastic arms 61 and 62 are integrally formed with the first and second bodies 1 and 2, one or more exemplary embodiments are not limited thereto. For example, FIG. 14 is a cross-sectional view illustrating an elastic unit according to an exemplary embodiment. As shown in FIG. 14, a first elastic arm 61' having a leaf spring shape and including the first and second contact portions 61-1 and 61-2 may be coupled, for example, to the first frame 12 of the first body 1. Also, a second elastic arm 62' having a leaf spring shape and including the first and second facing portions 62-1 and 62-2 may be coupled to, for example, the second frame 22 of the second body 2.

Figure 15:
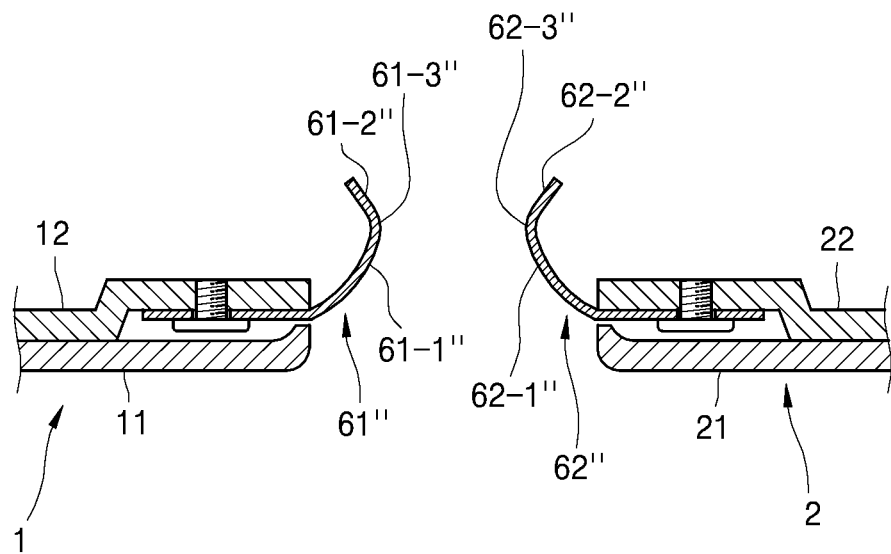
FIG. 15 is a cross-sectional view of an elastic unit according to an exemplary embodiment.

Although the first and second contact portions 61-1 and 61-2 and the first and second facing portions 62-1 and 62-2 having planer shapes are used as the elastic unit, one or more exemplary embodiments are not limited thereto. The first and second contact portions 61-1 and 61-2 or both the first and second contact portions 61-1 and 61-2 and the first and second facing portions 62-1 and 62-2 may have, for example, curved shapes. FIG. 15 is a cross-sectional view illustrating an elastic unit according to an exemplary embodiment.

Referring to FIG. 15, an elastic arm (first elastic arm) 61" including first and second contact portions 61-1" and 61-2" having curved shapes, has a leaf spring shape, and is coupled to the first frame 12. The first and second contact portions 61-1" and 61-2" are distinguished from each other by a boundary portion 61-3". A facing arm (second elastic arm) 62" including first and second facing portions 62-1" and 62-2" having curved shapes respectively corresponding to the first and second contact portions 61-1" and 61-2", respectively, has a leaf spring shape, and is coupled to the second frame 22. The first and second facing portions 61-2" and 62-2" are distinguished from each other by a boundary portion 62-3".

Figure 16A:
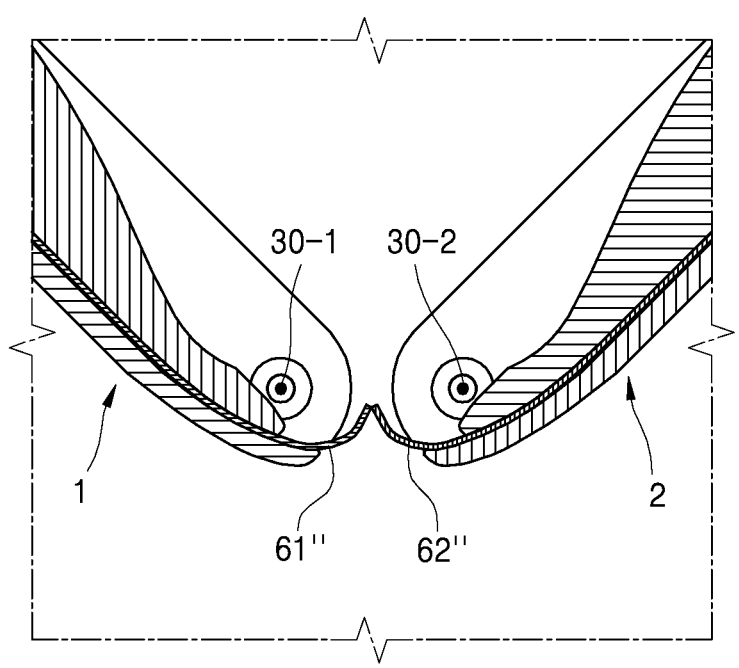
FIG. 16A is a cross-sectional view of an initial unfolded state of a foldable device according to an exemplary embodiment.
Figure 16B:
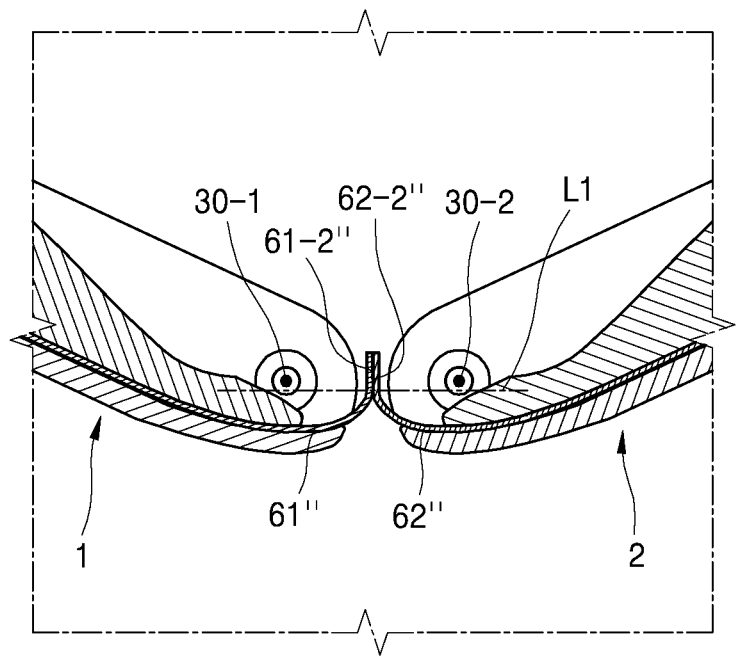
FIG. 16B is a cross-sectional view of a partially unfolded state of a foldable device according to an exemplary embodiment.
Figure 16C:
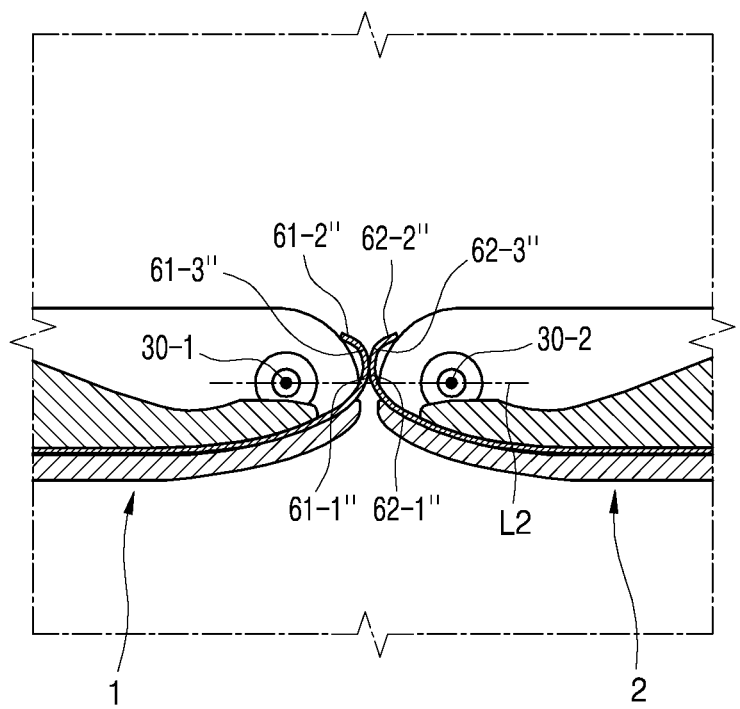
FIG. 16C is a cross-sectional view of a foldable device in a folded state according to an exemplary embodiment.

FIGS. 16A, 16B, and 16C are cross-sectional views illustrating an initial the first and second bodies 1 and 2 beginning to unfold (FIG. 16A), the first and second bodies 1 and 2 maintained at a predetermined angle (FIG. 16B), and the first and second bodies 1 and 2 are completely unfolded (FIG. 16C). How the first and second bodies 1 and 2 fold and unfold will now be explained with reference to FIGS. 16A through 16C.

When the first and second bodies 1 and 2 are in a folded position, the elastic arm 61" and the facing arm 62" are spaced apart from each other similar to the exemplary embodiment described in FIG. 12A. When the first and second bodies 1 and 2 begin to unfold, as shown in FIG. 16A, the elastic arm 61" contacts the facing arm 62". When the first and second bodies 1 and 2 further unfold, the elastic arm 61" is pushed by the facing arm 62". Similarly, the facing arm 62" is pushed by the elastic arm 61".

When an angle between the first and second bodies 1 and 2 reaches the unfolding angle E, as shown in FIG. 16B, the second contact portion 61-2" contacts the second facing portion 62-2". Because a line L1 along which an elastic force is applied due to deformation of the elastic arm 61" and the facing arm 62" is under the central axes 30-1 and 30-2 of the first and second bodies 1 and 2, the elastic force is applied so that the first and second bodies 1 and 2 fold. However, a stiffness of the flexible display device 4 and the elastic force applied due to the deformation of the elastic arm 61" and the facing arm 62" are balanced, and the angle between the first and second bodies 1 and 2 is maintained at the unfolding angle E. Even when the first and second bodies 1 and 2 further unfold, unless the first and second bodies 1 and 2 unfold at an angle exceeding the boundary portions 61-3" and 62-3", the first and second bodies 1 and 2 return to the unfolding angle E due to the elastic force of the elastic arm 61" and the facing arm 62".

When the first and second bodies 1 and 2 further unfold past the unfolding angle E, the first contact portion 61-1" contacts the first facing portion 62-2" (FIG. 16C). Because a line L2 along which an elastic force is applied due to deformation of the elastic arm 61" and the facing arm 62" is over the central axes 30-1 and 30-2 of the first and second bodies 1 and 2, the elastic force is applied so that the first and second bodies 1 and 2 remain unfolded. Hence, the third part 4*c* of the flexible display device 4 is spread flat due to the elastic force and the first and second bodies 1 and 2 are maintained in the completely unfolded state. Even when a force for making the first and second bodies 1 and 2 fold is applied, unless the first and second bodies 1 and 2 fold at an angle exceeding the boundary portions 61-3" and 62-3", the first and second bodies 1 and 2 return to the completely unfolded state due to the elastic force of the elastic arm 61" and the facing arm 62".

According to the connection structure including the first and second gears 35-1 and 35-2 of FIG. 8A, the first and second bodies 1 and 2 synchronously pivot during a folding/unfolding process. Hence, the elastic arm 61' or 61" and the facing arm 62' or 62" may be symmetric about a center of a line that connects the central axes 30-1 and 30-2 of the first and second bodies 1 and 2. Hence, the elastic arm 61' or 61" and the facing arm 61' or 61" may not be misaligned, and thus may be elastically deformed in desired directions.

Figure 17:
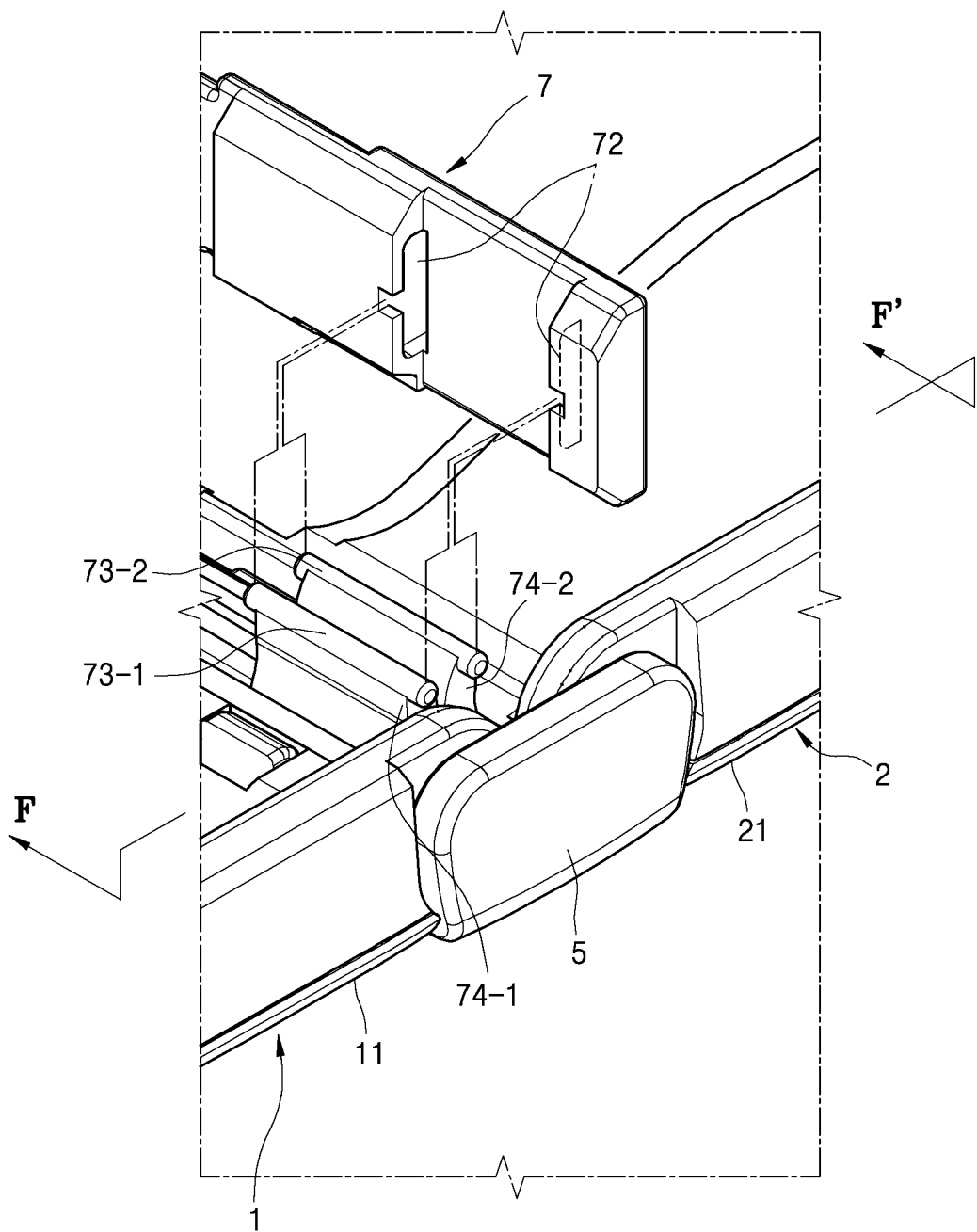
FIG. 17 is an exploded perspective view illustrating a movable support member between a support position and a retreat position according to an exemplary embodiment.

FIG. 17 is an exploded perspective view of a movable support member 7 between a support position and a retreat position according to an exemplary embodiment. In order to make the third part 4c of the flexible display device 4 spread flat when the first and second bodies 1 and 2 are in the unfolded position, the foldable device 100 may further include the movable support member 7. The movable support member 7 includes a movable support 71 that supports the third part 4c of the flexible display device 4. The movable support member 7 is in the support position where the movable support 71 supports the third part 4c of the flexible display device 4 when the first and second bodies 1 and 2 are in the unfolded position. The movable support member 7 supports the third part 4c of the flexible display device 4 between the first and second receivers 122 and 222. When the first and second bodies 1 and 2 change to the folded position, the movable support member 7 is in the retreat position to form the receiving space of the curved portion 4d. That is, the movable support member 7 moves between the retreat position and the support position as the first and second bodies 1 and 2 change between the folded position and the unfolded position. As such, when the first and second bodies 1 and 2 are in the unfolded position, because the third part 4c of the flexible display device 4 is supported by the movable support member 7, the third part 4c may be spread flat when the first and second bodies 1 and 2 are in the unfolded position.

Referring to FIG. 17, in more detail, slots 72 that extend in a widthwise direction of the movable support member 7 are formed in the movable support member 7. A pair of guide portions 73-1 and 73-2 that are inserted into the slots 72, and are formed around facing edges 13 and 23 of the first and second bodies 1 and 2 adjacent to the connection unit 3. For example, the guide portions 73-1 and 73-2 may be respectively provided on upper ends of ribs 74-1 and 74-2 that extend upward (i.e., toward an inner portion of the respective first and second bodies 1 and 2 from the first and second frames 12 and 22.

Figure 18A:
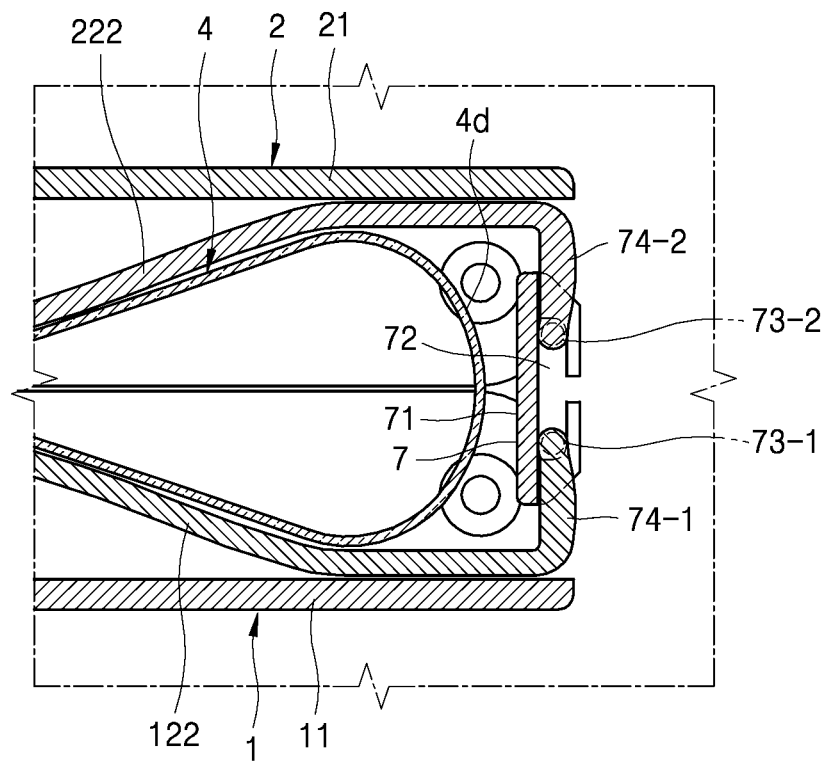
FIG. 18A is a cross-sectional view taken along line F-F' of FIG. 17, illustrating the movable support member in the support position according to an exemplary embodiment.
Figure 18B:
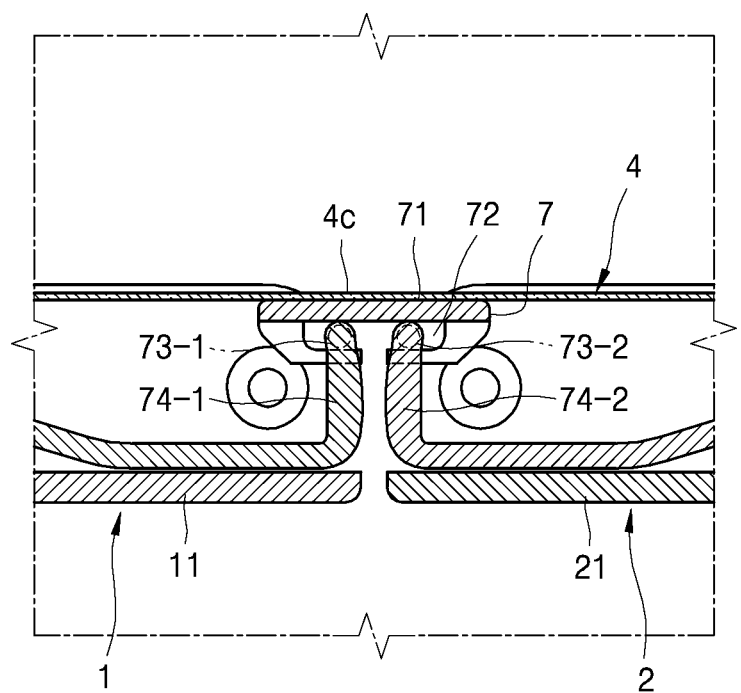
FIG. 18B is a cross-sectional view taken along line F-F' of FIG. 17, illustrating the movable support member in the retreat position according to an exemplary embodiment.

FIGS. 18A and 18B are cross-sectional views taken along line F-F' of FIG. 17, illustrating a movable support member 7 in a support position (FIG. 18B) and a retreat position (FIG. 18A), respectively, according to an exemplary embodiment. Referring to FIG. 18A, the first and second bodies 1 and 2 are in the folded position. The guide portions 73-1 and 73-2 are farthest away from each other, and the movable support member 7 is in the retreat position. The curved portion 4d of the flexible display device 4 is received in a space formed by the first and second receivers 122 and 222 and the movable support member 7.

In the state of FIG. 18A, when the first and second bodies 1 and 2 unfold, the guide portions 73-1 and 73-2 slide into respective outer ends of the slots 72 to approach each other and the movable support member 7 is raised toward the flexible display device 4. When the first and second bodies 1 and 2 are completely unfolded, as shown in FIG. 18B, the movable support member 7 is in the support position and the third part 4c of the flexible display device 4 is supported by the movable support 71.

In the exemplary embodiment, when the first and second bodies 1 and 2 are in the unfolded position, the third part 4c of the flexible display device 4 may be supported and may be spread flat. Also, when the first and second bodies 1 and 2 are in the folded position, a space in which the curved portion 4 may be received may be secured due to retreat from the flexible display device 4.

According to the connection structure including the first and second gears 35-1 and 35-2 of FIG. 8A, the first and second bodies 1 and 2 synchronously pivot during a folding/unfolding process. Hence, the movable support member 7 may be stably elevated without being inclined to either side during the folding/unfolding process. When the first and second bodies 1 and 2 are in the unfolded position, the movable support 71 of the movable support member 7 may evenly support the third part 4c of the flexible display device 4.

Figure 19A:
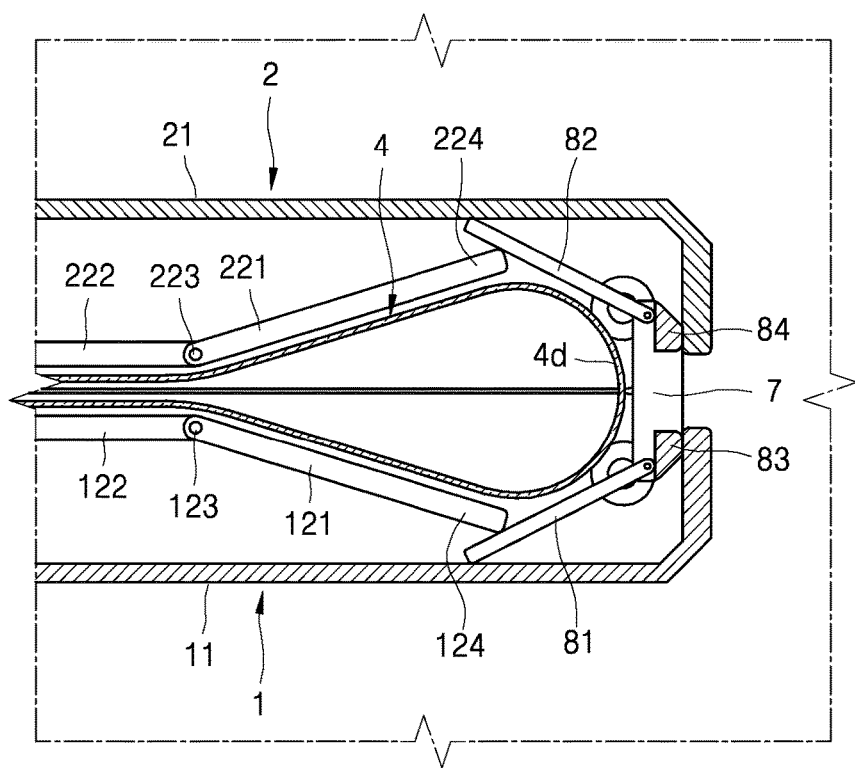
FIG. 19A is a side view of a foldable device in a folded position according to an exemplary embodiment.
Figure 19B:
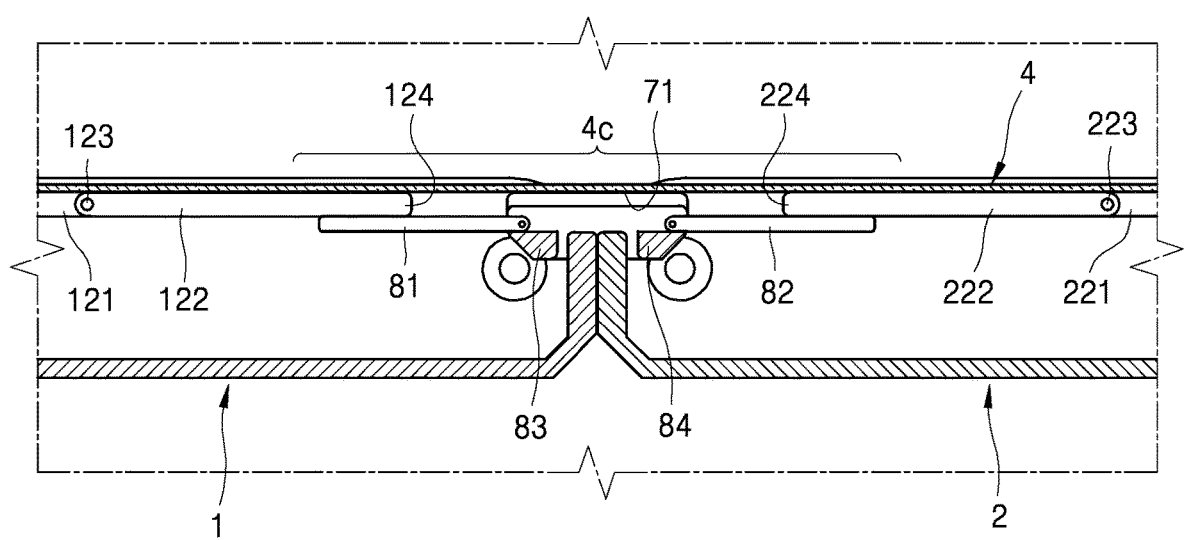
FIG. 19B is a side view of a foldable device in an unfolded state unfolded position according to an exemplary embodiment.

Portions of the third part 4c of the flexible display device 4 corresponding to the first and second receivers 122 and 222 between the first and second supports 121 and 221 and the movable support member 7 may not be supported by another member when the first and second bodies 1 and 2 are in the unfolded position. For example, FIGS. 19A and 19B are side views illustrating a foldable device 100 according to an exemplary embodiment. FIG. 19A illustrates a state where the first and second bodies 1 and 2 are in the folded position. FIG. 19B illustrates a state where the first and second bodies 1 and 2 are in the unfolded position. Referring to FIGS. 19A and 19B, the first and second receivers 122 and 222 are pivotably coupled to the first and second supports 121 and 221. When the first and second bodies 1 and 2 are in the folded position, the second receivers 122 and 222 are in a first position retreated from the flexible display device 4 in order to receive the curved portion 4d of the flexible display device 4. When the first and second bodies 1 and 2 are in the unfolded position, the first and second receivers 122 and 222 are in a second position that supports the third part 4c of the flexible display device 4. The first and second receivers 122 and 222 pivot between the first position and the second position as the first and second bodies 1 and 2 change between the folded position and the unfolded position. The first and second receivers 122 and 222 move between the first and second positions as the movable support member 7 moves. Pivot levers 81 and 82 for moving the first and second receivers 122 and 222 between the first and second positions may be provided on the movable support member 7. The pivot levers 81 and 82 are formed so that one end portions of the pivot levers 81 and 82 are pivotably supported on the movable support member 7 and the other end portions of the pivot levers 81 and 82 are connected to or in contact with the first and second receivers 122 and 222.

Referring to FIG. 19A, when the first and second bodies 1 and 2 are in the folded position, the movement support member 7 is in the retreat position. The curved portion 4d is formed in the third part 4c of the flexible display device 4 and the first and second receivers 122 and 222 are in the first position due to an elasticity of the curved portion 4d.

When the first and second bodies 1 and 2 unfold, the movable support member 7 approaches the flexible display device 4. As the movable support member 7 approaches the flexible display device 4, distal end portions 124 and 224 of hinges 123 and 223 of the first and second receivers 122 and 222 are slowly raised, due to the first and second pivot levers 81 and 82, and approach the flexible display device 4.

As shown in FIG. 19B, when the first and second bodies 1 and 2 reach the unfolded position, the movable support member 7 reaches the support position and the first and second receivers 122 and 222 are pushed by the first and second pivot levers 81 and 82 to pivot about the hinges 123 and 223 and to be in the second position. In this state, because the first and second pivot levers 81 and 82 are supported by stoppers 83 and 84 that are provided on the movable support member 7, the first and second pivot levers 81 and 82 no longer pivot. Accordingly, the first and second receivers 122 and 222 are not spaced apart from the flexible display device 4 and are in the second position. The movable support member 7 supports the third part 4c of the flexible display device 4 between the first and second receivers 122 and 222.

When the first and second bodies 1 and 2 are folded, the movable support member 7 begins to move away from the flexible display device 4 and the first and second pivot levers 81 and 82 are also moved away from the flexible display device 4. In the exemplary embodiment, the curved portion 4d is slowly formed in the third part 4c of the flexible display device 4 and the first and second receivers 122 and 222 are pushed by the curved portion 4d to pivot about the hinges 123 and 223 toward the first position. Accordingly, a space in which the curved portion 4d is received is formed in the first and second bodies 1 and 2. When the first and second bodies 1 and 2 reach the position of FIG. 19A, the movable support member 7 reaches the retreat position and the first and second receiving positions 122 and 222 reach the first position.

In the exemplary embodiment, when the first and second bodies 1 and 2 are in the unfolded position, because the third part 4c of the flexible display device 4 is supported by the movable support member 7 and the first and second receivers 122 and 222, the flexible display device 4 may be stably supported. Also, the third part 4c of the flexible display device 4 may be spread flat.

In order to reduce a compressive force or a tensile force applied to the flexible display device 4 during a folding/unfolding process, the first part 4a and/or the second part 4b of the flexible display device 4 may not be bound to the first and second bodies 1 and 2.

Figure 20:
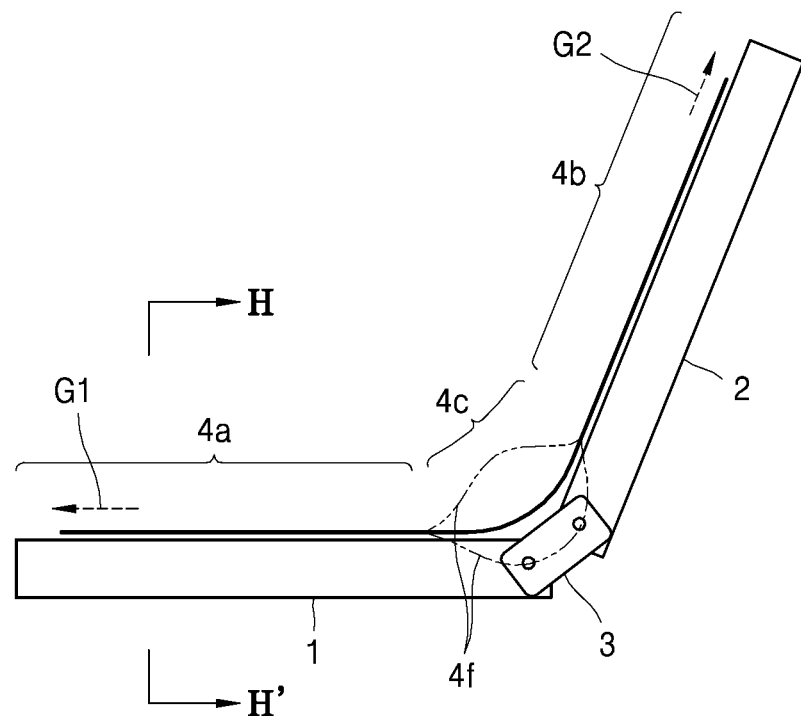
FIG. 20 is a side view of a foldable device according to an exemplary embodiment.
Figure 21:
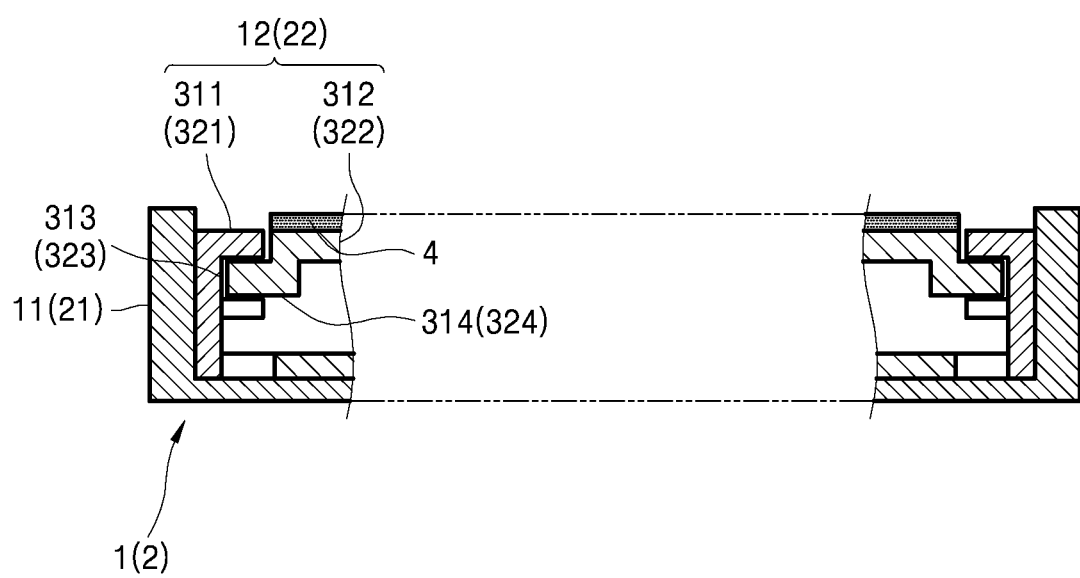
FIG. 21 is a cross-sectional view taken along line H-H' of FIG. 20 according to an exemplary embodiment.

FIG. 20 is a side view of a foldable device 100 according to an exemplary embodiment. FIG. 21 is a cross-sectional view taken along line H-H' of FIG. 20 according to an exemplary embodiment. Referring to FIG. 20, the first part 4a or the second part 4b may be supported by the first or second body 1 or 2 to move in directions G1 and G2. For example, referring to FIG. 21, the first frame 12 may include a fixed frame 311 that is fixed to the base cover 11 and a movable frame 312 that is provided on the fixed frame 311 to slide in the directions G1 and G2. A first rail 314 may be provided on the movable frame 312, and a second rail 313 in which the first rail 314 is inserted and slides may be provided on the fixed frame 311. Elements of the connection unit 3, elements of the elastic unit, and the first receiver 122 may be provided on the fixed frame 311. The first support 121 that supports the first part 4a of the flexible display device 4 may be provided on the movable frame 312.

In the exemplary embodiment, because the first part 4a of the flexible display device 4 acts as a free end during a folding/unfolding process, a compressive force or a tensile force applied to the flexible display device 4 may be reduced. Also, the possibility that the third part 4c of the flexible display device 4 is deformed to have a concave or convex shape 4f of FIG. 20 may be reduced.

The second part 4b of the flexible display device 4 may also act as a free end. To this end, as shown in FIG. 21, the second frame 22 may include a fixed frame 321 that is fixed to the base cover 21 and a movable frame 322 that is provided on the fixed frame 321 to slide in the directions G1 and G2. A second rail 323 may be provided on the fixed frame 321, and a first rail 324 into which the second rail 323 is inserted may be provided on the movable frame 322. Elements of the connection unit 3, elements of the elastic unit, and the second receiver 222 may be provided on the fixed frame 321. The second support 221 that supports the second part 4b of the flexible display device 4 may be provided on the movable frame 322.

Figure 22:
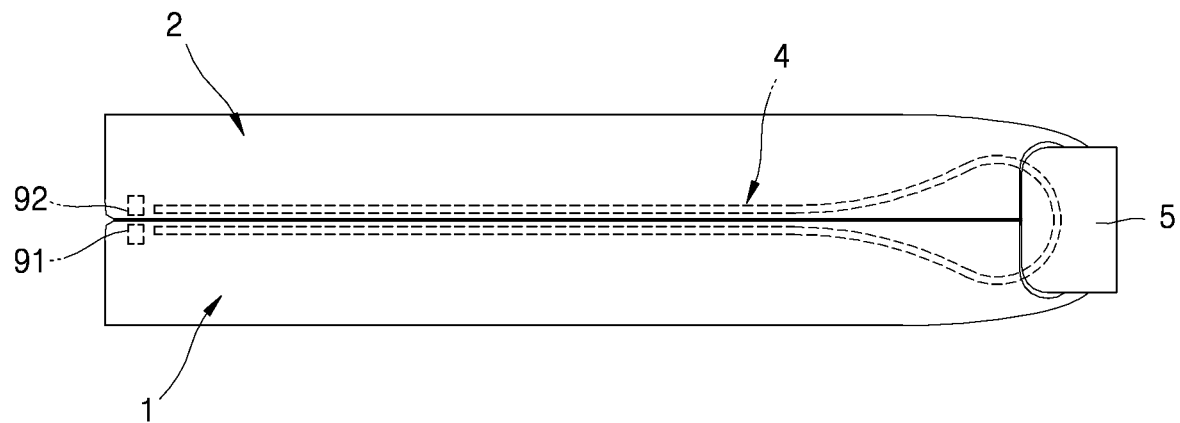
FIG. 22 is a side view of a foldable device according to an exemplary embodiment.
Figure 23:
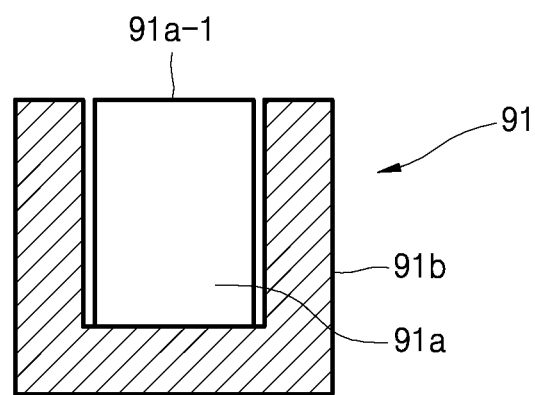
FIG. 23 is a cross-sectional view of a magnetic member according to an exemplary embodiment.

Because the flexible display device 4 is elastic, even when the first and second bodies 1 and 2 are folded, the first and second bodies 1 and 2 may not completely folded due to a restoring force of the curved portion 4d of the flexible display device 4. The foldable device 100, according to one or more exemplary embodiments, may maintain the first and second bodies 1 and 2 in the folded position due to a magnetic force. For example, FIG. 22 is a side view illustrating a foldable device 100 according to an exemplary embodiment and FIG. 23 is a cross-sectional view of a magnetic member 91, e.g., a magnet, according to an exemplary embodiment. Referring to FIG. 22, the magnetic member 91 is provided in the first body 1, and an attachment member 92 that faces the magnetic member 91 at the folded position and is attracted to the magnetic member 91 due to a magnetic force is provided in the second body 2.

In the exemplary embodiment, because the magnetic member 91 and the attachment member 92 are attracted to each other when the first and second bodies 1 and 2 are in the folded position, the first and second bodies 1 and 2 may be maintained in the folded position, thereby improving portability and storage of the foldable device 100.

Referring to FIG. 23, the magnetic member 91 may include a magnet 91a and a magnetic shielding member 91b, e.g., a magnetic shield, that surround surfaces of the magnet 91a other than a surface 91a-1a that faces the attachment member 92 in the folded state. The magnetic shielding member 91b may be, for example, a ferromagnetic member. In the exemplary embodiment, a magnetic force of the magnet 91a may not affect neighboring electrical and electronic circuits. Because the magnetic shielding member 91b functions as a yoke of a magnetic circuit, the magnetic shielding member 91b may concentrate a magnetic force of the magnet 91a towards the attachment member 92 to increase a magnetic force. The magnet 91a may be a permanent magnet.

The attachment member 92 may be formed of any material which may be attracted to the magnetic member 91. For example, the attachment member 92 may be formed of a metal. Also, the attachment member 92 may have a similar structure as that of the magnetic member 91 of FIG. 23.

As described above, the foldable device 100 may be used at the unfolded position (see FIG. 1). Also, as shown in FIG. 11, the foldable device 100 may be used at the position having the unfolding angle E between the folded position and the unfolded position of the first and second bodies 1 and 2. In the exemplary embodiment, when the third part 4c of the flexible display device 4 fails to have a natural curved shape and is bent to have the concave or convex shape 4f of FIG. 20, a screen displayed on the third part 4c may be distorted. Because the first part 4a or the second part 4b of the flexible display device 4 is supported on the first body 1 or the second body 2 to slide in the folding/unfolding direction (or a longitudinal direction L), the third part 4c may have a natural curved shape.

Figure 24:
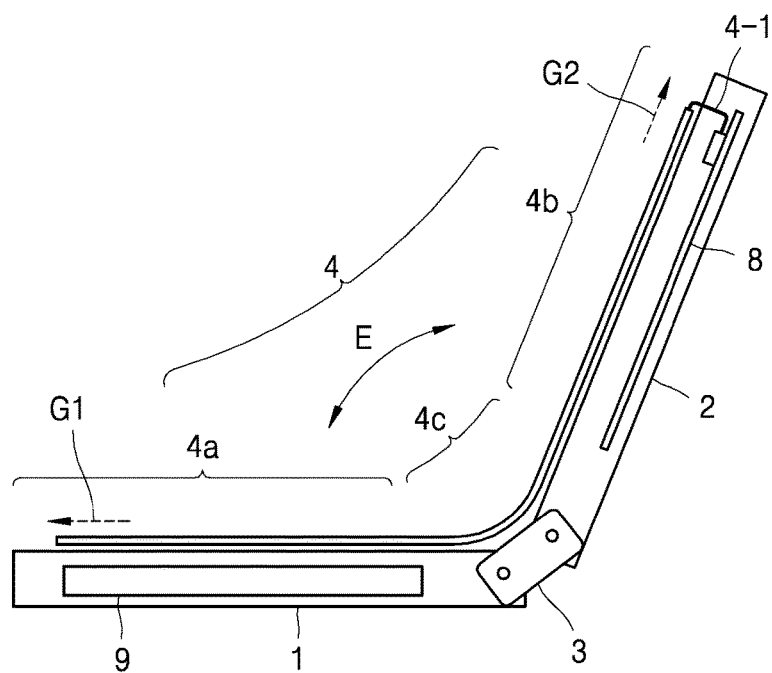
FIG. 24 is a side view of a foldable device according to an exemplary embodiment.

FIG. 24 is a side view illustrating a foldable device 100 according to an exemplary embodiment. Referring to FIG. 24, the first part 4a of the flexible display device 4 is supported on the first body 1 to slide in the directions G1 and G2 and the second part 4b is fixed to the second body 2. The foldable device 100 includes at least one electrical circuit member, e.g., an electrical circuit, for operating the flexible display device 4. The electrical circuit member may include a controller 8 that controls an operation of the foldable device 100 and a battery 9 that supplies power to the flexible display device 4 and the controller 8.

The controller 8 may be provided as a circuit board including a processing unit, e.g., a processor, that controls functions and processes of the foldable device 100. The flexible display device 4 includes a signal line 4-1 that is connected to the controller 8. The signal line 4-1 may be, for example, a flexible printed circuit board (PCB). The controller 8 is disposed in the second body 2, and the signal line 4-1 is provided to the second part 4b of the flexible display device 4 in the exemplary embodiment. Because the second part 4b is fixed to the second body 2, even when the foldable device 100 changes between the folded position and the unfolded position, the signal line 4-1 and the controller 8 are stably connected to each other. The battery 9 is disposed in the first body 1 and is connected to the controller 8 through a power supply line. Power may be supplied to the flexible display device 4 through the controller 8 and the signal line 4-1.

Figure 25:
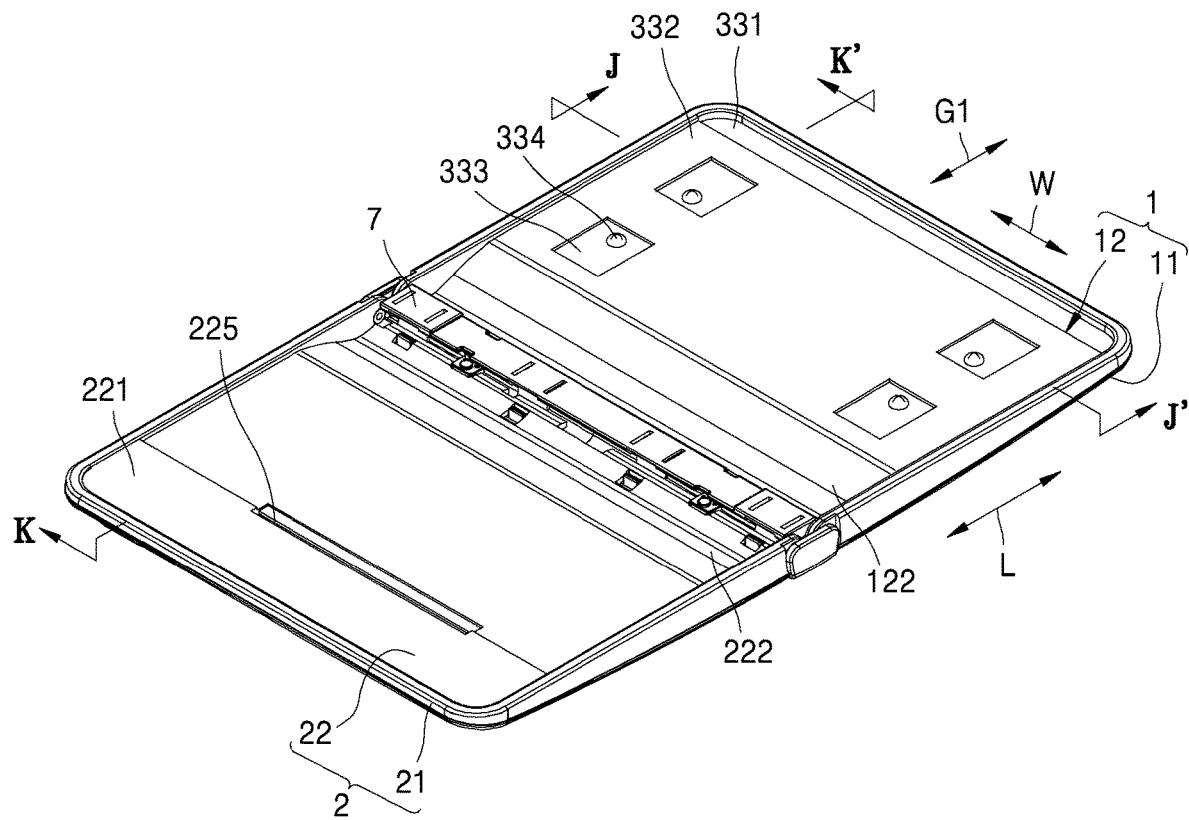
FIG. 25 is a perspective view of a foldable device according to an exemplary embodiment.
Figure 26:
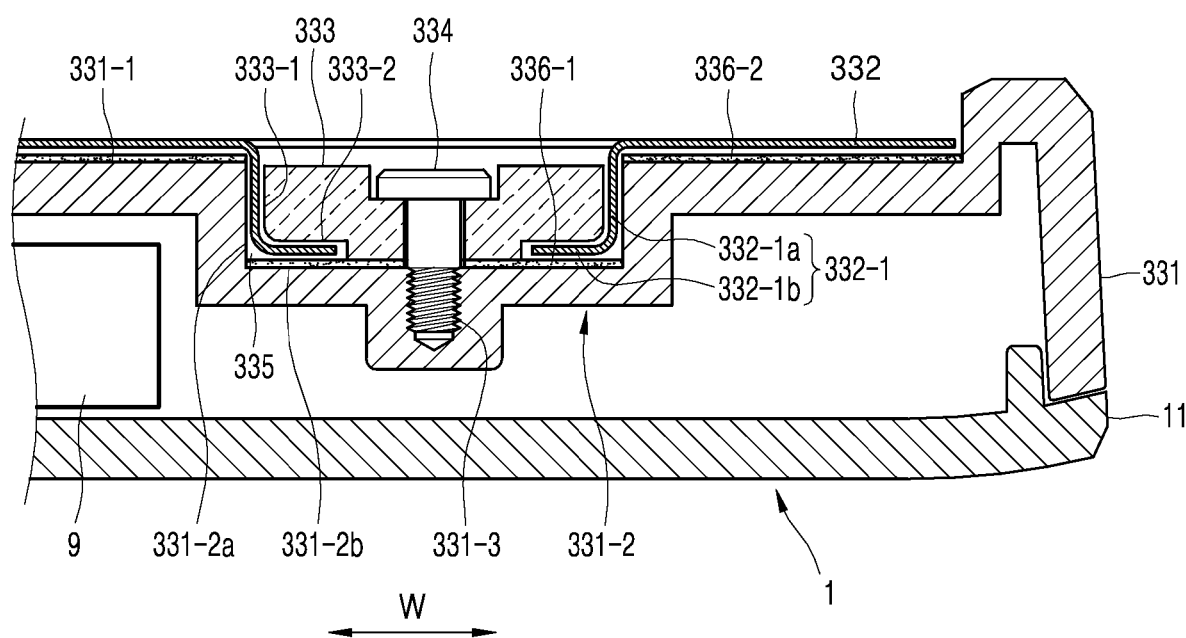
FIG. 26 is a partial cross-sectional view taken along line J-J' of FIG. 25 according to an exemplary embodiment.
Figure 27:
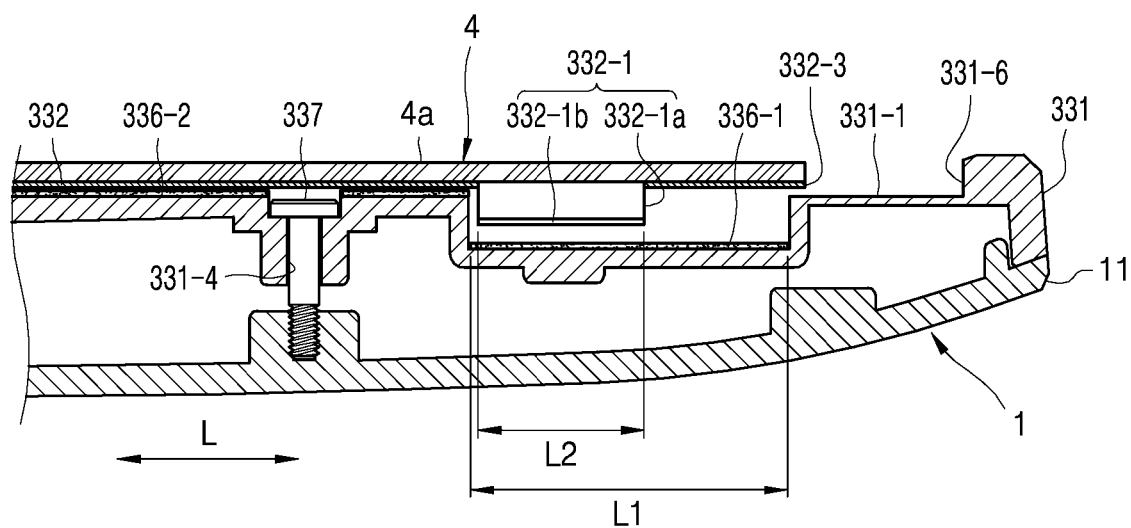
FIG. 27 is a partial cross-sectional view taken along line K-K' of FIG. 25 according to an exemplary embodiment.

A structure for slidably connecting the first part 4a of the flexible display device 4 to the first body 1 is not limited to the structure described in reference to FIG. 21. For example, FIG. 25 is a perspective view of a foldable device 100 according to an exemplary embodiment. FIG. 26 is a partial cross-sectional view taken along line J-J' of FIG. 25 according to an exemplary embodiment. FIG. 27 is a partial cross-sectional view taken along line K-K' of FIG. 25 according to an exemplary embodiment. In order to more clearly show a structure for slidably connecting the first part 4a of the flexible display device 4 to the first body 1, the flexible display device 4 is not shown in FIG. 25 and a rail member 333, e.g., a rail, is not shown in FIG. 27. The foldable device 100 of FIGS. 25 through 27 may be similar to the foldable device 100 described in any of the previous exemplary embodiments except that the first part 4a of the flexible display device 4 is slidably supported on the first body 1.

Referring to FIG. 25, the second part 4b of the flexible display device 4 is fixed to the second support 221 of the second frame 22 by using an adhesive or the like. A slot 225 through which the signal line 4-1 of the flexible display device 4 passes is formed in the second frame 22 (see FIG. 24). The first frame 11 includes a fixed frame 331, and a movable frame 332 that is supported on the fixed frame 331 and able to slide in the directions G1 and G2 with respect to the fixed frame 331. The first part 4a of the flexible display device 4 is fixed to the movable frame 332 by using an adhesive or the like.

Referring to FIGS. 26 and 27, the movable frame 332 includes a first rail 332-1. A second rail 335 coupled to the first rail 332-1 and configured to guide a sliding movement of the movable frame 332 is provided on the fixed frame 331. Although the first rail 332-1 has a convex shape and the second rail 335 into which the first rail 332-1 is inserted has a concave shape, one or more exemplary embodiments is not limited thereto and the first rail 332-1 may have a concave shape and the second rail 335 may have a convex shape.

The first rail 332-1 extends in a sliding direction, that is, the directions G1 and G2, in which the movable frame 332 may slide. The first rail 332-1 includes a first protrusion 332-1a that extends downward (i.e., toward an inner portion of the first body 1), and a second protrusion 332-1b that extends from the first protrusion 332-1a in a horizontal direction, that is, a width direction W of the foldable device 100, perpendicular to the directions G1 and G2. The first movable frame 332 may be formed of, for example, a metal plate. The first rail 332-1 may be formed by bending the metal plate.

The second rail 335 extends in the sliding directions G1 and G2. A recess 331-2 in a top surface 331-1 that extends in the directions G1 and G2 is provided in the fixed frame 331. A rail member 333 that forms the second rail 335 is provided in the recess 331-2. The rail member 333 is fixed to the fixed frame 331 by using a fastening member 334 such as a screw. A fastening hole 331-3 into which the fastening member 334 is inserted is formed in the fixed frame 331. The rail member 333 includes a first surface 333-1 and a second surface 333-2 that respectively face a side surface 331-2a and a bottom surface 331-2b of the recess 331-2. The first surface 333-1 and the second surface 333-2 are spaced apart from the side surface 331-2a and the bottom surface 331-2b of the recess 331-2. Accordingly, the second rail 335 into which the first rail 332-1 is disposed and slides may be formed.

The movable frame 332 is placed on the fixed frame 331 so that the first rail 332-1 is inserted into the recess 331-2 and the rail member 333 is fastened to the fixed frame 331 by using the fastening member 334. The first rail 332-1 is disposed in the second rail 335 that is formed by the first surface 333-1 and the second surface 333-2 of the rail member 333 and the side surface 331-2a and the bottom surface 331-2b of the recess 331-2 that are spaced apart from each other. Accordingly, the movable frame 332 may be guided along the second rail 335 and may slide in the directions G1 and G2. Also, because the first rail 332-1 having an "L" shape is inserted into the second rail 335 having an "L" shape, the movable frame 332 does not separate from the fixed frame 331.

A sliding range of the movable frame 332 may be limited. If the sliding range of the movable frame 332 is too great, a length of the first body 1 must be increased, thereby increasing a size of the foldable device 100. The foldable device 100 may further include a movement limiting member, e.g., a stop, which limits the sliding range of the movable frame 332. The movement limiting member allows the movable frame 332 to slide only when the unfolding angle E of the first and second bodies 1 and 2 is equal to or greater than a predetermined movement limiting angle.

In the folded position (see FIG. 3) of the foldable device 100, the third part 4c of the flexible display device 4 is bent to have the curved portion 4d (see FIG. 3) and is situated in a receiving space that is formed by the first and second receivers 122 and 222. When the foldable device 100 changes from the unfolded position (see FIG. 2) to the folded position (see FIG. 3), that is, when the unfolding angle E between the first and the second bodies 1 and 2 is gradually reduced from 180°, the movable frame 332 slides in the direction G1 and delays the forming of the curved portion 4d. When the unfolding angle E of the first and second bodies 1 and 2 reaches the movement limiting angle and thus the movable frame 332 no longer slides in the direction G1, the third part 4c of the flexible display device 4 is bent to have the curved portion 4d and is received in the receiving space. When the foldable device 100 changes from the folded position (see FIG. 3) to the unfolded position (see FIG. 2), the curved portion 4d of the third part 4c is slowly escapes from the receiving space. When the unfolding angle E of the first and second bodies 1 and 2 reaches the movement limiting angle, the movable frame 332 slides in the direction G2 and the curved portion 4d flattens into the completely unfolded position of FIG. 2.

The foldable device 100 may be stopped at the unfolding angle E (see FIG. 11) between the folded position and the unfolded position and may be used in this particular state. Because the unfolding angle E may be within the range of 90° to about 180°, the sliding range of the movable frame 332 may be determined to correspond to the unfolding angle E ranging from about 90° to about 180°. In the exemplary embodiment, the movement limiting angle may be equal to or greater than 90°.

Furthermore, according to one or more exemplary embodiment, the foldable device 100 may be used in the completely unfolded state (FIG. 2). Although the foldable device 100 may be used in the state of FIG. 11, the foldable device 100 is rarely used at the unfolding angle E less than 120°. In the exemplary embodiment, the movement limiting angle may be equal to or greater than 120°. Accordingly, the sliding range of the movable frame 332 may be determined to correspond to the unfolding angle E ranging from about 120° to about 180° so that the third part 4c of the flexible display device 4 is not bent to have a concave or convex shape at the unfolding angle E ranging from about 120° to about 180°.

The sliding range of the movable frame 332 may be limited by a length L1 of the recess 331-2 in the directions G1 and G2. A length L2 of the first rail 332-1 is less than the length L1 of the recess 331-2. The movable frame 332 may slide a distance calculable as the difference between the lengths L1 and L2. When the unfolding angle E is, for example, 120°, the first rail 332-1 may contact a side wall 331-2c of the recess 331-2 in the longitudinal direction L. In the exemplary embodiment, the side wall 331-2c may function as a movement limiting member that limits the sliding range of the movable frame 332.

Referring to FIG. 27, a movement limiting member 331-6 that contacts the end portion 332-3 in a longitudinal direction of the movable frame 332 and limits the sliding range of the movable frame 332 may be provided on the fixed frame 331. For example, when the unfolding angle E is 120°, the end portion 332-3 of the movable frame 332 may contact the movement limiting member 331-6.

When the foldable device 100 changes from the unfolded state of FIG. 25 to the folded state, the third part 4c of the flexible display device 4 is curved in an arc shape. Because the flexible display device 4 is elastic, the flexible display device 4 tends to return to the unfolded state. If both the first and second parts 4a and 4b of the flexible display device 4 are fixed to the first and second bodies 1 and 2, the third part 4c may fail to maintain a smooth curved shape (marked by a solid line of FIG. 20) and may deform to have the concave or convex shape 4f of FIG. 20. However, because the first part 4a of the flexible display device 4 is slidably supported on the first body 1, the movable frame 332 slides in the direction G1 due to an elastic force and the third part 4c maintains the smooth curved shape (marked by the solid line of FIG. 20). Accordingly, when the foldable device 100 is used in the state having the unfolding angle E ranging from, for example, about 180° to about 120°, an image displayed on the third part 4c may be prevented from being distorted.

The rail member 333 may be formed of a material having a low frictional resistance so that the movable frame 332 slides smoothly. For example, the rail member 333 may be formed of polyacetal resin, oil-impregnated plastic resin, or an oil-impregnated sintered metal material. Also, as shown in FIG. 27, a friction reducing member 336-1, i.e., a friction reducer, may be disposed on the bottom surface 331-2b of the recess 331-2. The friction reducing member 336-1 may be attached to the bottom surface 331-2b of the recess 331-2 by using, for example, an adhesive, adhesive tape, or the like. A friction reducing member 336-2 may also be disposed between the top surface 331-1 of the fixed frame 331 and the movable frame 332. The friction reducing members 336-1 and 336-2 may be films formed of, for example, a fluorine resin-based material or films including a fluorine resin-based coating layer. The friction reducing members 336-1 and 336-2 may reduce at least one of static, kinetic, or rolling friction between the fixed frame 331 and the movable frame 332.

Referring to FIG. 26, the fixed frame 331 is coupled to the base cover 11 to form a space in which the battery 9 is received between the fixed frame 331 and the base cover 11. It is necessary to limit the exposure of the battery 9 to moisture. To this end, the fastening hole 331-3 for fixing the rail member 333 to the fixed frame 331 extends downward from the fixed frame 331 and has a closed lower end portion. Accordingly, moisture may be prevented from entering into the space between the fixed frame 331 and the base cover 11 through the fastening hole 331-3.

Referring to FIG. 27, the fixed frame 331 is coupled to the base cover 11 by using a fastening member 337, e.g., a fastener. Accordingly, an opening 331-4 through which the fastening member 337 passes is formed in the fixed frame 331. The opening 331-4 passes through the fixed frame 331. The friction reducing member 336-2 that is disposed on the top surface 331-1 of the fixed frame 331 may cover the opening 331-4. Accordingly, the friction reducing member 336-2 may function as a moisture blocking member, i.e., a cover, a sealant, or a moisture blocker, that blocks moisture from penetrating into the space between the fixed frame 331 and the base cover 11 through the opening 331-4.

Figure 28:
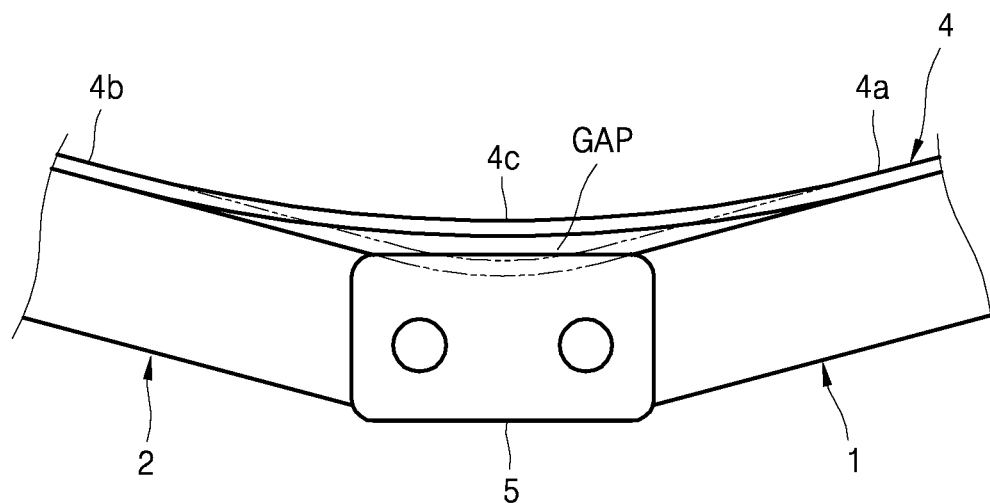
FIG. 28 is a side view illustrating a gap between a third part of a flexible display and a foldable device as the foldable device folds according to an exemplary embodiment.

When the foldable device 100 in the completely unfolded position of FIG. 2 begins to be folded and the movable frame 332 begins to slide in the direction G1, the third part 4c of the flexible display device 4 may move a distance from the first and second bodies 1 and 2 due to elasticity of the third part 4c of the flexible display device 4 as shown in FIG. 28. That is, when both the first and second parts 4a and 4b of the flexible display device 4 are fixed ends, the third part 4c is curved downward as marked by a dashed line and does not move from the first and second bodies 1 and 2. However, because the first part 4a is moveable, the third part 4c moves from the first and second bodies 1 and 2 as marked by a solid line to forming a gap. A bottom surface of the flexible display device 4 may be exposed through the gap, and a foreign material may penetrate into the foldable device 100 through the gap.

In order to solve this problem, the amount of the third part 4c of the flexible display device 4 that comes off from the first and second bodies 1 and 2 may be reduced by applying a resistance to a movement of the movable frame 332 when the flexible display device 4 changes from the unfolded position to the folded position.

Figure 29:
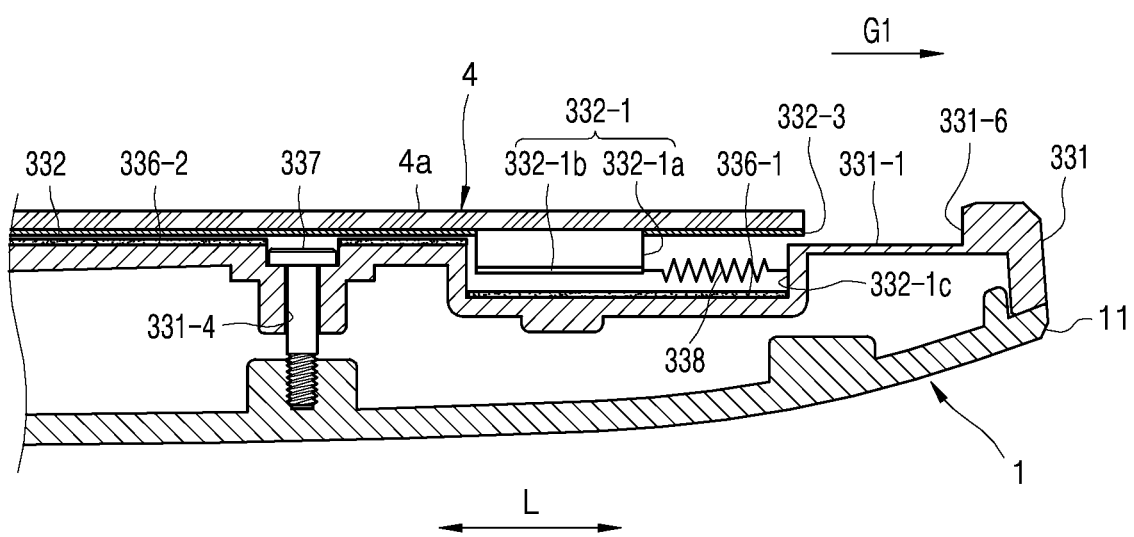
FIG. 29 is a cross-sectional view of a foldable device according to an exemplary embodiment.

FIG. 29 is a cross-sectional view of a foldable device 100 according to an exemplary embodiment. Referring to FIG.

29, a resistance member 338 applies a resistance to a sliding movement of the movable frame 332 when the foldable display device 4 changes from the unfolded position to the folded position. The resistance member 338 applies a resistance to a movement of the movable frame 332 when the unfolding angle E is greater than or equal to the movement limiting angle.

As the unfolding angle E decreases, a radius of curvature of the curved portion 4d decreases, and thus a force for making the flexible display device 4 unfold increases. The force is applied so that the movable frame 332 slides in the direction G1. As the unfolding angle E decreases, the resistance member 338 may apply a higher resistance to a movement of the movable frame 332.

Although the resistance member 338 may be a compression coil spring that is supported by the first rail 332-1 and the side wall 331-2c of the recess 331-2, one or more exemplary embodiments are not limited thereto. The resistance member 338 may be one of, as non-limiting examples, a tension coil spring, a torsion coil spring, or a leaf spring as long as it may apply a resistance to a movement of the movable frame 332 when the first and second bodies 1 and 2 unfold.

Because the amount of the third part 4c of the flexible display device 4 that is curved when the foldable device 100 begins to fold is very small, a magnitude of an elastic force that is generated by the curve of the third part 4c is very small. The elastic force is used as a force for making the movable frame 332 slide in the direction G1. When the foldable device 100 begins to fold, because the movable frame 332 does not move or hardly moves due to a resistance applied by the resistance member 338, the third part 4c does not move from the first and second bodies 1 and 2 as marked by the solid line of FIG. 28 or the movement is reduced. Accordingly, a size of the gap may be reduced and the gap may be prevented from being formed. As the unfolding angle E decreases, the amount of the third part 4c that is curved increases and thus a magnitude of an elastic force increases. In the exemplary embodiment, the movable frame 332 slides in the direction G1 to elastically deform the resistance member 338, thereby increasing a resistance of the resistance member 338. The amount of coming-off of the third part 4c from the first and second bodies 1 and 2 may be reduced due to a resistance applied by the resistance member 338 to the movable frame 332, thereby reducing or preventing the gap. An elastic modulus of the resistance member 338 may be determined so that the third part 4c is not excessively curved to have the concave or convex shape 4f of FIG. 20.

A structure for slidably connecting the movable frame 332 to the fixed frame 331 is not limited to the exemplary structure described in reference to FIGS. 25 through 27.

Figure 30:
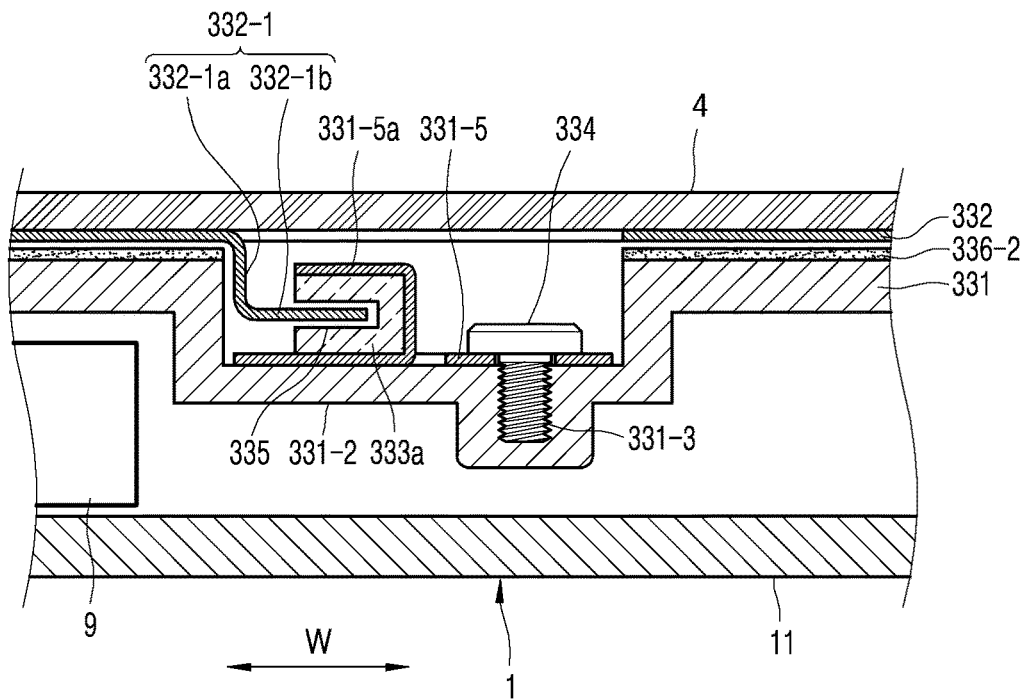
FIG. 30 is a cross-sectional view of a structure for slidably connecting a movable frame to a fixed frame according to an exemplary embodiment.

For example, FIG. 30 is a cross-sectional view illustrating a structure for slidably connecting the movable frame 331 to the fixed frame 331 according to an exemplary embodiment. Referring to FIG. 30, a fixed bracket 331-5 is coupled by the fastening member 334 to the recess 331-2. The coupling hole 331-3 into which the fastening member 334 is inserted has a closed lower end portion. A rail member 333a that forms the second rail 335 having a "⊂" shape is coupled to the fixed bracket 331-5. The rail member 333a may be inserted into and engage with, for example, the "⊂" shaped portion 331-5a of the fixed bracket 331-5. In the exemplary embodiment, the first rail 332-1 of the movable frame 332 may slide in the directions G1 and G2 along the second rail 335.

Figure 31:
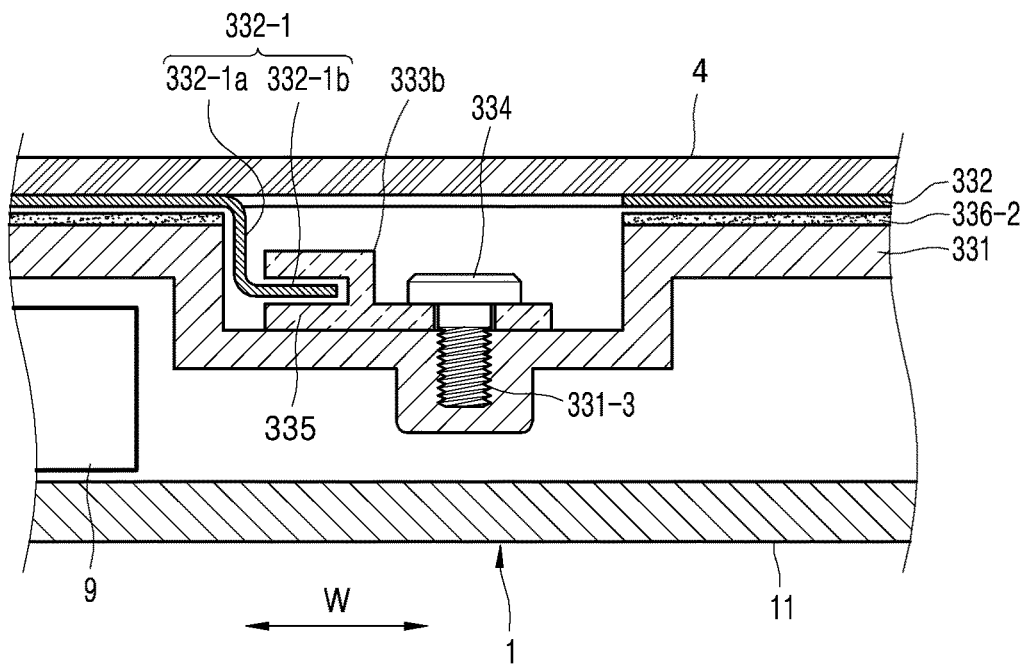
FIG. 31 is a cross-sectional view of a structure for slidably connecting the movable frame to the fixed frame according to an exemplary embodiment.

FIG. 31 is a cross-sectional view illustrating a structure for slidably connecting a movable frame 332 to a fixed frame 331 in the width direction W according to an exemplary embodiment. The exemplary embodiment of FIG. 31 is similar to the exemplary embodiment of FIG. 30 except that there is no fixed bracket 331-5 and a rail member 333b is directly coupled into the recess 331-2.

Figure 32:
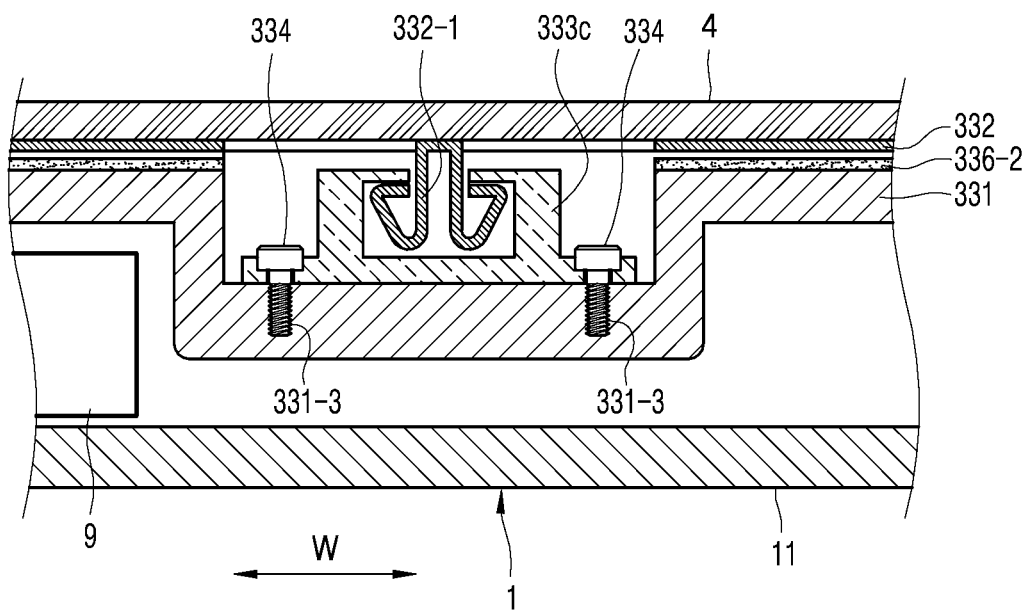
FIG. 32 is a cross-sectional view of a structure for slidably connecting the movable frame to the fixed frame according to an exemplary embodiment.

FIG. 32 is a cross-sectional view illustrating a structure for slidably connecting a movable frame 332 to a fixed frame 331 according to an exemplary embodiment. In the exemplary embodiment of FIG. 32 the first rail 332-1 has a double P-shape and the second rail 335 along which the first rail 332-1 is guided is directly coupled to the fixed frame 331.

When the first and second bodies 1 and 2 fold as shown in FIG. 28, the third part 4c of the flexible display device 4 may come off from the first and second bodies 1 and 2. The gap that is formed due to the coming-off may be reduced by using the resistance member 338. In addition, the foldable device 100 may further include a structure for closing the gap. The gap may be closed by covering side portions of the third part 4c of the flexible display device 4 in the width direction W.

Figure 33:
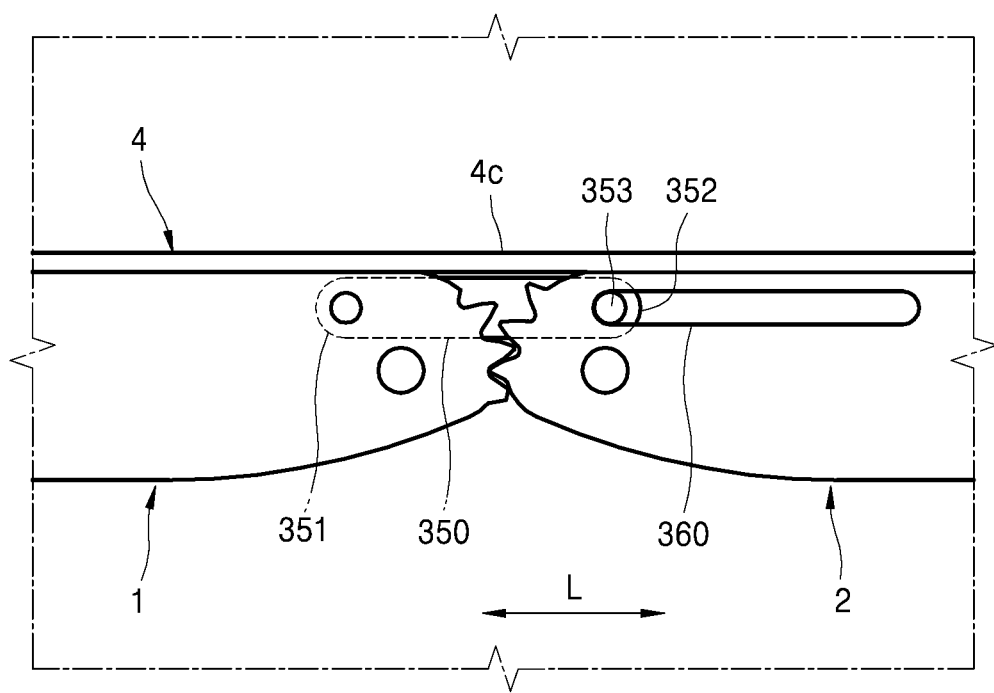
FIG. 33 is a side view of a foldable device in an unfolded state according to an exemplary embodiment.
Figure 34:
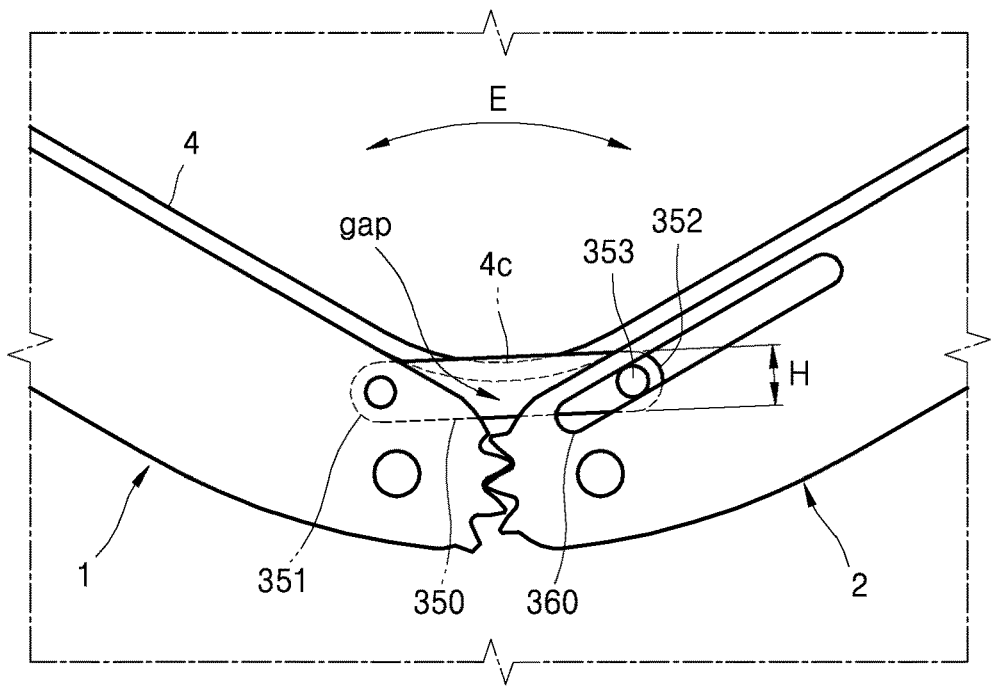
FIG. 34 is a side view of a foldable device at a predetermined unfolding angle according to an exemplary embodiment.
Figure 35:
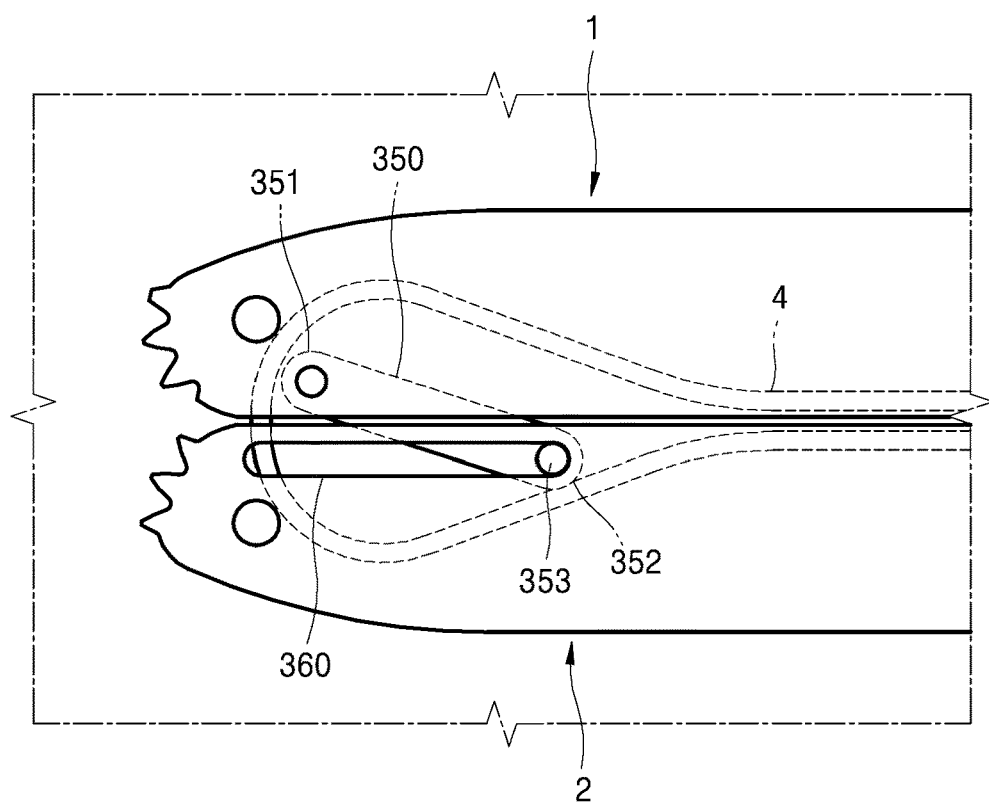
FIG. 35 is a side view of a foldable device in a folded state according to an exemplary embodiment.

For example, FIG. 33 is a side view of the foldable device 100 completely unfolded according to an exemplary embodiment. FIG. 34 is a side view of the foldable device 100 having an unfolding angle E according to an exemplary embodiment. FIG. 35 is a side view of the foldable device 100 folded according to an exemplary embodiment.

Referring to FIGS. 33 through 35, a shielding member 350, e.g., a shield, is disposed on both side of the flexible display device 4 in the width direction W. The shielding member 350 crosses between the first and second bodies 1 and 2. One end portion 351 of the shielding member 350 is pivotably coupled to one of the first and second bodies 1 and 2 and the other end portion 352 of the shielding member 350 is slidably connected to the other of the first and second bodies 1 and 2. In the exemplary embodiment, the one end portion 351 of the shielding member 350 is pivotably coupled to the first body 1. A guide slot 360, e.g., a guide, that extends in the longitudinal direction L is formed in the second body 2. An insertion protrusion 353 that is inserted into the guide slot 360 is provided on the other end portion of the shielding member 350.

When the foldable device 100 changes from the completely unfolded state (see FIG. 33) to the state having the unfolding angle E (see FIG. 34), the first and second bodies 1 and 2 approach each other. Accordingly, the shielding member 350 is guided by the guide slot 360 and is slowly raised. As the third part 4c of the flexible display device 4 slightly separates from the first and second bodies 1 and 2, the gap may be formed between the first and second bodies 1 and 2. Because the shielding member 350 covers the gap at a side of the third part 4c, the inside of the foldable device 100 is not exposed. Also, a foreign material may be impeded from entering through the gap. When the foldable device 100 changes to the completely unfolded state, the shielding member 350 is stored within the first and second bodies 1 and 2 as shown in FIG. 35. A length of the guide slot 360 is determined so that the first and second bodies 1 and 2 change between the unfolded state and the folded state in consideration of a movement path of the insertion protrusion 353 of the shielding member 350. Also, a height H of the shielding member 350 in a direction in which the shielding member 350 is elevated and a shape of the guide slot 360 may be determined so that the gap is closed at the unfolding angle E.

The amount of the shielding member 350 that is elevated may be adjusted by adjusting an inclination angle of the guide slot 360 in the longitudinal direction L. For example, when the guide slot 360 is formed to be inclined upward with respect to the longitudinal direction L, a maximum height of the shielding member 350 may be greater than that when the guide slot 360 is formed in the longitudinal direction L. In contrast, when the guide slot 360 is formed to be inclined downward with respect to the longitudinal direction L, a maximum height of the shielding member 350 may be less than that when the guide slot 360 is formed in the longitudinal direction L.

Figure 36:
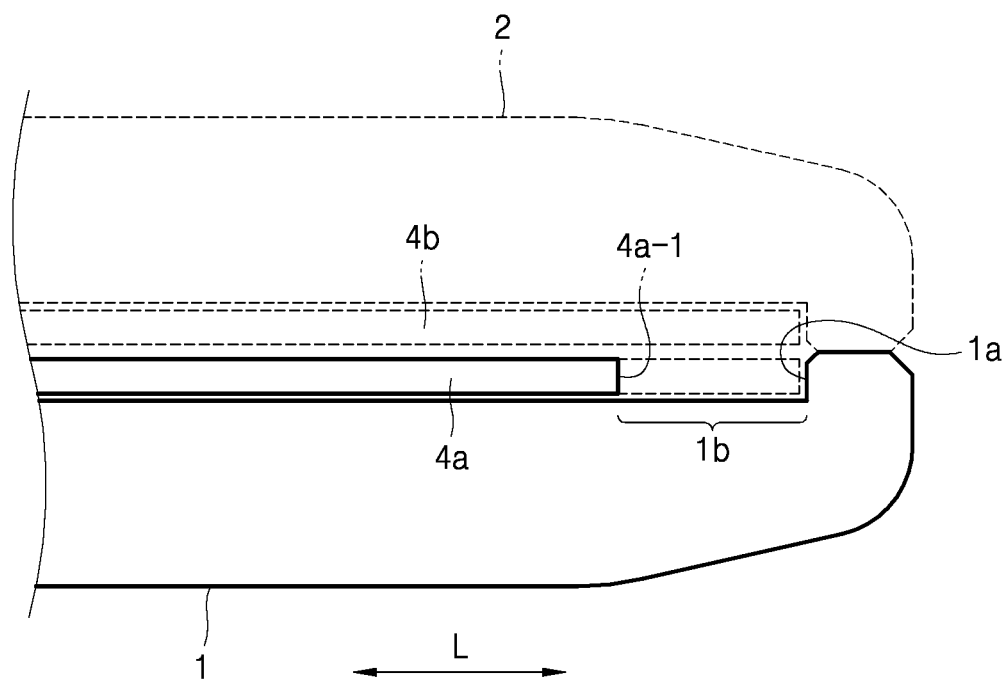
FIG. 36 is a partial cross-sectional view of a foldable device according to an exemplary embodiment.

In FIGS. 25 through 35, the first part 4a of the flexible display device 4 slides in the longitudinal direction L (or G1 and G2) relative to the first body 1, and the second part 4b is fixed to the second body 2. FIG. 36 is a partial cross-sectional view illustrating the foldable device 100 according to an exemplary embodiment. In FIG. 36, a dashed line indicates a folded state of the foldable device 100 and a solid line indicates an unfolded state of the foldable device 100. Referring to FIG. 36, when the foldable device 100 is unfolded, an edge 4a-1 of the first part 4a of the flexible display device 1 in the longitudinal direction L is inwardly spaced apart from an inner edge 1a of the first body 1 in the longitudinal direction L. When the foldable device 100 folds, the first part 4a of the flexible display device 4 slides toward the inner edge 1a of the first body 1 in the longitudinal direction L and the edge 4a-1 is located adjacent to the inner edge 1a of the first body 1. Accordingly, when the foldable device 100 is folded, a portion 1b of the first body 1 adjacent to the inner edge 1a is covered by the first part 4a of the flexible display device 4. When the foldable device 100 is unfolded, the outer edge 4a-1 of the flexible display device 4 slides down the first body 1 and thus the portion 1b of the first body 1 is exposed.

Figure 37:
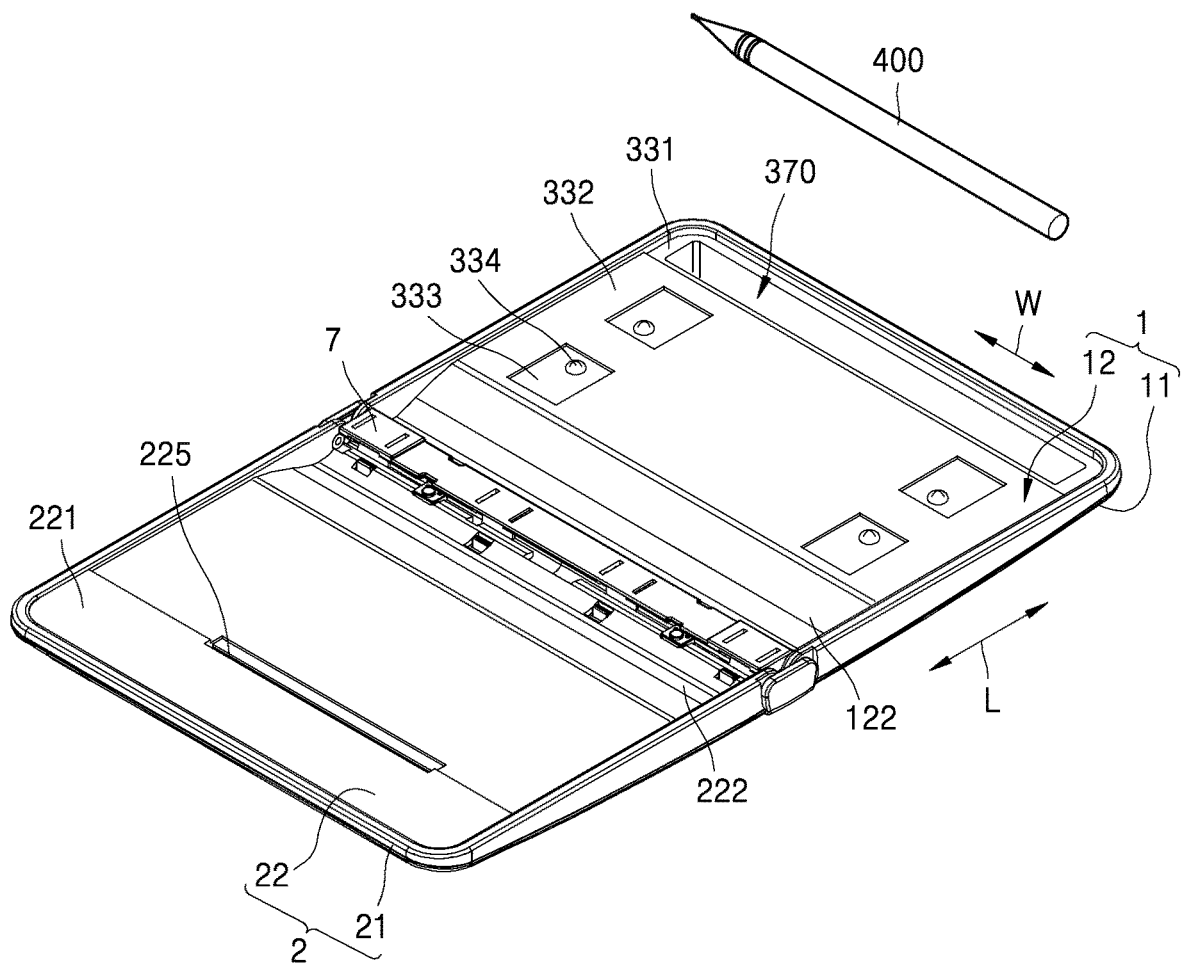
FIG. 37 is a perspective view of a foldable device according to an exemplary embodiment.
Figure 38:
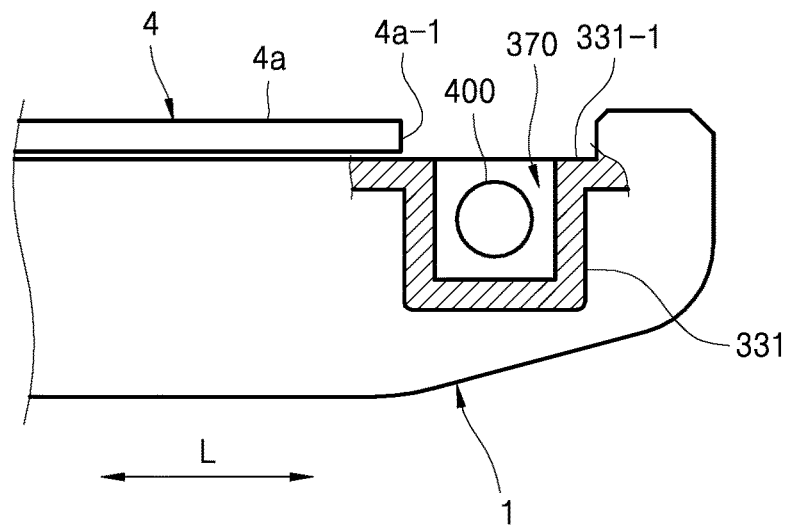
FIG. 38 is a cross-sectional view of a pen receiver according to an exemplary embodiment.

FIG. 37 is a perspective view of a foldable device 100 according to an exemplary embodiment. In FIG. 37, the flexible display device 4 is not shown. FIG. 38 is a cross-sectional view of a pen receiver 370 according to an exemplary embodiment. Referring to FIGS. 37 and 38, the foldable device 100 may further include a touch pen 400 for operating the touch panel 42 (see FIG. 4) that is provided on the flexible display device 4. The touch pen 400 may be stored in the first body 1 or the second body 2. According to one or more exemplary embodiments, the first part 4a of the flexible display device 4 is slidably supported to move in the longitudinal direction L on the first body 1 due to a structure of FIGS. 25 through 35. When the foldable device 100 changes between the folded state and the unfolded state, the portion 1b of the first body 1 is covered by the first part 4a of the flexible display device 4 or is exposed to the outside. The pen receiver 370 in which the touch pen 400 is received is provided in the portion 1b of the first body 1. For example, the pen receiver 370 may be a recess in the top surface 331-1 of the fixed frame 331.

In the exemplary embodiment, as the foldable device 100 changes between the unfolded state and the folded state, the pen receiver 370 may be opened/closed. When the foldable device 100 is folded, the pen receiver 370 is covered by the first part 4a of the flexible display device 4, and when the foldable device 100 is unfolded, the first part 4a of the flexible display device 4 slides in the longitudinal direction L and the pen receiver 370 is opened. Accordingly, when the foldable device 100 is unfolded, the touch pen 400 may be placed in or taken out of the pen receiver 370.

The foldable device 100 may further include a pen fixing unit, i.e., a pen holder or a pen receiver, which fixes the touch pen 400 to the pen receiver 370. For example, a toggle locking structure in which, when the touch pen 400 is received in the pen receiver 370 and is pressed down by the user, the touch pen 400 is locked in the pen receiver 370, and, when the touch pen 400 is pressed down again, the touch pen 400 is unlocked may be used.

Figure 39:
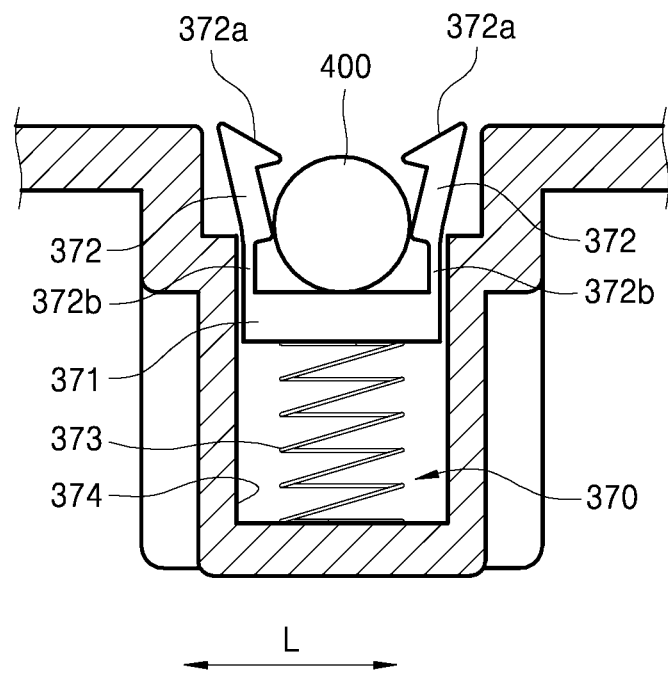
FIG. 39 is a cross-sectional view of a pen fixing unit in an unlocked state according to an exemplary embodiment.
Figure 40:
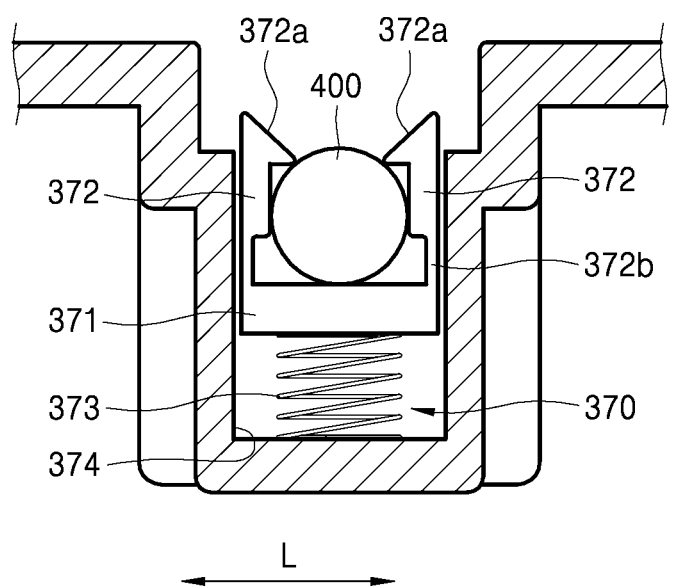
FIG. 40 is a cross-sectional view of the pen fixing unit in a locked state according to an exemplary embodiment.
Figure 41:
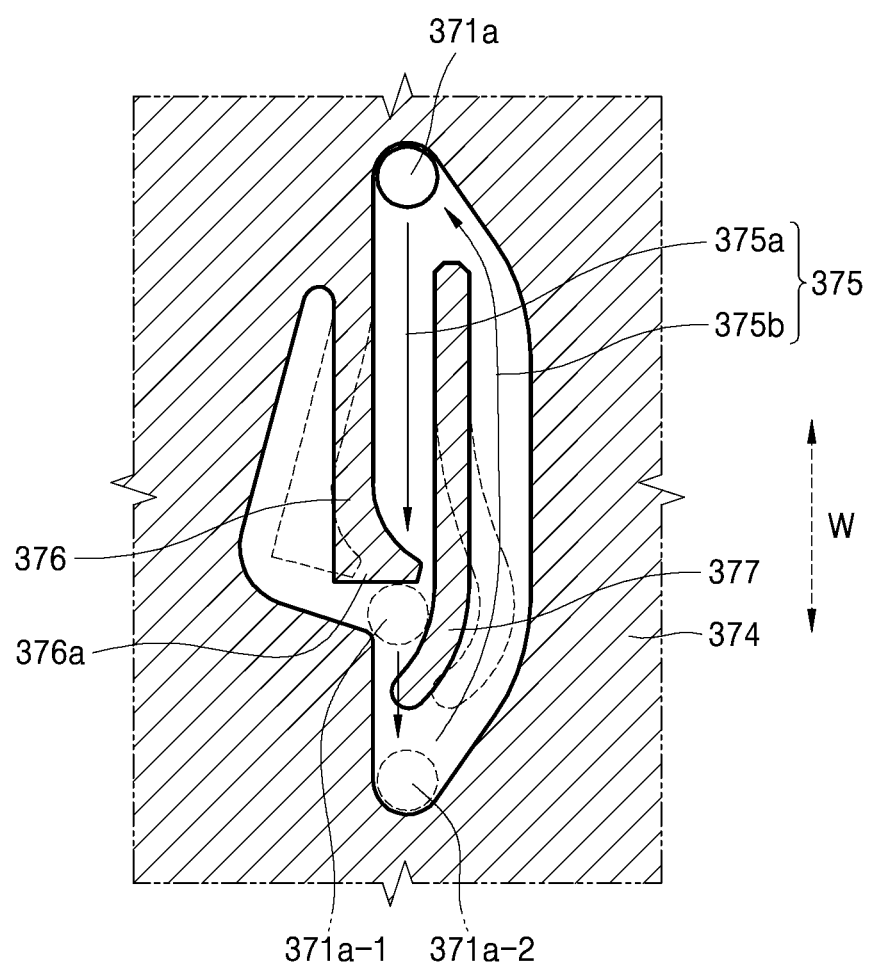
FIG. 41 is a schematic view of a toggle locking structure according to an exemplary embodiment.

FIGS. 39 and 40 are cross-sectional views of a pen fixing unit according to an exemplary embodiment. FIG. 39 illustrates a state where the touch pen 400 is unlocked and FIG. 40 illustrates a state where the touch pen 400 is locked. FIG. 41 is a schematic view of the toggle locking structure according to an exemplary embodiment.

Referring to FIGS. 39 and 40, an elevation plate 371, one pair of locking arms 372, and a toggle spring 373 are illustrated. The elevation plate 371 is provided to be moved along a guide wall 374 of the pen receiver 370. The toggle spring 373 applies an elastic force to the elevation plate 371 so that the elevation plate 371 is raised. The locking arms 372 are guided by the guide wall 374 as the elevation plate 371 is elevated, and thus a distance between the locking arms 372 is increased or reduced as shown in FIGS. 39 and 40. For example, locking hooks 372a for locking the touch pen 400 in the pen receiver 370 are provided on first end portions of the locking arms 372 and the second end portions of the locking arms 372 are connected to the elevation plate 371 by flexible connection portions 372b. In the exemplary embodiment, when the elevation plate 371 is raised as shown in FIG. 39 and the distance between the locking arms 372 may be increased, the touch pen 400 may be placed between the locking arms 372 or may be taken out from between the locking arms 372. Also, when the elevation plate 371 is lowered as shown in FIG. 40, and the elevation plate 371 is guided by the guide wall 374 and the distance between the locking arms 372 is reduced, the touch pen 400 is caught by the locking hooks 372a and is locked in the pen receiver 371.

Referring to FIG. 41, a cam protrusion 371a is provided on the elevation plate 371. A cam path 375 that guides the cam protrusion 371a is provided on the guide wall 374. The cam path 375 may include a first path 375a along which the cam protrusion 371a is guided when the elevation plate 371 is lowered and a second path 375b along which the cam protrusion 371a is guided when the elevation plate 371 is raised.

A first elastic arm 376 that locks the cam protrusion 371a at a lowered position is provided on a lower end portion of the first path 375a. The first elastic arm 376 has a position that closes the first path 375a and a position that opens the first path 375a. A second elastic arm 377 has a position that isolates the first path 375a and the second path 375b and a position that connects the first path 375a and the second path 375b.

In the state of FIG. 39, the first elastic arm 376 is in the position that closes the first path 375a. As the elevation plate 37 is lowered, the cam protrusion 371a is lowered along the first path 375a and the first elastic arm 376 is pushed by the cam protrusion 371a and is elastically bent to the position that opens the first path 375a as marked by a dashed line of FIG. 41. When the elevation plate 371 reaches the lowered position of FIG. 40, the cam protrusion 371a escapes from hooks 376a that are provided on a lower end portion of the first elastic arm 376 as denoted by 371a-1, and the first elastic arm 376 returns to the position that is marked by a solid line to close the first path 375a. Accordingly, even when an elastic force is applied by the toggle spring 373 so that the elevation plate 371 is raised, because the cam protrusion 371a is caught by the hooks 376a, the elevation plate 371 is not raised along the first path 375a and the elevation plate 371 is maintained at the position of FIG. 40. The touch pen 400 is locked in the pen receiver 370 by the locking hooks 372a.

In the state of FIG. 40, when the touch pen 400 is pressed, the elevation plate 371 is slightly lowered, the second elastic arm 377 is pushed by the cam protrusion 371a to be bent to a position that connects the first and second paths 375a and 375b as marked by a dashed line of FIG. 41, and the cam protrusion 371a enters the second path 375b as denoted by 371a-2. When interference with the cam protrusion 371a ends, the second elastic arm 377 returns to a position that isolates the first and second paths 375a and 375b as marked by a solid line of FIG. 41. When a force for pressing the touch pen 400 is removed in this state, the elevation plate 371 is raised to the position of FIG. 39 due to an elastic force of the toggle spring 373 and the cam protrusion 371a is guided by the second path 375b. When the elevation plate 371 reaches the position of FIG. 39, a distance between the locking arms 372 is increased and the touch pen 400 is unlocked.

In the exemplary embodiment, the touch pen 400 may be received in and removed from the first body 1. Because the pen receiver 370 is opened/closed by the flexible display device 4 as the foldable device 100 unfolds/unfolds, an additional cover for opening/closing the pen receiver 370 is not necessary. When the foldable device 100 folds, because the touch pen 400 and the pen receiver 370 are not exposed to the outside, a degree of freedom in designing an outer appearance of the foldable device 100 may be improved.

Figure 42:
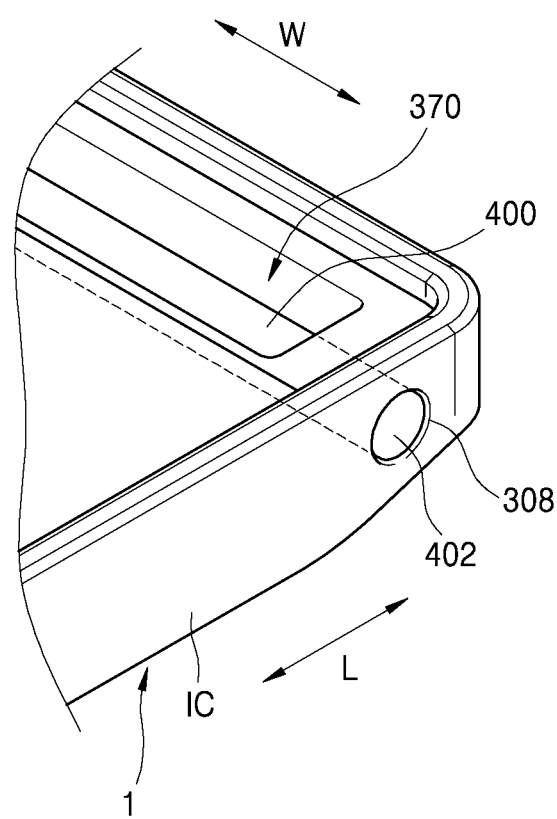
FIG. 42 is a partial perspective view of a foldable device according to an exemplary embodiment.
Figure 43:
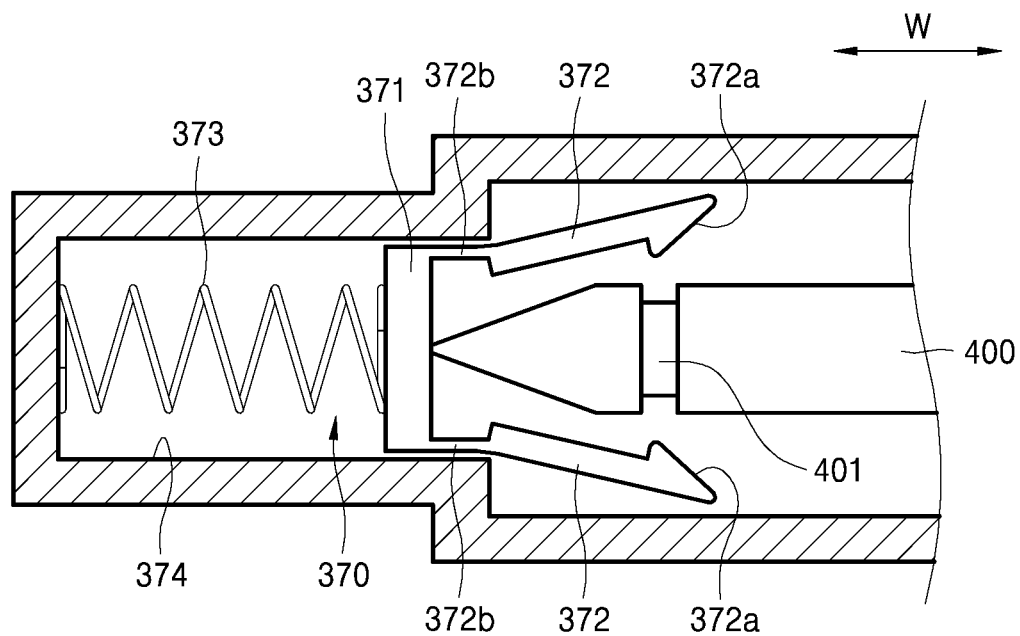
FIG. 43 is a cross-sectional view of a pen fixer in an unlocked state according to an exemplary embodiment.
Figure 44:
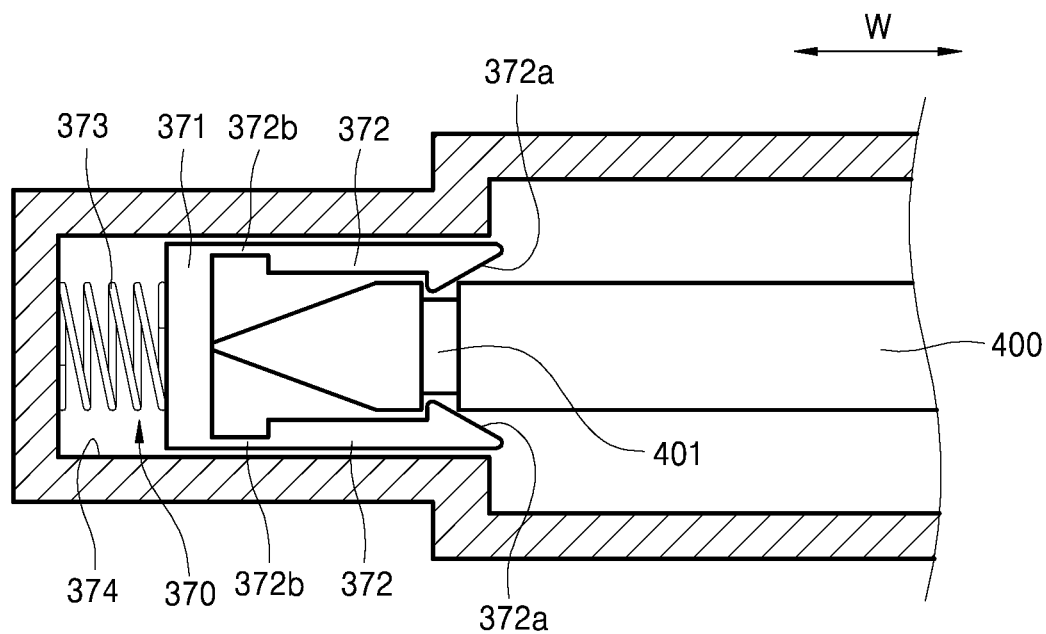
FIG. 44 is a cross-sectional view of a pen fixer in a locked state according to an exemplary embodiment.

Further, a structure for receiving the touch pen 400 is not limited to a structure of FIGS. 37 through 41. For example, FIG. 42 is a partial perspective view of a foldable device 100 according to an exemplary embodiment. Referring to FIG. 42, the touch pen 400 may be received in or taken out of the pen receiver 370 in the width direction W through a pen insertion hole 380. A toggle structure of FIGS. 39 through 41 may be used as a pen fixing unit for fixing the touch pen 400 in the pen receiver 370. For example, FIGS. 43 and 44 are cross-sectional views illustrating the pen fixing unit according to an exemplary embodiment. FIG. 43 illustrates a state where the touch pen 40 is unlocked and FIG. 44 illustrates a state where the touch pen 400 is locked. The pen fixing unit of FIGS. 43 and 44 are different from the pen fixing unit of FIGS. 39 and 40 in that a movement direction in which the elevation plate 371 moves is the width direction W. Also, the locking hooks 372a provided on the locking arms 372 are inserted into a locking groove 401 that is formed in the touch pen 400 at the position of FIG. 44 to lock the touch pen 400 in the pen receiver 370. A toggle locking structure of FIG. 41 may be used as a toggle locking structure. In the exemplary embodiment, the first and second paths 375a and 375b may be formed in the width direction W.

In the exemplary embodiment, the touch pen 400 may be locked in the pen receiver 370 by being inserted through the pen insertion hole 380. A head 402 of the touch pen 400 may not project from a side surface 1c of the first body 1 in the width direction W. In order to remove the touch pen 400 out from the pen receiver 370, the foldable device 100 may unfold to open the pen receiver 370 and the touch pen 370 is pushed in the width direction W to unlock the touch pen 400. Next, the touch pen 400 may be taken out through the pen insertion hole 380. In the exemplary embodiment, because the head 402 of the touch pen 400 does not project from the side surface 1c of the first body 1 in the width direction W when the touch pen 400 is received in the pen receiver 370, a degree of freedom in designing an outer appearance of the foldable device 100 may be improved.

A structure for locking/unlocking the touch pen 400 in the pen receiver 370 is not limited to the toggle locking structure. The pen fixing unit may have any structure that may lock the touch pen 400 in the pen receiver 370 and may unlock the touch pen 400 in order to take out the touch pen 400 from the pen receiver 370 when necessary. For example, the pen fixing unit may have a snap-fit structure for elastically locking/unlocking the touch pen 400 to/from the pen receiver 370.

When the foldable device 100 changes from an unfolded position to a folded position, the third part 4c may move from the first and second bodies 1 and 2 as marked by a solid line due to an elastic force of the flexible display device 4 to form a gap and a bottom surface of the flexible display device 4 may be exposed through the gap or a foreign material may penetrate into the foldable device through the gap, as described above with reference to FIG. 28.

In order to solve this problem, an amount of the third part 4c of the flexible display device 4 that moves from the first and second bodies 1 and 2 may be reduced by restricting a movement amount of the movable frame 332 according to a folding/unfolding angle. A restriction unit 500 for restricting a movement amount of the movable frame 332 according to a folding/unfolding angle according to an exemplary embodiment will now be explained.

Figure 45:
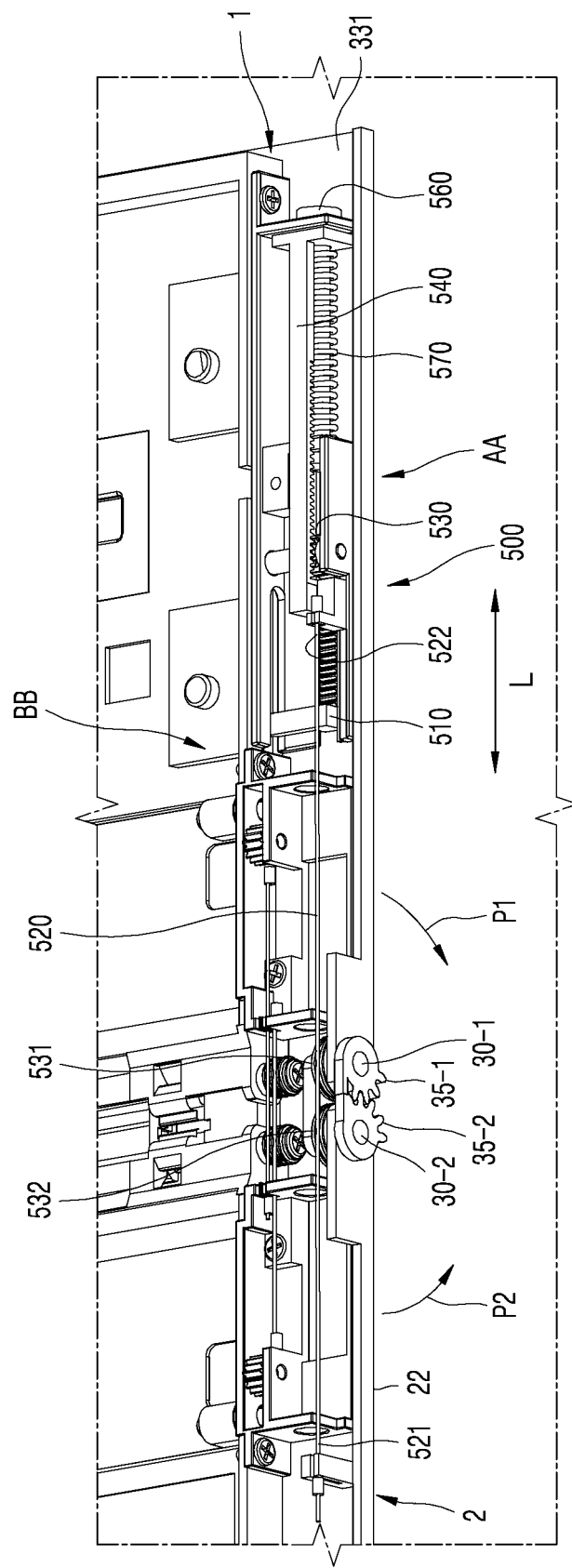
FIG. 45 is a partial perspective view of a foldable device viewed from a back of a foldable device without a cover according to an exemplary embodiment.
Figure 46:
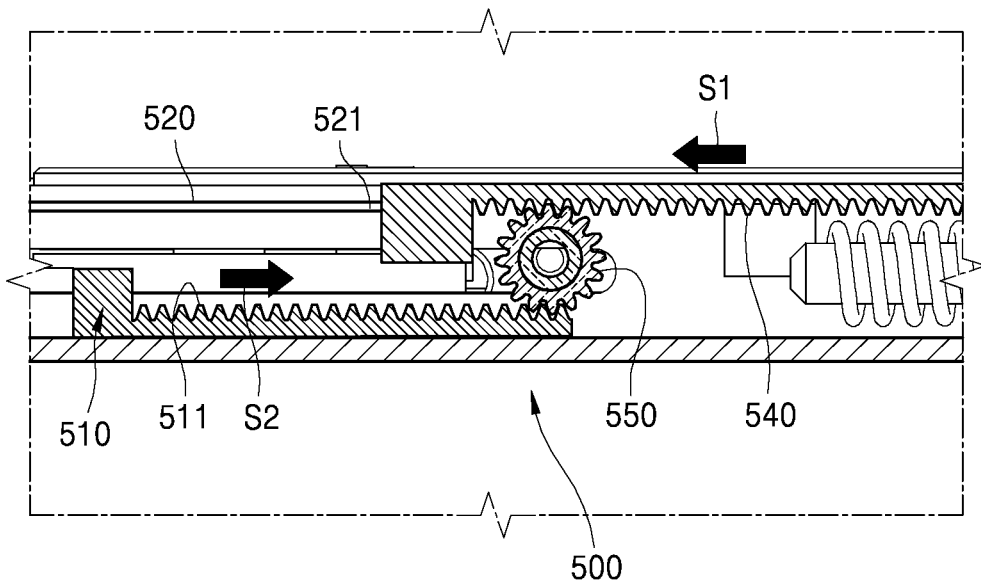
FIG. 46 is an enlarged view of a portion "AA" of FIG. 45.
Figure 47:
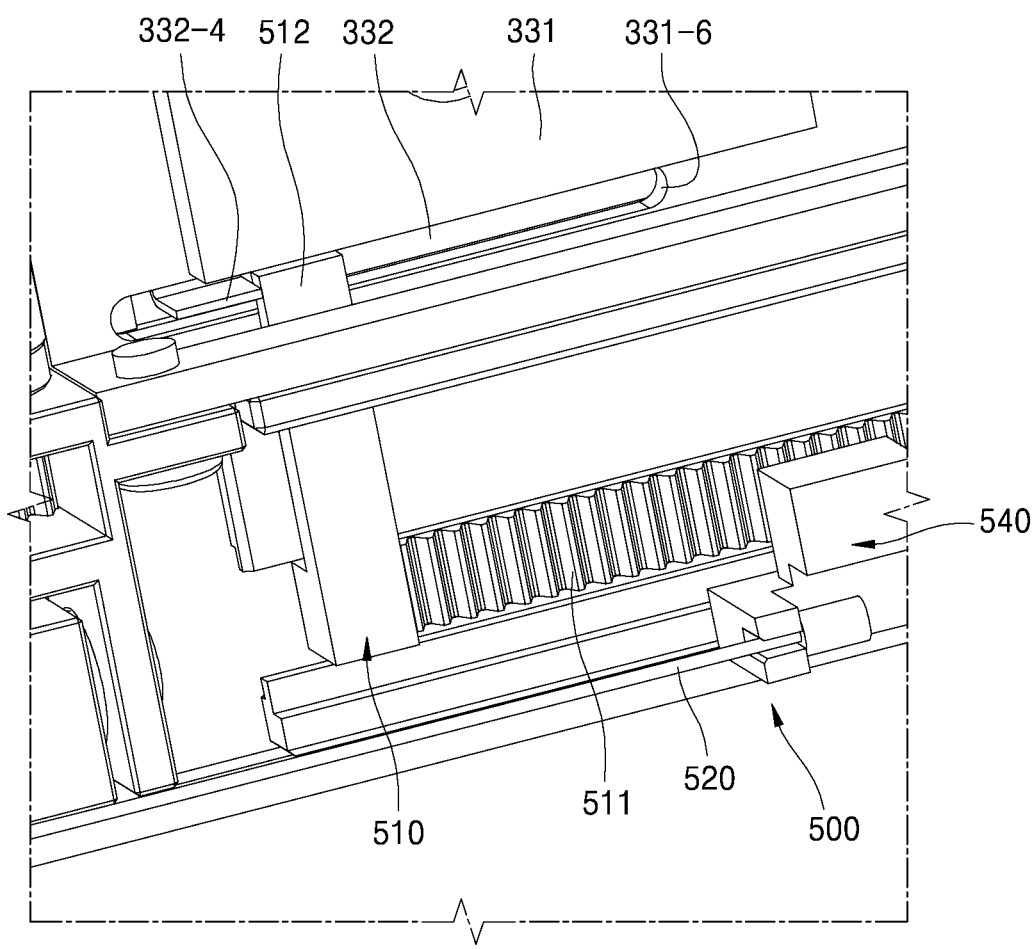
FIG. 47 is an enlarged view of a portion "BB" of FIG. 45.

FIG. 45 is a partial perspective view of a foldable device according to an exemplary embodiment. FIG. 45 corresponds to a partial perspective view of the foldable device 100 of FIG. 25 viewed from a back of the foldable device without a cover as the first and second base covers 11 and 21 are omitted from FIG. 25. Although not shown in FIG. 45, the movable frame 332 may be connected to the fixed fame 331 to slide in the longitudinal direction L (or G1 and G2 in FIG. 24) by using any structure of, for example, FIG. 26, 30, 31, or 32. FIG. 46 is an enlarged view illustrating a portion "AA" of FIG. 45. FIG. 47 is an enlarged view illustrating a portion "BB" of FIG. 45.

Referring to FIG. 45, because the first and second gears 35-1 and 35-2 of the respective first and second bodies 1 and 2 engage with each other, the first and second bodies 1 and 2 may respectively rotate in directions P1 and P2 marked by arrows about the central axes 301 and 30-2 and may change from the unfolded position of FIG. 2 to the folded position of FIG. 3.

In the exemplary embodiment, the restriction unit 500 may include a first slider 510 that is supported on the fixed frame 331 to slide in the longitudinal direction L and is connected to the movable frame 332, and a first connection member 520 that has one end portion 521 connected to the second body 2, for example, the second frame 22 and extends in a direction intersecting the central axes 30-1 and 30-2 to the first body 1.

The first connection member 520 may be, for example, a flexible wire. The first connection member 520 extends past pulleys 531 and 532 to the first body 1. When the foldable device folds, the first connection member 520 is partially wound around the pulleys 531 and 532 and the other end portion 522 of the first connection member 520 approaches the central axes 30-1 and 30-2. A movement amount of the movable frame 332 may be restricted by sliding the first slider 510 to a desired position by using a change in an amount of the first connection member 520 wound around the pulleys 531 and 532 according to a folding/unfolding angle of the foldable device, that is, a change in a position of the other end portion 522 of the first connection member 520 with respect to the central axes 30-1 and 30-2.

When the foldable device folds, the movable frame 332 slides away from the central axes 30-1 and 30-2 (i.e., a direction corresponding to G1). Accordingly, it is necessary to move the first slider 510 in a direction that is opposite to a direction in which the other end portion 522 of the first connection member 520 moves. To this end, a combination of a rack and a pinion may be used. Referring to FIGS. 45 and 46, a rack gear 540 is provided on the fixed frame 331 to slide in the longitudinal direction L. Also, a pinion 550 is provided on the fixed frame 331 to engage with the rack gear 540. For example, a guide shaft 560 that extends in the longitudinal direction L may be provided on the fixed frame 331, and the rack gear 540 may be slidably supported on the guide shaft 560. A first rack gear portion 511 that engages with the pinion 550 is provided on the first slider 510. The other end portion 522 of the first connection member 520 is connected to the rack gear 540.

In the exemplary embodiment, when the foldable device changes from an unfolded position to a folded position, the rack gear 540 moves toward the central axes 30-1 and 30-2, that is, in a direction 51, and the first slider 510 moves in a direction S2 that is opposite to the direction 51, due to the first connection member 520. In contrast, when the foldable device changes from the folded position to the unfolded position, the rack gear 540 moves away from the central axes 30-1 and 30-2, that is, in the direction S2, and the first slider 510 moves in the direction 51 that is opposite to the direction S2, due to the first connection member 520.

Reference number 570 is a return spring that applies a tensile force to the first connection member 520 so that the other end portion 522 moves in the direction S2 when the foldable device unfolds and the first connection member 520 is unwound from the pulleys 531 and 532. For example, the return spring 570 is connected to the rack gear 540 and applies an elastic force so that the rack gear 540 moves in the direction S2.

Referring to FIG. 47, a restricting protrusion 332-4 that protrudes downward through a through-hole 331-6 formed in the fixed frame 331 is provided on the movable frame 332. A restricting arm 512 that is connected to the restricting protrusion 332-4 and restricts a movement of the movable frame 332 is provided on the first slider 510. In the exemplary embodiment, the restricting arm 512 is disposed outside the restricting protrusion 332-4, that is, the restricting arm 512 is provided farther from the central axes 30-1 and 30-2 than the restricting protrusion 332-4 is.

Figure 48:
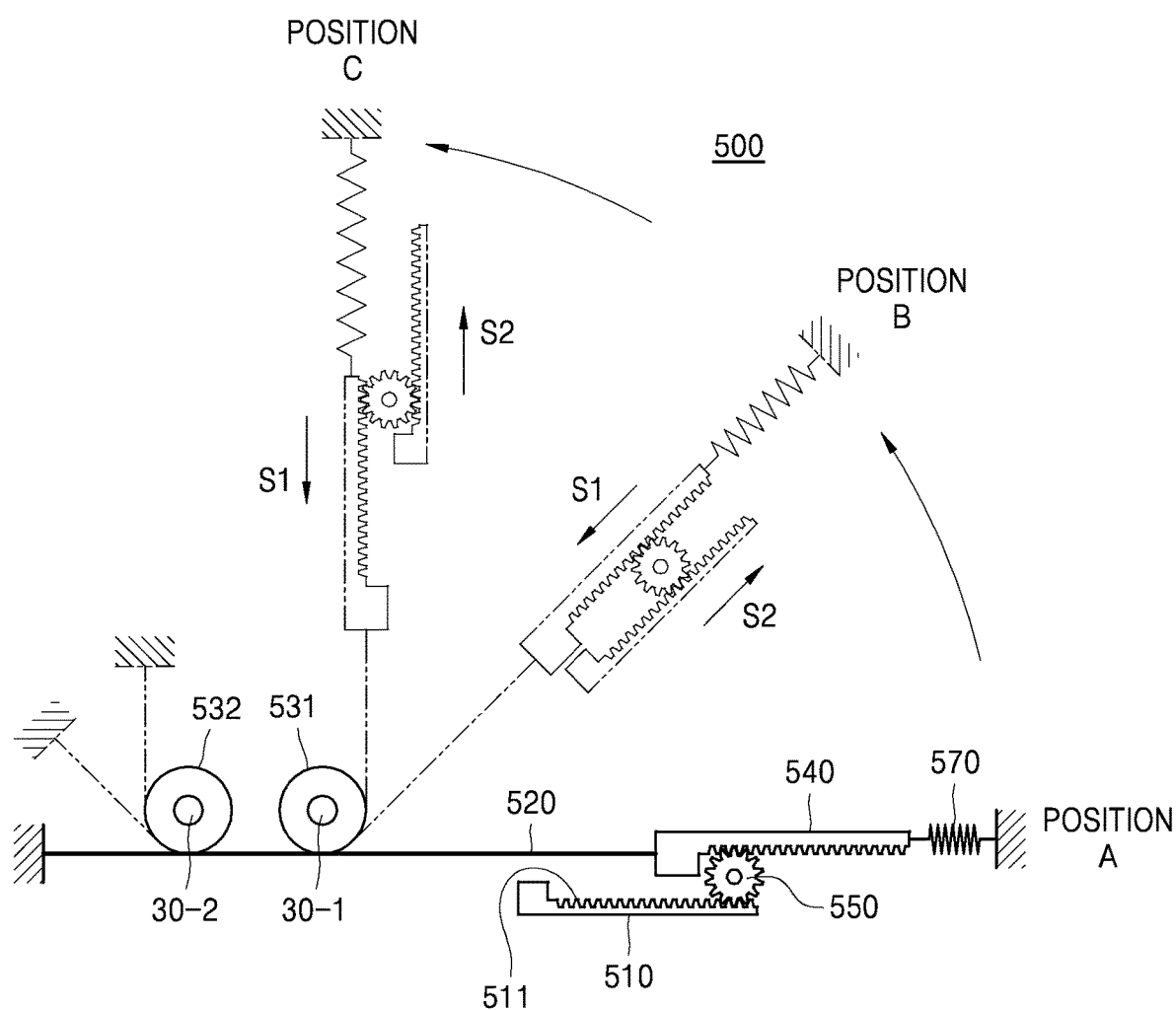
FIG. 48 is a schematic view for explaining an operation of a restriction unit.
Figure 49:
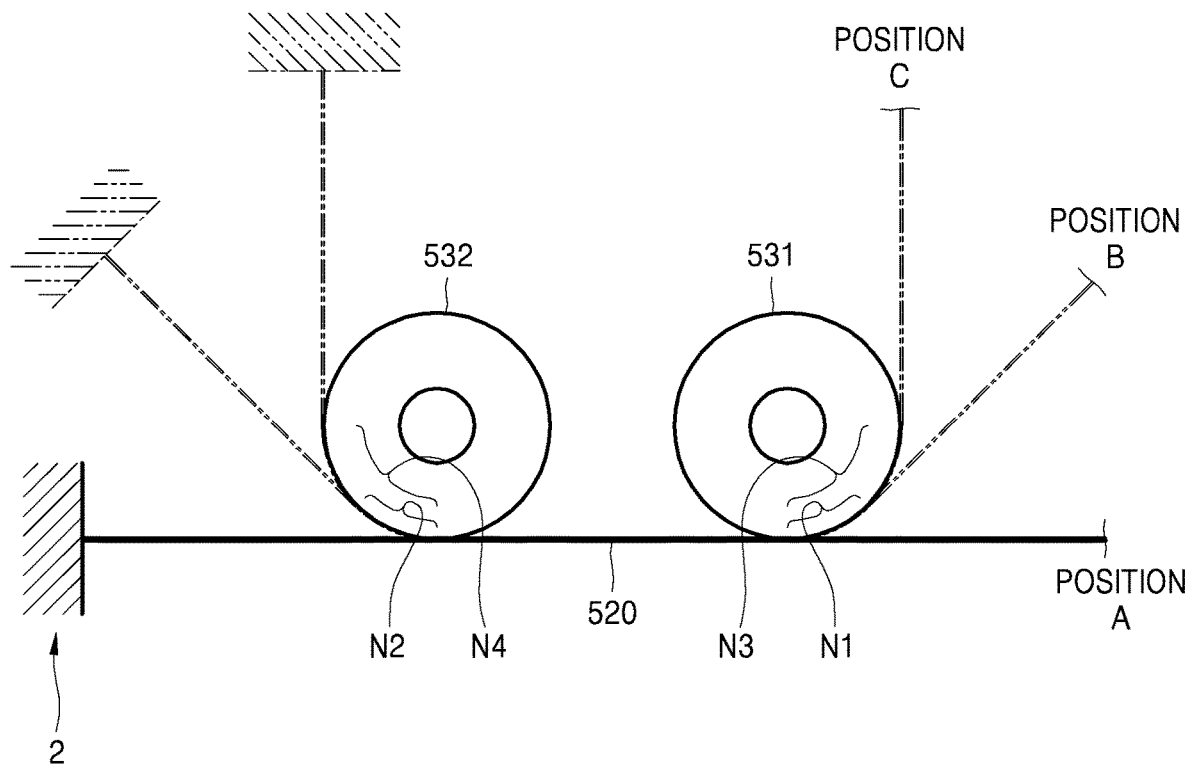
FIG. 49 is a schematic view for explaining a change in the amount of a first connection member wound around a pulley during a folding/unfolding process.

FIG. 48 is a schematic view for explaining an operation of the restriction unit 500. FIG. 49 is a schematic view for explaining a change in an amount of the first connection member 520 wound around the pulleys 531 and 532 during a folding/unfolding process. "POSITION A" of FIG. 48 and FIG. 49 is a state where the first and second bodies 1 and 2 are in an unfolded position. The first connection member 520 contacts the pulleys 531 and 532, and is not wound around the pulleys 531 and 532. In this state, when the first and second bodies 1 and 2 begin to fold, the first connection member 520 begins to be wound around the pulleys 531 and 532. "POSITION B" of FIG. 48 and FIG. 49 is a state where the first and second bodies 1 and 2 fold at an angle of 90°. In the exemplary embodiment, the first connection member 520 is wound by a length of N1+N2 around the pulleys 531 and 532, the rack gear 540 moves in the direction S1 by the length of N1+N2, and the first slider 510 moves in the direction S2 by the length of N1+N2. When the first and second bodies 1 and 2 reach a completely folded position, the first connection member 520 is wound by a length of N3+N4 around the pulleys 531 and 532 as shown as "POSITION C" of FIG. 48 FIG. 49, the rack gear 540 moves in the direction S1 by the length of N3+N4, and the first slider 510 moves in the direction S2 by the length of N3+N4.

When the first and second bodies 1 and 2 change from the folded position to the unfolded position, the first connection member 520 is unwound from the pulleys 531 and 532, the rack gear 540 moves in the direction S2 due to an elastic force of the return spring 570, and the first slider 510 moves in the direction S2.

An amount of the movable frame 332 that moves in the direction S2 when the foldable device folds is restricted by the restricting arm 512. That is, although the movable frame 332 moves in the direction S2 due to an elastic force of the flexible display device 4, the movable frame 332 is caught by the restricting arm 512 and thus an amount of the movable frame 332 that moves in the direction S2 is restricted. Also, when the foldable device unfolds, the movable frame 332 moves in the direction S1 due to an elastic force of the flexible display device 4, and when a movement amount of the movable frame 332 is less than a movement amount of the restricting arm 512, the restricting arm 512 pushes the restricting protrusion 332-4. Accordingly, even when the foldable device unfolds, an amount of the movable frame 332 that moves in the direction S1 may be restricted by the restricting arm 512.

Accordingly, the third part 4c of the flexible display device 4 may not move from the first and second bodies 1 and 2 and may be stably supported on the first and second bodies 1 and 2 as marked by a dashed line of FIG. 28, thereby minimizing the risk of forming a gap. Also, as shown in FIG. 24, when the first and second bodies 1 and 2 are used at a position having a predetermined unfolding angle of, for example, 120°, between the folded position and the unfolded position, a gap between the third part 4c of the flexible display device 4 and the first and second bodies 1 and 2 may be minimized.

Also, a folding/unfolding path difference between the flexible display device 4 and the first and second bodies 1 and 2 during a folding/unfolding process may be compensated to reduce a compressive force or a tensile force applied to the flexible display device 4, and the possibility that the third part 4c of the flexible display device 4 is bent inward or outward to have the concave or convex shape 4f of FIG. 20 may be reduced.

Figure 50:
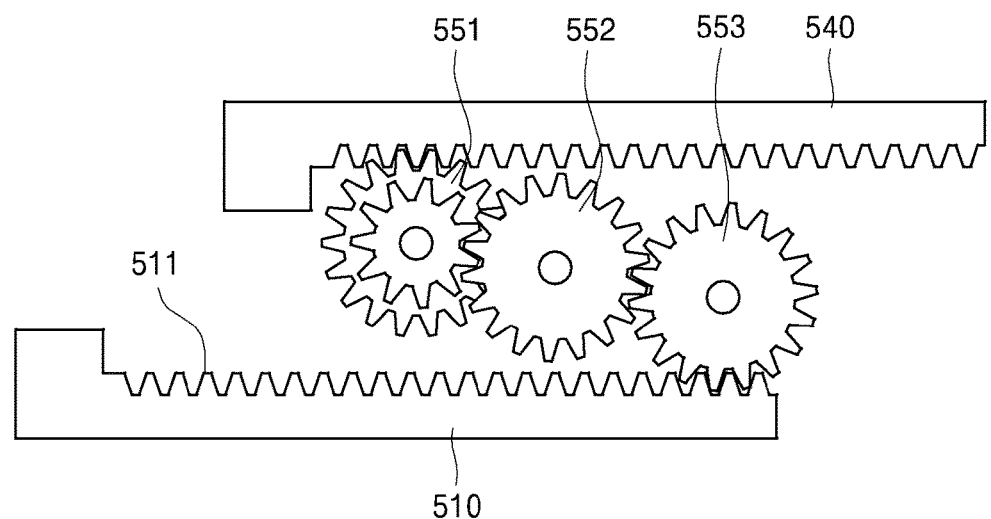
FIG. 50 is a schematic view of a structure for adjusting a movement ratio between a rack gear and a first slider according to an exemplary embodiment.

Although two pulleys 531 and 532 are used in the above exemplary embodiments, one pulley may be used or three or more pulleys may be used. Also, although the rack gear 540 and the first slider 510 move in the opposite directions at a ratio of 1:1 in the above exemplary embodiments, a movement ratio between the rack gear 540 and the first slider 510 may be changed as desired. For example, FIG. 50 is a schematic view of a structure for adjusting a movement ratio between the rack gear 540 and the first slider 510 according to an exemplary embodiment. Referring to FIG. 50, three pinions 551, 552, and 553 are disposed between the rack gear 540 and the first rack gear portion 511 of the first slider 510. At least one of the pinions 551, 552, and 553 is a speed change gear for reduction or multiplying. For example, the pinion 551 is a reduction gear in FIG. 50. Accordingly, a movement amount of the first slider 510 may be less than a movement amount of the rack gear 540. When it is difficult to sufficiently increase an amount of the first connection member 520 wound around the pulleys 531 and 532, the first slider 510 may be moved by a desired amount by using a multiplying gear.

Figure 51:
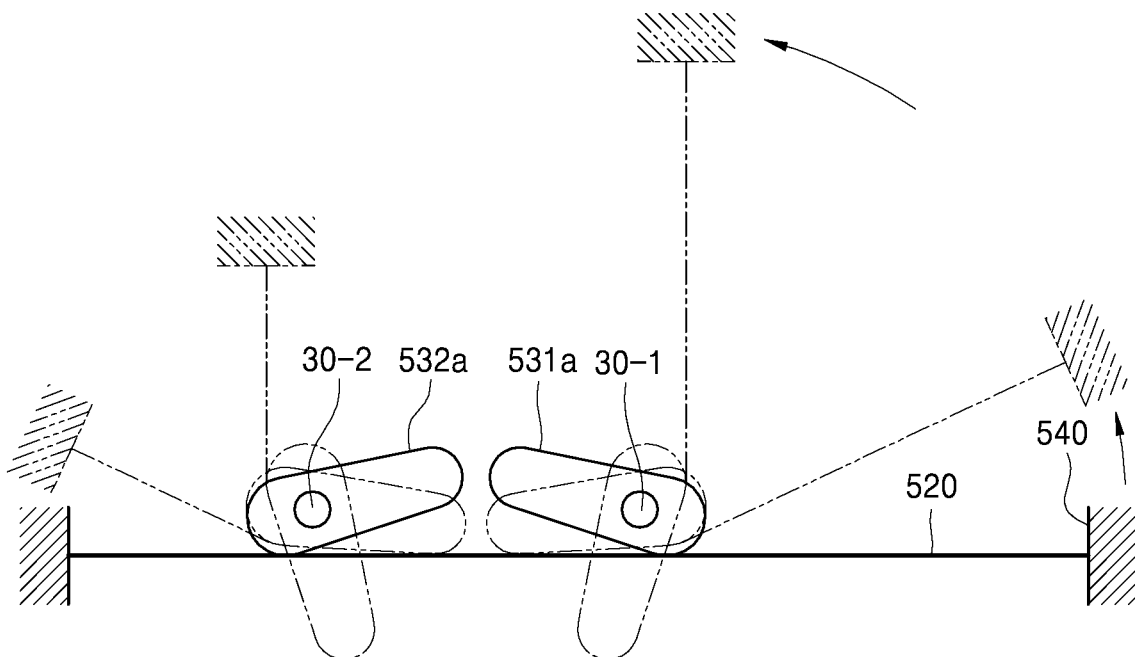
FIG. 51 is a view of a structure for nonlinearly moving a movable frame according to an exemplary embodiment.

A movement amount of the movable frame 332 according to a folding/unfolding angle between the first and second bodies 1 and 2 may be controlled by using shapes of the pulleys 531 and 532. Accordingly, the movable frame 332 may be moved to minimize the risk of forming a gap. For example, when the pulleys 531 and 532 have circular shapes, the movable frame 332 linearly moves according to the folding/unfolding angle. The movable frame 332 may be non-linearly moved according to the folding/unfolding angle by changing shapes of the pulleys 531 and 532. A structure for non-linearly moving the movable frame 332 is illustrated in FIG. 51. Referring to FIG. 51, pulleys 531a and 532a that have non-circular shapes and respectively rotate about the central axes 30-1 and 30-2 along with the first and second bodies 1 and 2 are illustrated. Distances of contact points of the pulleys 531a and 532a that contact the first connection member 520 from the central axes 30-1 and 30-2 vary according to rotation angles of the pulleys 531a and 532a.

Figure 52:
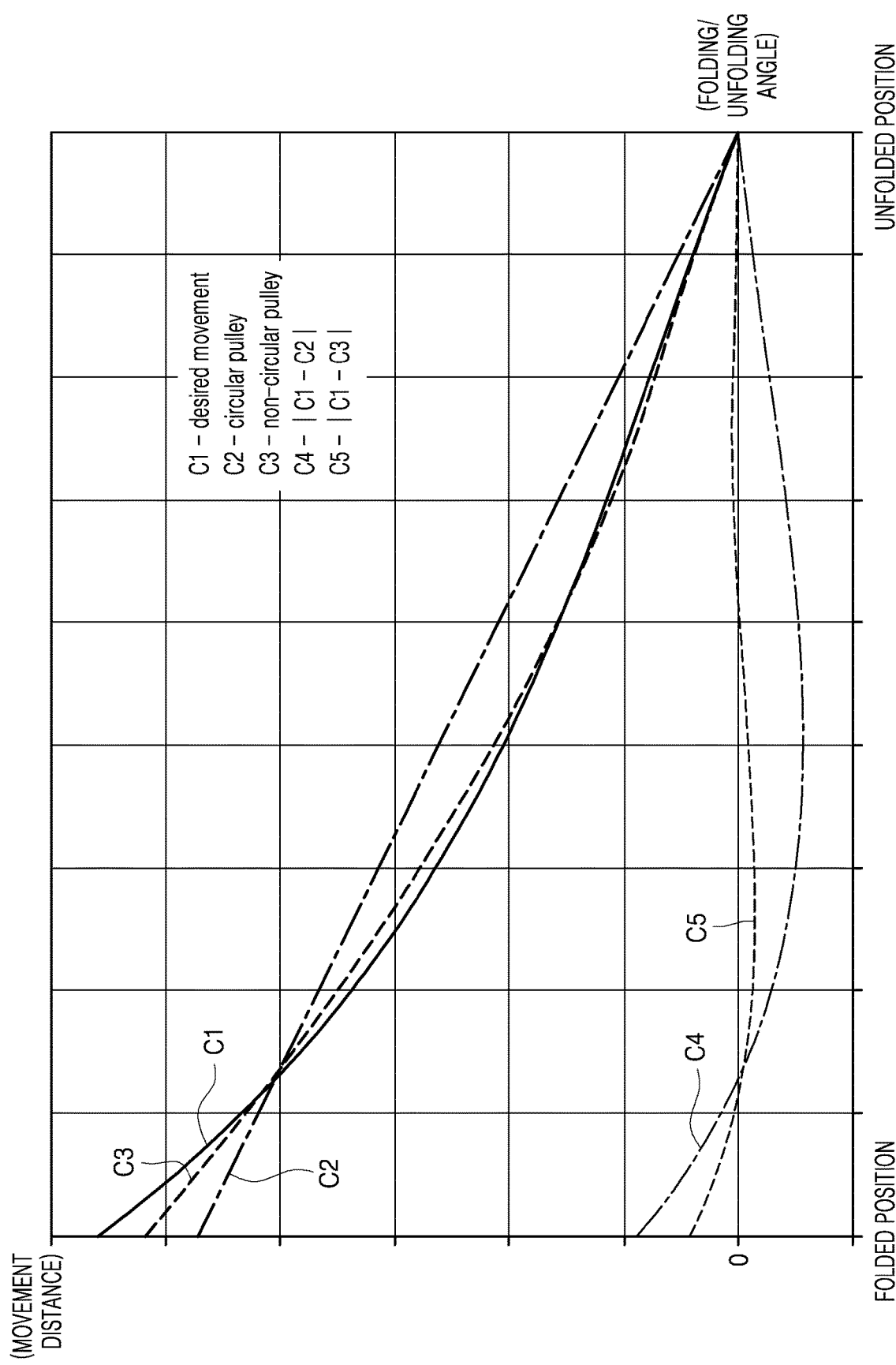
FIG. 52 is a graph illustrating a movement distance of a movable frame according to a folding/unfolding angle between first and second bodies according to an exemplary embodiment.

FIG. 52 is a graph illustrating a movement distance of the movable frame 332 according to a folding/unfolding angle between the first and second bodies 1 and 2 according to an exemplary embodiment. In FIG. 52, C1 denotes a movement distance of the movable frame 332 according to the folding/unfolding angle for minimizing a gap. C2 denotes a movement distance of the movable frame 332 according to the folding/unfolding angle when the pulleys 531 and 532 having circular shapes are used. C3 denotes a movement distance of the movable frame 332 according to the folding/unfolding angle when the pulleys 531a and 531b of FIG. 51 having non-circular shapes are used. C4 denotes a difference between the movement distances C1 and C2. C5 denotes a difference between the movement distances C1 and C3. Referring to FIG. 52, a difference between the movement distance C3 and a desirable movement distance of the movable frame 332 is very small, and thus the risk of forming a gap may be less than that in the case of the movement distance C2. As such, a movement amount of the movable frame 332 according to the folding/unfolding angle may be restricted to minimize the risk of forming a gap by changing shapes of pulleys from which the first connection member 520 is unwound.

Although a flexible wire is used as the first connection member 520 in the above exemplary embodiments, the first connection member 520 is not limited thereto. For example, the first connection member 520 may be any material having elasticity (e.g., bending elastic). Accordingly, when the first and second bodies 1 and 2 unfold and the first connection member 520 is unwound from the pulleys 531 and 532, the first connection member 520 may push the rack gear 540 in the direction S2 due to an elastic force of the first connection member 520. Hence, the return spring 570 may be omitted.

Referring back to FIG. 24, the first and second bodies 1 and 2 respectively include the first and second receivers 122 and 222. As described above with reference to FIGS. 19A and 19B, when the first and second bodies 1 and 2 are in a folded position, the first and second receivers 122 and 222 may be in a first position retreated from the flexible display device 4 in order to receive the curved portion 4d of the flexible display device 4, and when the first and second bodies 1 and 2 are in an unfolded position, the first and second receivers 122 and 222 may be in a second position that supports the third part 4c of the flexible display device 4. The first and second receivers 122 and 222 may be provided on the first and second frames 12 and 22 to pivot between the first and second positions about the hinges 123 and 223.

The first and second receivers 122 and 222 may be maintained at the second position until a reception start position, and when the first and second bodies 1 and 2 begin to unfold past the reception start position, the first and second receivers 122 and 222 may change to the first position. As described above, the first and second bodies 1 and 2 may be used by being locked at a position (e.g., an inclined position) having the unfolding angle E between the unfolded position and the folded position. In order to stably support the flexible display device 4 at the inclined position, the first and second receivers 122 and 222 may be maintained at the second position until the first and second bodies 1 and 2 reach the inclined position from the unfolded position. Accordingly, a reception start angle may be equal to or less than an angle corresponding to the inclined position. Because the foldable device is rarely used at an unfolding angle that is less than 90°, the first and second receivers 122 and 222 may be maintained at the second position when the unfolding angle ranges from about 180° to about 90°.

The foldable device may further include a support unit that maintains the first and second receivers 122 and 222 at the second position until the first and second bodies 1 and 2 reach the reception start position corresponding to the reception start angle from the unfolded position, and allows the first and second receivers 122 and 222 to move to the first position when the first and second bodies 1 and 2 fold past the reception start position.

Figure 53:
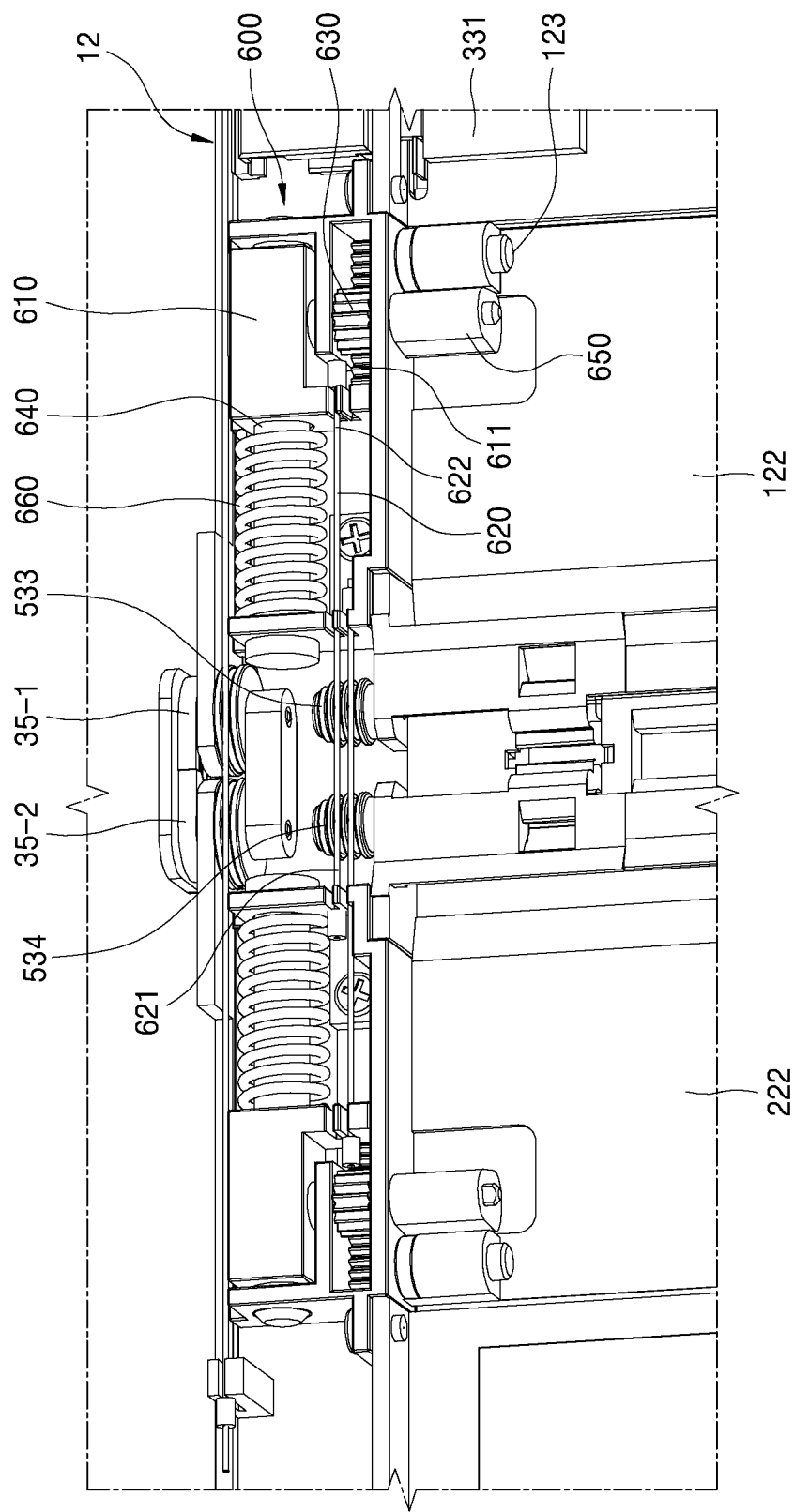
FIG. 53 is a perspective view of a support unit according to an exemplary embodiment.

For example, FIG. 53 is a perspective view of a support unit 600 according to an exemplary embodiment. FIG. 53 corresponds to a partial perspective view of FIG. 24 view of a rear of the foldable device 100. In FIG. 53, the first and second base covers 11 and 21 are omitted. A structure of the support unit 600 for moving the first receiver 122 between the first position and the second position may apply to the second receiver 222, and thus only the support unit 600 for the first receiver 122 will now be explained.

Referring to FIG. 53, the support unit 600 may include a second slider 610 that is supported on the first frame 12 to slide in the longitudinal direction L, and a second connection member 620 that has one end portion 621 connected to the second body 2, for example, the second frame 22, and extends past the central axes 30-1 and 30-2 to the first body 1 to be connected to the second slider 610. A rotation cam 650 is connected to the second slider 610 and rotates as the second slider 610 moves.

The second connection member 620 may be, for example, a flexible wire. The second connection member 620 extends past pulleys 533 and 534 to the first body 1. When the foldable device folds, the second connection member 620 is partially wound around the pulleys 533 and 534, and the other end portion 622 of the second connection member 620 approaches the central axes 30-1 and 30-2. The second slider 610 may be moved by using a change in an amount of the second connection member 620 wound around the pulleys 533 and 534, that is, a change in a position of the other end portion 622 with respect to the central axes 30-1 and 30-2 according to a folding/unfolding operation of the foldable device.

A return spring 660 applies an elastic force so that the second slider 610 moves away from the central axes 30-1 and 30-2 when the foldable device unfolds and the second connection member 620 is unwound from the pulleys 533 and 534.

In the exemplary embodiment, when the foldable device changes from the unfolded position to the folded position, the second slider 610 moves to the central axes 30-1 and 30-2 due to the second connection member 620. In contrast, when the foldable device changes from the folded position to the unfolded position, the second slider 610 moves away from the central axes 30-1 and 30-2 due to an elastic force of the return spring 660.

For example, a guide shaft 640 that extends in the longitudinal direction L may be provided on the first frame 12, and the second slider 610 may be slidably supported on the guide shaft 640. The second slider 610 includes a second rack gear portion 611. A pinion 630 that engages with the second rack gear portion 611 is provided on the first frame 12.

The rotation cam 650 is rotatably provided on the first frame 12. The rotation cam 650 is connected to the pinion 630. Accordingly, the rotation cam 650 may rotate as the second slider 610 moves. The first receiver 122 may be pivotably connected to the fixed frame 331 by using the hinge 123. The first receiver 122 is supported on the rotation cam 650 that is located under the first receiver 122.

Figure 54:
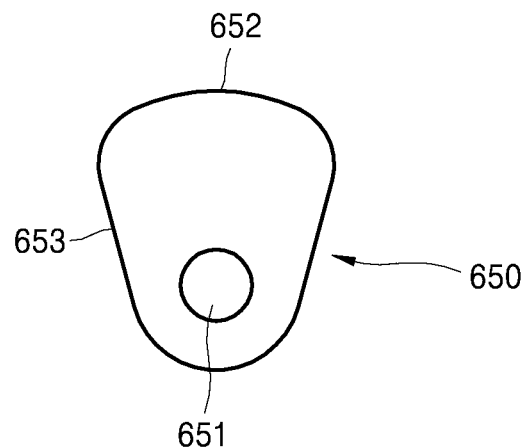
FIG. 54 is a side view of a rotation cam according to an exemplary embodiment.

FIG. 54 is a side view of the rotation cam 650 according to an exemplary embodiment. Referring to FIG. 54, the rotation cam 650 includes a first cam track 652 whose distance from a center of rotation 651 is constant and a second cam track 653 whose distance from the center of rotation 651 is reduced. While the first receiver 122 is supported by the first cam track 652, the first receiver 122 is maintained at the second position. When contact between the first receiver 122 and the first cam track 652 ends, the first receiver 122 is supported by the second cam track 653 and pivots to the first position.

Figure 55A:
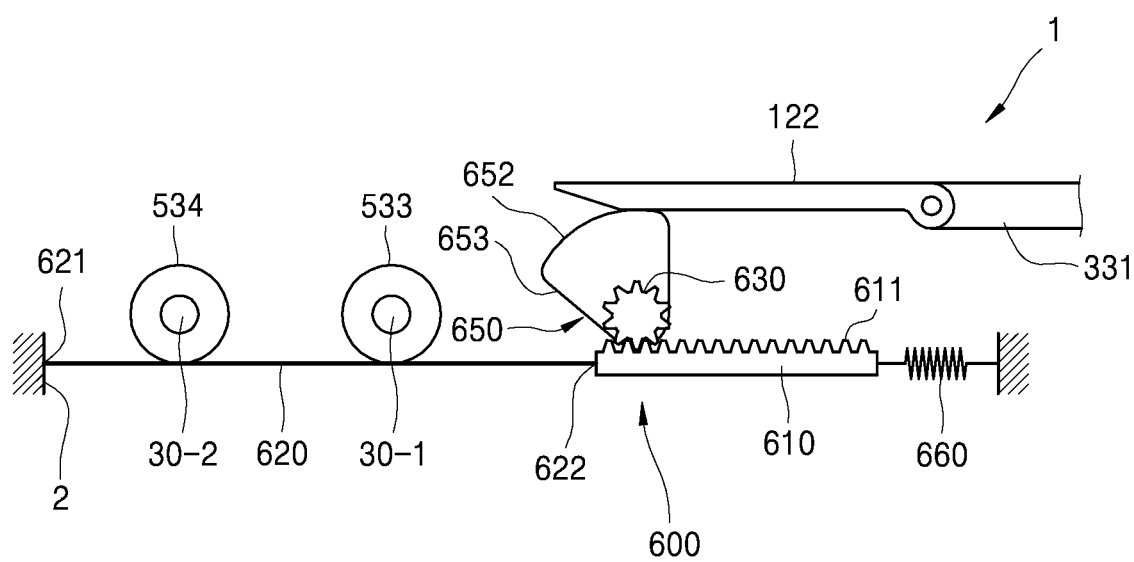
FIGS. 55A, 55B, and 55C are schematic views for explaining an operation of the support unit.
Figure 55B:
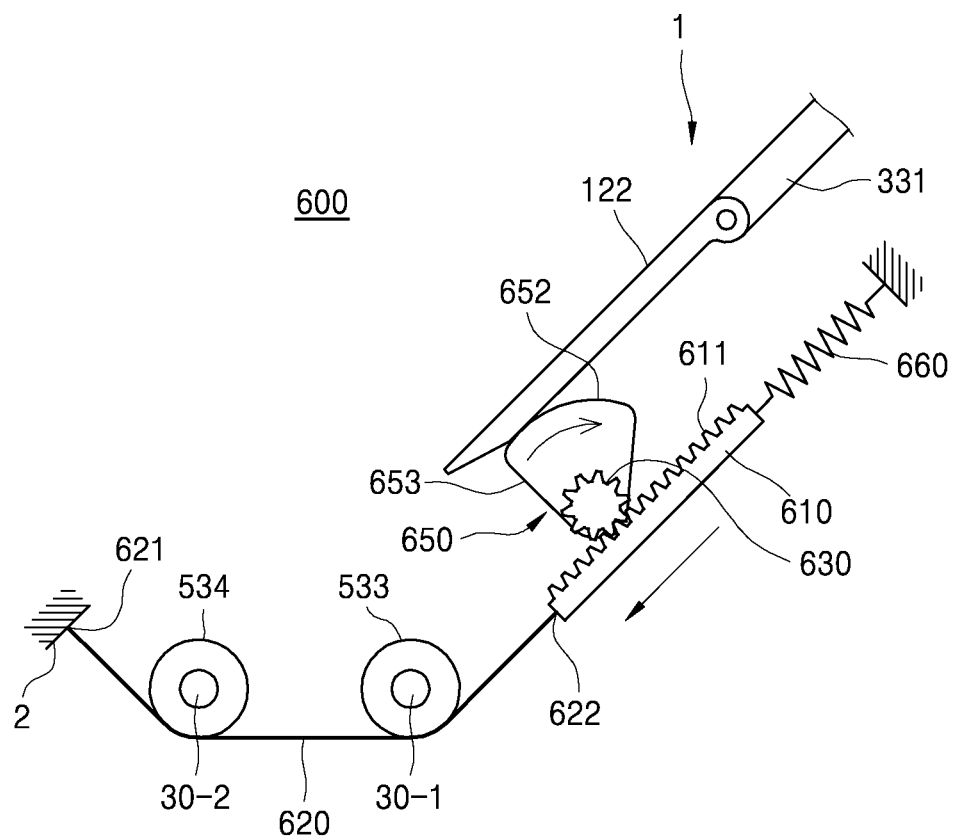
Figure 55C:
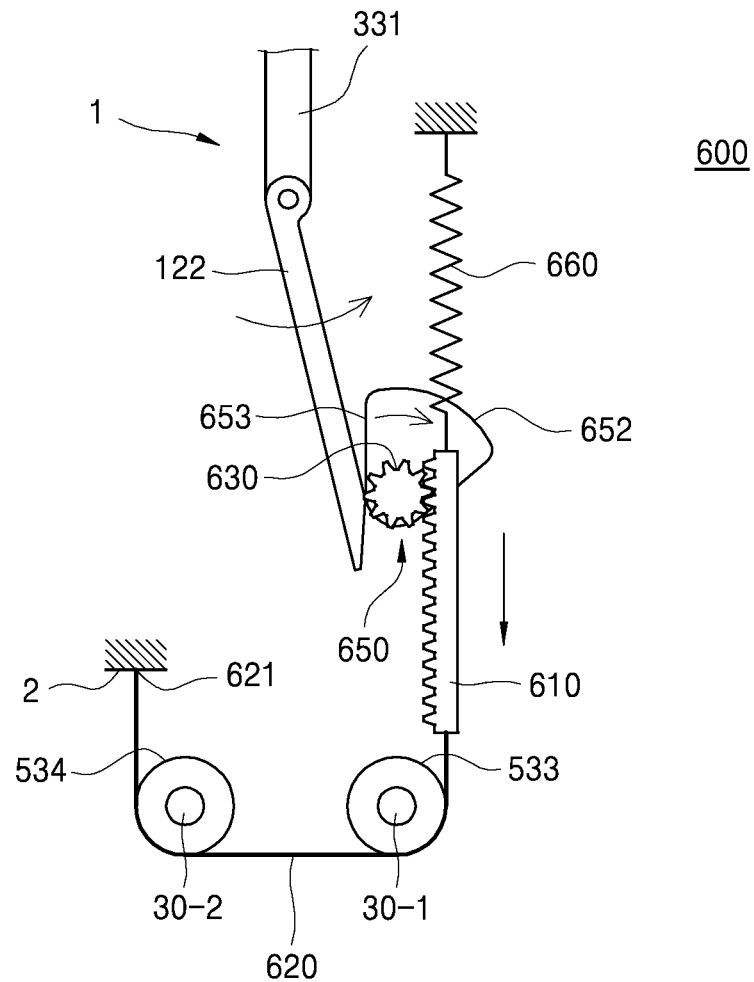

FIGS. 55A, 55B, and 55C are each a schematic view for explaining an operation of a support unit 600 according to an exemplary embodiment. FIG. 55A illustrates a state where the first and second bodies 1 and 2 are in the unfolded position. The first receiver 122 is supported by the first cam track 652 and is maintained at a support position.

When the first and second bodies 1 and 2 begin to fold from the state of FIG. 55A, the second connection member 620 begins to be wound around the pulleys 533 and 534. Next, the second slider 610 slides toward the central axis 30-1 and the rotation cam 650 rotates. Because the first receiver 122 is guided by the first cam track 652 until the first and second bodies 1 and 2 reach the reception start position as shown in FIG. 55B, the first receiver 122 is maintained at the second position.

When the first and second bodies 1 and 2 fold past the reception start position, contact between the first cam track 652 and the first receiver 122 ends and the first receiver 122 is supported by the second cam track 653. Next, the first receiver 122 pivots away from a back surface of the flexible display device 4 due to its weight and a receiving space begins to be formed in the first and second bodies 1 and 2. The third part 4c of the flexible display device 4 is gently curved and begins to be disposed within the receiving space.

When the first and second bodies 1 and 2 reach the folded position as shown in FIG. 55C, the first receiver 122 reaches the first position and a receiving space is formed in the first and second bodies 1 and 2 as shown in FIG. 3. The curved portion 4d is formed on the third part 4c of the flexible display device 4 and is disposed within the receiving space. In the folded state, the first part 4a and the second part 4b of the flexible display device 4 face each other to be disposed close to each other, and the third part 4c is curved from the first and second portions 4a and 4b into the first and second bodies 1 and 2 to have a water droplet shape and is disposed within the receiving space. Hence, the foldable device may be very compact in the folded state.

The return spring 660 is connected to the second slider 610 and applies a tensile force to the second connection member 620 having a wire shape. Accordingly, when the first and second bodies 1 and 2 unfold, the second slide 610 slides, due to an elastic force of the return spring 660, in a direction that is opposite to a direction in which the second slide 610 slides when the first and second bodies 1 and 2 folds, and the rotation cam 650 also rotates in the opposite direction. Accordingly, the first receiver 122 returns from the first position to the second position.

The second connection member 620 may be any material having elasticity (e.g., bending elastic). In the exemplary embodiment, when the first and second bodies 1 and 2 unfold and the second connection member 620 is unwound, the second connection member 620 pushes the second slider 610 due to an elastic force in a direction that is opposite to a direction in which the second connection member 620 pulls when the first and second bodies 1 and 2 fold. Accordingly, the return spring 660 may be omitted.

A rotation amount of the rotation cam 650 according to a folding/unfolding angle between the first and second bodies 1 and 2 may be appropriately adjusted by disposing one or more speed change gears between the second rack gear portion 611 and the pinion 630.

Figure 56:
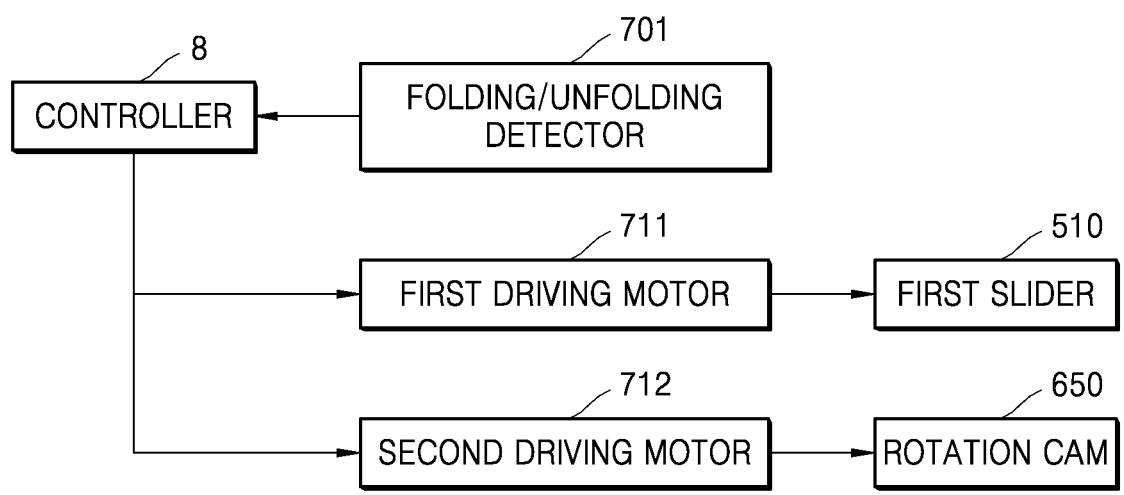
FIG. 56 is a block diagram for explaining an example where a restriction unit and a support unit are realized by using a motor according to an exemplary embodiment.

The restriction unit 500 and the support unit 600 may be realized by using a motor. FIG. 56 is a block diagram illustrating an example where the restriction unit 500 and the support unit 600 are realized by using a motor. Referring to FIG. 56, a folding/unfolding detector 701 is illustrated. The folding/unfolding detector 701 detects a folding/unfolding angle between the first and second bodies 1 and 2.

When the flexible display device 4 folds, a tensile stress is applied to a back surface of the flexible display device 4 and a compressive stress is applied to a front surface of the flexible display device 4. Due to these stresses, a length of the flexible display device 4 slightly changes. A strain gauge that detects a slight change in a length of the flexible display device 4 may be used as the folding/unfolding detector 701. The strain gauge may be disposed on or adjacent to the third part 4c of the flexible display device 4 whose curvature is greatly changed during folding/unfolding. A resistance value of the strain gauge varies according to a strain. For example, the resistance value of the strain gauge increases as the foldable device folds and decreases as the foldable device unfolds. That is, the resistance value of the strain gauge is inversely proportional to the folding/unfolding angle of the foldable device. The controller 8 may detect a folding operation or an unfolding operation based on whether the resistance value of the strain gauge increases or decreases. For example, the controller 8 may determine that the folding operation starts when the resistance value decreases to be less than a first resistance value, and may determine that the unfolding operation ends when the resistance value continuously decreases to be less than a second resistance value. In contrast, the controller 8 may determine that the folding operation starts when the resistance value increases to be greater than the second resistance value, and may determine that the folding operation ends when the resistance value continuously increases to be greater than the first resistance value. Also, an unfolding angle between the first and second bodies 1 and 2 may be detected from the resistance value of the strain gauge.

An optical sensor that directly detects a rotation angle of the first and second bodies 1 and 2 with respect to the first and second central axes 30-1 and 30-2 by using a light-detecting method may be used as the folding/unfolding detector 701.

The controller 8 generates a first driving signal including a movement amount and a movement direction of the first slider 510 based on a detection signal of the folding/unfolding detector 701. The controller 8 may control a first driving motor 711 to move the first slider 510 based on the first driving signal. For example, the first connection member 520, the rack gear 540, and the return spring 570 in FIG. 45 may be omitted, and the first driving motor 711 may directly rotate the pinion 550. Accordingly, the restriction unit 500 for restricting a movement amount of the movable frame 332 according to a folding/unfolding angle between the first and second bodies 1 and 2 may be realized.

The controller 8 generates a second driving signal including a rotation amount and a rotation direction of the rotation cam 650 based on a detection signal of the folding/unfolding detector 701. The controller 8 may control a second driving motor 712 to rotate the rotation cam 650 based on the second driving signal. For example, the second connection member 620, the second slider 610, and the return spring 660 in FIG. 53 may be omitted, and the second driving motor 712 may directly rotate the pinion 630 or the rotation cam 650. Accordingly, the support unit 600 for selectively changing the first and second receivers 122 and 222 to the first position or the second position according to a folding/unfolding angle between the first and second bodies 1 and 2 may be realized.

While exemplary embodiments have been particularly shown and described above, it will be understood by one of ordinary skill in the art that various changes in form and details may be made therein without departing from the spirit and scope of the inventive concept as defined by the following claims.

What is claimed is:

1. A foldable device comprising:
    a flexible display comprising a first part, a second part, and a third part disposed between the first part and the second part;
    a first body configured to support the first part;
    a second body connected to the first body and configured to support the second part; and
    a shielding member provided on the first body and the second body,
    wherein each of the first body and the second body are configured to move between a folded position and a unfolded position, and
    wherein the shielding member is configured to cover: a side portion of the third part of the flexible display, and a gap between the third part of the flexible display and the first body and the second body, during transition of the first body and the second body throughout moving between the folded position and the unfolded position.

2. The foldable device of claim 1, wherein, when the first body and the second body are in the folded position, the first body and the second body form a receiving space, and
    wherein, when the first body and the second body are in the folded position, the third part comprises a curved portion of the flexible display and the curved portion is provided within the receiving space.

3. The foldable device of claim 2, wherein the shielding member comprises a first end portion and a second end portion,
    wherein a guide is provided in one of the first body and the second body,
    wherein the first end portion of the shielding member comprises a protrusion configured to be inserted into the guide in a sliding manner, and
    wherein the second end portion of the shielding member is pivotably connected to the other of the first body and the second body.

4. The foldable device of claim 3, wherein the guide extends in a longitudinal direction on one of the first and the second body.

5. The foldable device of claim 2, wherein the first body and the second body are foldably connected to each other.

* * * * *